United States Patent
Slawson

(10) Patent No.: US 10,773,565 B2
(45) Date of Patent: *Sep. 15, 2020

(54) MACHINE SUSPENSION AND HEIGHT ADJUSTMENT

(71) Applicant: AGCO Corporation, Duluth, GA (US)

(72) Inventor: James Slawson, Spirit Lake, IA (US)

(73) Assignee: AGCO Corporation, Duluth, GA (US)

(*) Notice: Subject to any disclaimer, the term of this patent is extended or adjusted under 35 U.S.C. 154(b) by 129 days.

This patent is subject to a terminal disclaimer.

(21) Appl. No.: 15/949,280

(22) Filed: Apr. 10, 2018

(65) Prior Publication Data

US 2018/0222270 A1 Aug. 9, 2018

Related U.S. Application Data

(60) Continuation of application No. 15/078,609, filed on Mar. 23, 2016, now Pat. No. 9,950,584, which is a
(Continued)

(51) Int. Cl.
*B60G 17/00* (2006.01)
*B60G 17/005* (2006.01)
(Continued)

(52) U.S. Cl.
CPC ............... *B60G 17/00* (2013.01); *B60G 3/01* (2013.01); *B60G 15/12* (2013.01); *B60G 17/005* (2013.01);
(Continued)

(58) Field of Classification Search
CPC ......... B60G 2300/08; B60G 2300/082; B60G 2300/083; B60G 3/01; B60G 2204/423; B60G 2204/4232; B60G 2204/46; B60G 2204/61; B60G 2600/202; B60G 2600/204; B60G 2202/152; B60G 2202/21; B60G 2500/30; B60G 17/00; B60G 17/005;
(Continued)

(56) References Cited

U.S. PATENT DOCUMENTS 2,298,529 A 10/1942 Dimick
3,558,148 A 1/1971 Johnson
(Continued)

FOREIGN PATENT DOCUMENTS

EP 442148 A1 8/1991
EP 0281173 B1 4/1993
(Continued)

*Primary Examiner* — Laura Freedman

(57) ABSTRACT

A machine includes a chassis, a plurality of ground engaging elements supporting the chassis above a ground surface, a motor for driving at least one of the ground engaging elements and a plurality of assemblies supporting the chassis on the ground engaging elements. Each of the assemblies is configured to selectively raise and lower the chassis relative to the ground surface and includes a first attachment component for attaching the assembly to one of the ground engaging elements, a second attachment component for attaching the assembly to the chassis, an adjustment component for shifting the first attachment component between a plurality of operating positions relative to the second attachment component. A control system allows an operator to remotely control the adjustment components of each of the assemblies.

7 Claims, 47 Drawing Sheets

Related U.S. Application Data division of application No. 14/052,818, filed on Oct. 14, 2013, now Pat. No. 9,296,273.

(51) Int. Cl.

| | |
|---|---|
| *B60G 17/015* | (2006.01) |
| *B60G 3/01* | (2006.01) |
| *B60G 15/12* | (2006.01) |
| *B62D 49/06* | (2006.01) |
| *B62D 7/06* | (2006.01) |
| *B62D 33/06* | (2006.01) |

(52) U.S. Cl.
CPC ............ *B60G 17/015* (2013.01); *B62D 7/06* (2013.01); *B62D 49/0607* (2013.01); *B62D 49/0678* (2013.01); *B60G 2200/10* (2013.01); *B60G 2200/44* (2013.01); *B60G 2202/152* (2013.01); *B60G 2202/21* (2013.01); *B60G 2204/46* (2013.01); *B60G 2204/61* (2013.01); *B60G 2300/083* (2013.01); *B60G 2300/40* (2013.01); *B60G 2500/30* (2013.01); *B60G 2600/202* (2013.01); *B62D 33/0617* (2013.01)

(58) Field of Classification Search
CPC .............. B60G 17/015; B60G 2200/10; B60G 2200/44; B60G 15/12; B60G 2300/40; B62D 7/06; B62D 7/142; B62D 49/0607; B62D 49/0678; B62D 33/0617
See application file for complete search history.

(56) References Cited

U.S. PATENT DOCUMENTS

| | | | |
|---|---|---|---|
| 3,663,032 A | 5/1972 | Hook et al. |
| 3,899,037 A | 8/1975 | Yuker |
| 4,363,374 A | 12/1982 | Richter et al. |
| 4,606,551 A | 8/1986 | Toti et al. |
| 5,039,129 A | 8/1991 | Balmer |
| 5,209,319 A | 5/1993 | Buell |
| 5,282,644 A | 2/1994 | Larson |
| 5,447,095 A | 9/1995 | Weyer |
| 5,597,172 A | 1/1997 | Maiwald et al. |
| 5,899,472 A | 5/1999 | Burke et al. |
| 5,957,218 A | 9/1999 | Noonan et al. |
| 6,017,047 A | 1/2000 | Hoose |
| 6,036,201 A | 3/2000 | Pond et al. |
| 6,199,769 B1 | 3/2001 | Weddle |
| 6,206,125 B1 | 5/2001 | Weddle |
| 6,357,770 B1 | 3/2002 | Carpiaux et al. |
| 6,371,237 B1 | 4/2002 | Schaffer |
| 6,386,554 B1 | 5/2002 | Weddle |
| 6,491,306 B2 | 12/2002 | Schaffer |
| 6,530,580 B1 | 3/2003 | Simpson |
| 6,820,877 B1 | 11/2004 | Ichimura et al. |
| 7,163,227 B1 | 1/2007 | Burns |
| 7,168,717 B2 | 1/2007 | Wubben et al. |
| 7,284,764 B2 | 10/2007 | Prohaska |
| 7,669,675 B2 | 3/2010 | Hagie |
| 7,717,443 B1 | 5/2010 | Carlson et al. |
| 7,837,207 B2 | 11/2010 | Kremmin et al. |
| 7,938,415 B2 | 5/2011 | Carlson et al. |
| 8,042,817 B2 | 10/2011 | Motebennur et al. |
| 8,205,893 B2 | 6/2012 | Peterson |
| 8,262,101 B2 | 9/2012 | Madler |
| 8,376,078 B2 | 2/2013 | Hiddema |
| 8,534,686 B1 | 9/2013 | Slawson |
| 8,689,914 B2 | 4/2014 | Gano |
| 8,813,864 B2 | 8/2014 | Layton |
| 9,079,470 B2 | 7/2015 | Slawson |
| 9,180,747 B2 | 11/2015 | Slawson |
| 9,193,243 B2 | 11/2015 | Ono et al. |
| 9,259,986 B2 | 2/2016 | Slawson |
| 9,290,074 B2 | 3/2016 | Slawson |
| 9,296,273 B2 | 3/2016 | Slawson |
| 9,296,274 B2 | 3/2016 | Gano |
| 9,604,519 B2 | 3/2017 | Slawson |
| 9,669,675 B2 | 6/2017 | Slawson |
| 9,931,901 B2 | 4/2018 | Slawson |
| 9,950,584 B2 | 4/2018 | Slawson |
| 2002/0053795 A1 | 5/2002 | Schaffer |
| 2004/0173979 A1 | 9/2004 | Ichimura et al. |
| 2005/0127620 A1 | 6/2005 | Amundson |
| 2005/0156391 A1 | 7/2005 | Krenzin |
| 2006/0012137 A1 | 1/2006 | Sakamoto |
| 2006/0049598 A1 | 3/2006 | Prohaska |
| 2006/0081755 A1 | 4/2006 | Thorpe |
| 2010/0044980 A1 | 2/2010 | Kremmin et al. |
| 2010/0044989 A1 | 2/2010 | Steffensen et al. |
| 2011/0049263 A1 | 3/2011 | Vander Zaag et al. |
| 2011/0089647 A1 | 4/2011 | Peterson et al. |
| 2011/0148053 A1 | 6/2011 | Motebennur et al. |
| 2012/0175852 A1 | 7/2012 | Crowley et al. |
| 2012/0241230 A1 | 9/2012 | Vidal et al. |
| 2012/0318588 A1 | 12/2012 | Kroese et al. |
| 2013/0069336 A1 | 3/2013 | Horsch |
| 2013/0264801 A1 | 10/2013 | Solbrack et al. |
| 2015/0102572 A1 | 4/2015 | Slawson |
| 2016/0159186 A1 | 6/2016 | Slawson |
| 2017/0072760 A1 | 3/2017 | Slawson |
| 2017/0355243 A1* | 12/2017 | Albert .................. B60K 7/0015 |
| 2018/0250997 A1* | 9/2018 | Slawson .................. B60G 3/01 |

FOREIGN PATENT DOCUMENTS

| | | |
|---|---|---|
| EP | 1685988 A1 | 8/2006 |
| JP | 2001097017 A2 | 4/2001 |
| WO | 2008/036035 A1 | 3/2008 |
| WO | 201214717 A1 | 2/2012 |

* cited by examiner

MACHINE SUSPENSION AND HEIGHT ADJUSTMENT

This application claims priority under 35 U.S.C. § 120 as a continuation of U.S. patent application Ser. No. 15/078,609, filed Mar. 23, 2016, now U.S. Pat. No. 9,950,584, which is a divisional of U.S. patent application Ser. No. 14/052,818, filed Oct. 14, 2013, now U.S. Pat. No. 9,296,273. The full disclosure, in its entirety, of U.S. patent application Ser. No. 15/078,609 is hereby incorporated by reference. The subject matter of this application is also related to the subject matter of U.S. Pat. No. 9,079,470, issued Jul. 14, 2015; U.S. Pat. No. 9,180,747, issued Nov. 10, 2015; U.S. Pat. No. 9,259,986, issued Feb. 16, 2016; U.S. Pat. No. 9,669,675, issued Jun. 6, 2017; and U.S. Pat. No. 9,931,901, issued Apr. 3, 2018,

FIELD

Embodiments of the present invention relate to mobile machines, such as self-propelled agricultural machines and similar vehicles. More particularly, embodiments of the present invention relate to mobile machines with adjustable-height chassis.

BACKGROUND

Some agricultural vehicles are configured to be operated in fields among row crops. Application machines such as self-propelled sprayers, for example, may have wheels configured to pass between crop rows and a spray boom that extends outwardly from the vehicle to spray the crop as the machine travels through the field. In order to avoid damaging the crops as the vehicle moves through the field, each of the wheels must have the proper width to travel between the rows, and the track width—the lateral distance between the wheels—must match row spacing so that the wheels are properly positioned between crop rows. Furthermore, the vehicle should have sufficient ground clearance (the distance between the vehicle body and the surface over which it moves) to clear the crops.

While a standard height agricultural vehicle may be used to process short crops, such as early stage corn or the like, difficulties arise when processing taller crops, such as mature corn, that are taller than the ground clearance of a standard vehicle. For such crops, high clearance vehicles may be used. While high clearance vehicles provide sufficient clearance to pass over the top of taller crops, they suffer from various limitations. For example, high clearance vehicles, such as those that provide a crop clearance of seventy inches or more, may have an overall height that exceeds highway height restrictions, thereby making the transport of such vehicles to and from the field difficult. For example, public highways often restrict the height of a load to twelve feet or less which may be exceeded when a high clearance vehicle is placed on a transport trailer. Thus, measures may need to be taken to lower the vehicle to an acceptable transport height, such as deflating the tires or entirely removing the wheels.

In addition, while high clearance vehicles may be desirable for use on tall crops, they are not as effective in processing shorter crops without added complexity in the boom lifting mechanism to accommodate the range of motion required to place the boom at the proper height above the crop when spraying at the various crop heights. Some systems have been developed to increase the ground clearance of an existing vehicle. Such systems are complicated, however, and require the removal of existing vehicle equipment and/or the addition of new equipment.

The above section provides background information related to the present disclosure which is not necessarily prior art.

SUMMARY

A machine constructed in accordance with an embodiment of the present invention comprises a chassis, a plurality of ground engaging elements supporting the chassis above a ground surface, a motor for driving at least one of the ground engaging elements to thereby propel the machine along the ground surface and a plurality of assemblies supporting the chassis on the ground engaging elements. The assemblies are configured to selectively raise and lower the chassis relative to the ground surface. A control system enables an operator to remotely control the adjustment components of each of the assemblies.

Each of the assemblies includes a first attachment component for attaching the assembly to one of the ground engaging elements, a second attachment component for attaching the assembly to the chassis, an adjustment component for shifting the first attachment component between a plurality of operating positions relative to the second attachment component, and a suspension component operably interposed between the first attachment component and the second attachment component. The suspension component is configured to regulate motion transfer between the first attachment component and the second attachment component, and functions independently of the operating position.

A self-propelled agricultural applicator constructed in accordance with another embodiment of the invention comprises a chassis, four wheels supporting the chassis above a ground surface, and a motor associated with each wheel for driving the respective wheel to thereby propel the applicator along the ground surface and a plurality of assemblies supporting the chassis on the wheels. The applicator further includes a control system for allowing an operator to remotely control the plurality of assemblies to raise and lower the chassis relative to the ground surface, and at least one pivot actuator for causing at least one of the wheels to pivot relative to the chassis.

The assemblies are configured to selectively raise and lower the chassis relative to the ground surface. Each of the assemblies includes a first attachment component for attaching the assembly to one of the wheels, a second attachment component for attaching the assembly to the chassis, an adjustment component for shifting the first attachment component between a plurality of operating positions relative to the second attachment component, each of the operating positions corresponding to a different operating height of the chassis and a suspension component operably interposed between the first attachment component and the second attachment component. The suspension component is configured to regulate motion transfer between the first attachment component and the second attachment component and functions independently of the operating position.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
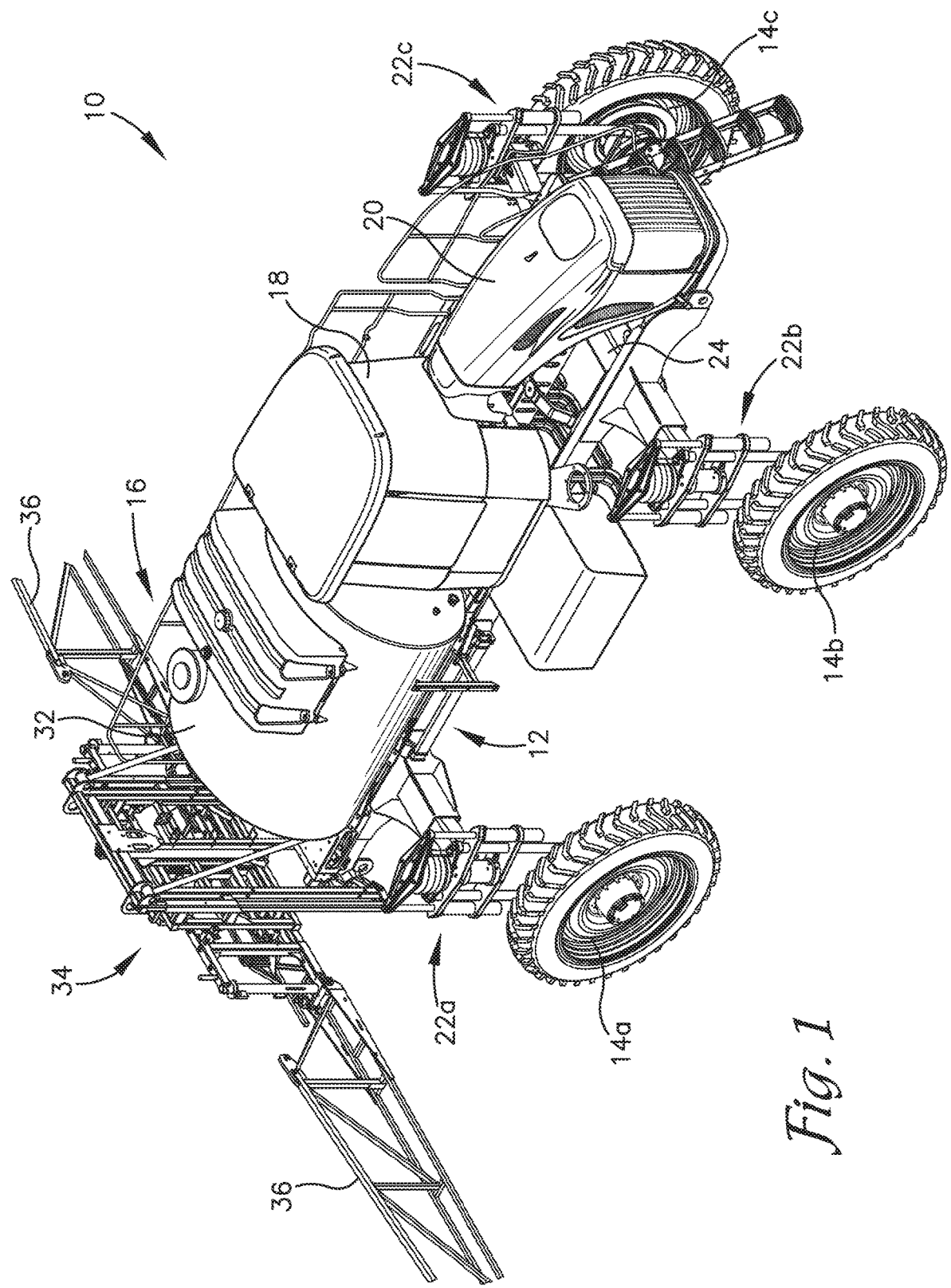
FIG. 1 is a perspective view of an agricultural applicator constructed in accordance with principles of the present invention.
Figure 3:
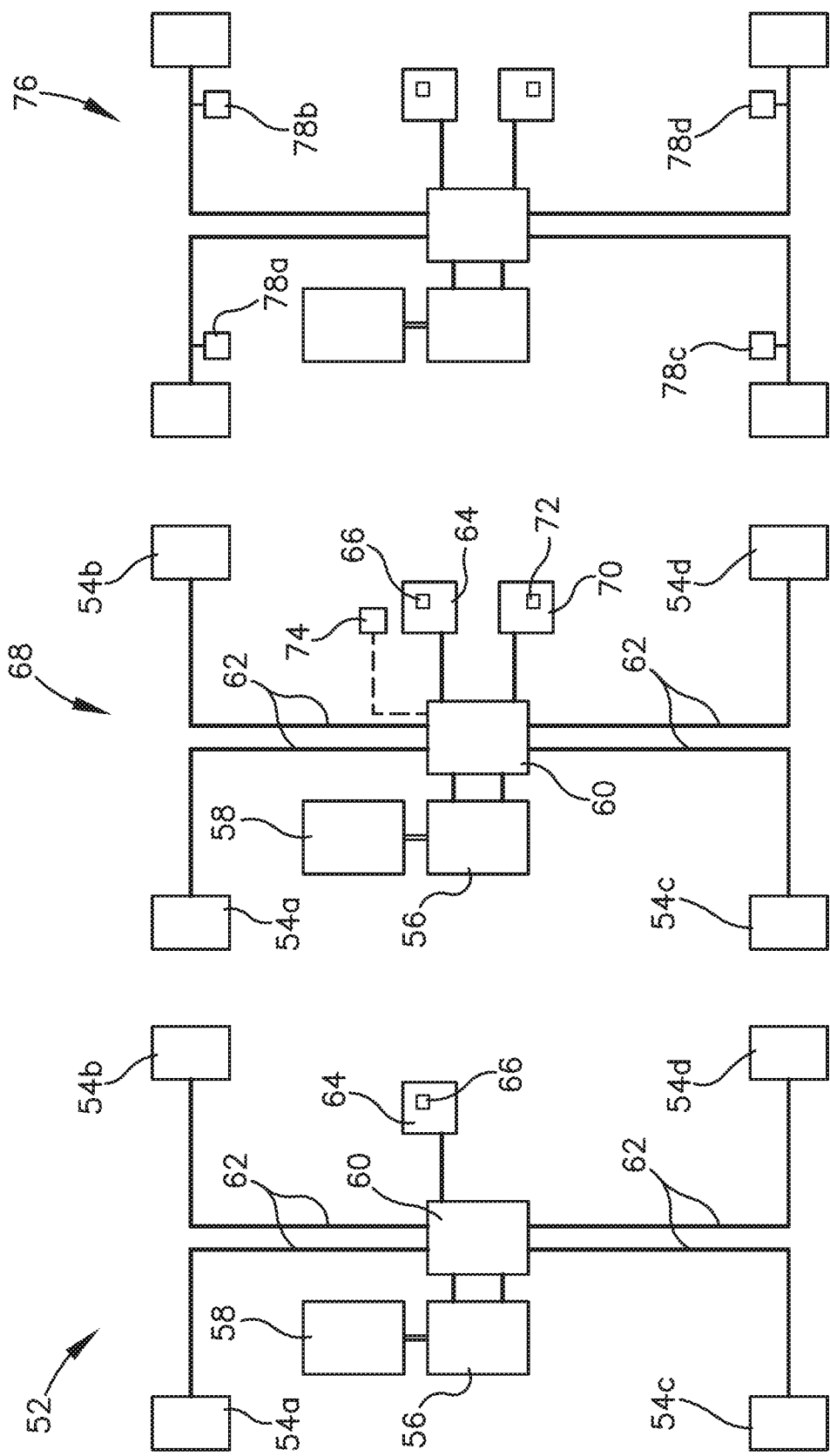

FIGS. 3a-c are block diagrams of various exemplary embodiments of a control system of the applicator of FIG. 1.

Figure 4:
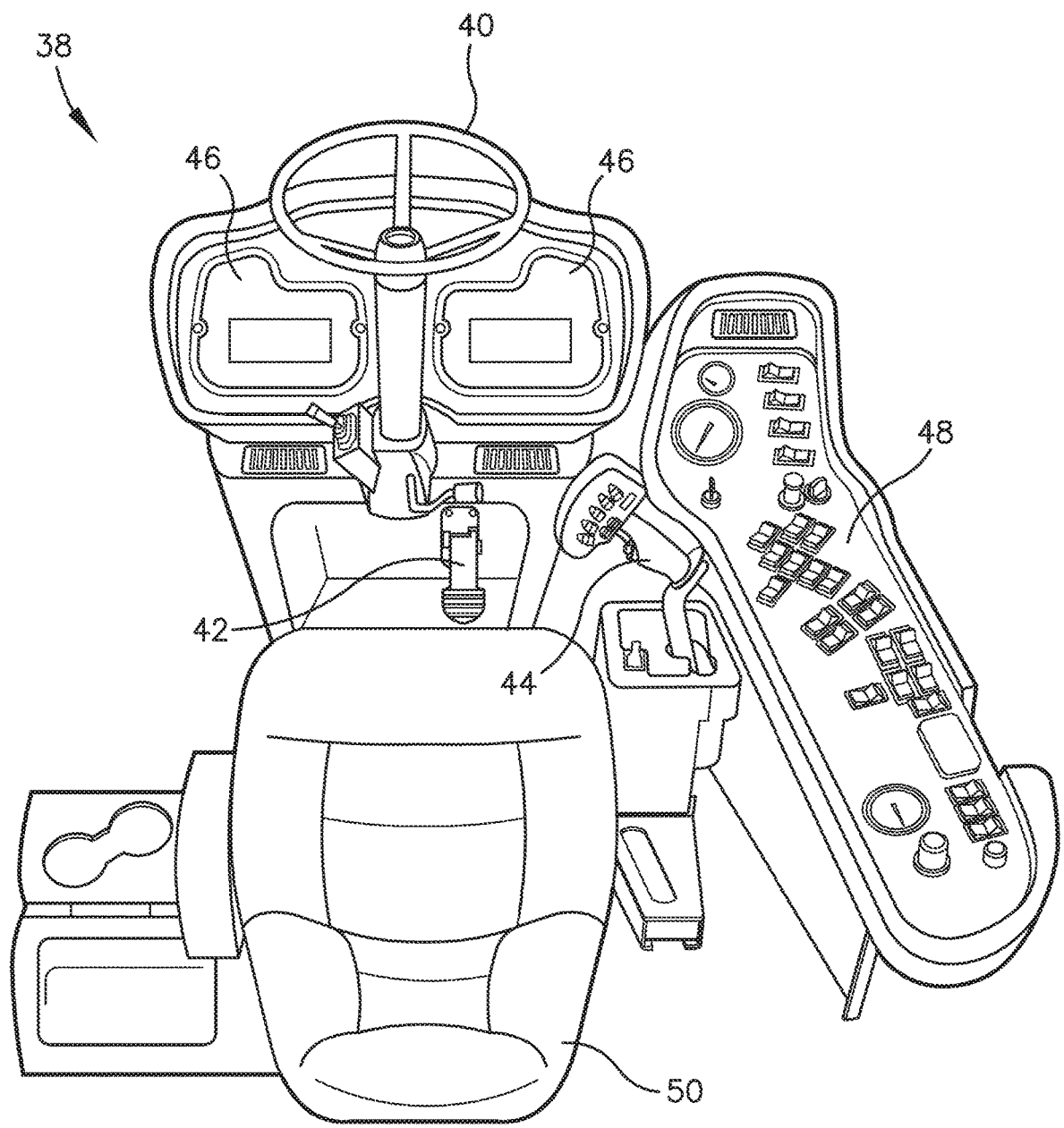

FIG. 4 illustrates certain features of a cabin of the applicator of FIG. 1 including one or more user interface elements allowing a user to control certain functions of the applicator.

Figure 2:
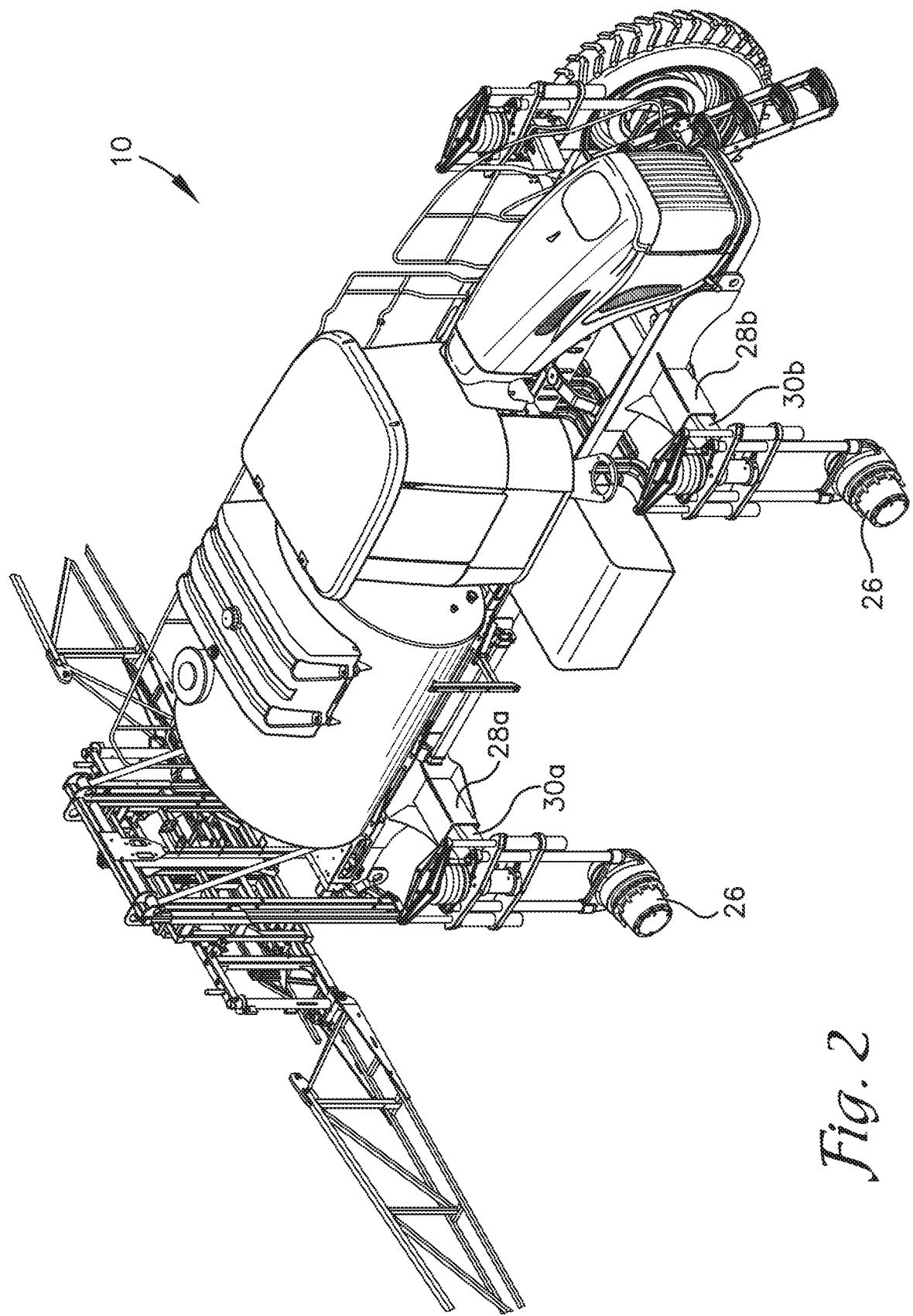
FIG. 2 is a perspective view of the agricultural applicator of FIG. 1 with two of the wheels omitted to more fully illustrate support assemblies interposed between the wheels and the chassis.
Figure 5:
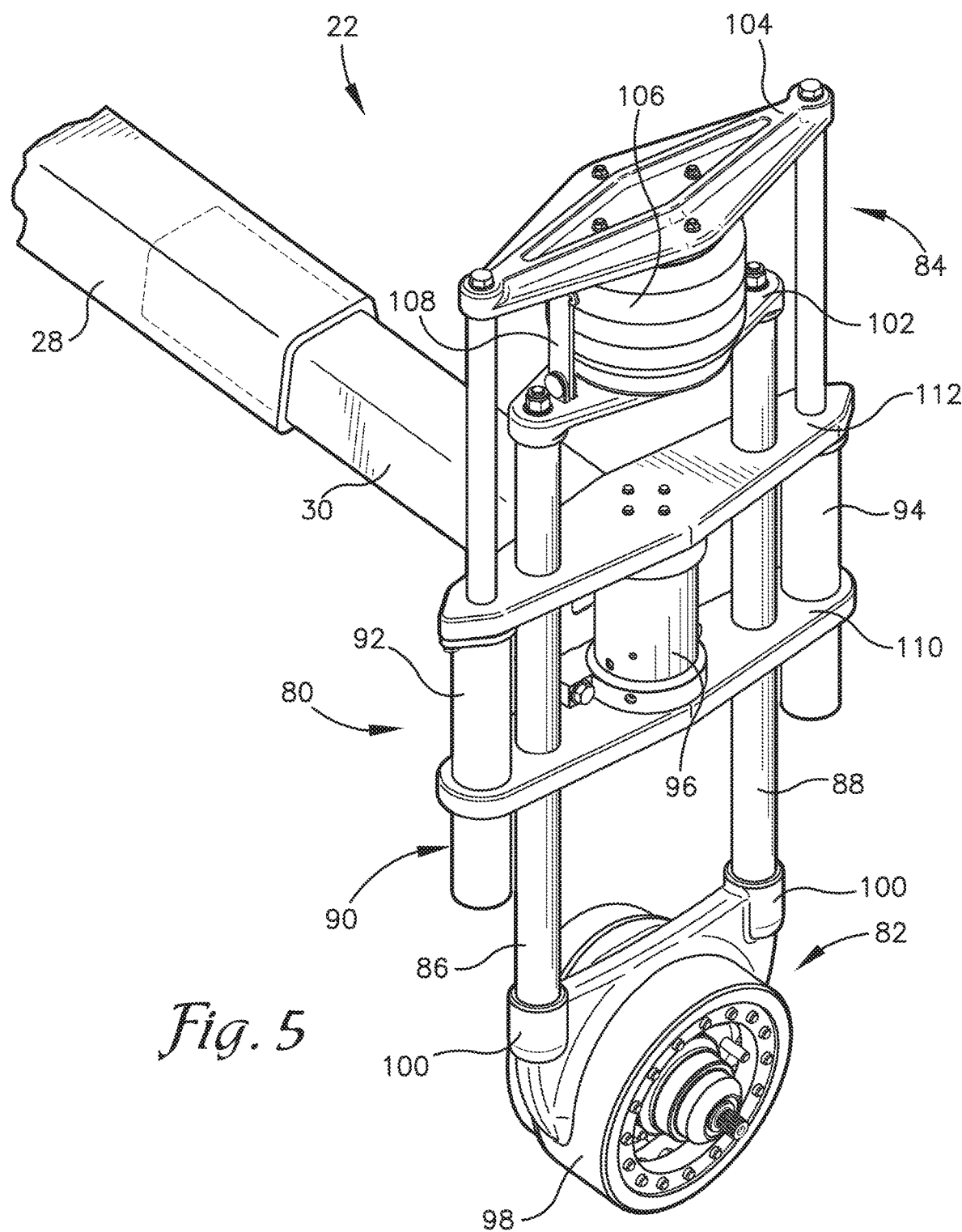

FIG. 5 is an outside perspective view of one of the support assemblies of the applicator of FIG. 2.

Figure 6:
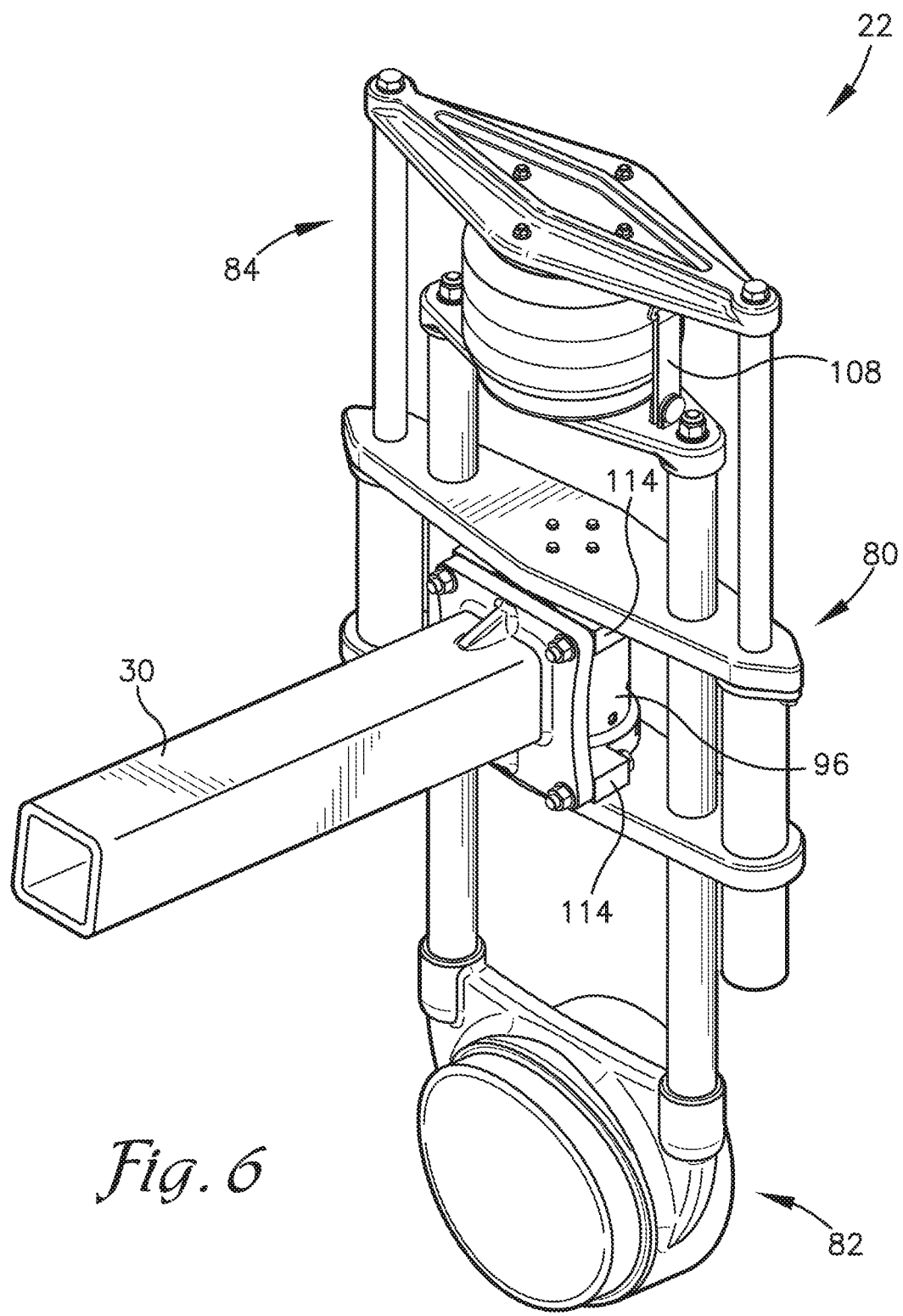

FIG. 6 is an inside perspective view of the support assembly of FIG. 5

Figure 7:
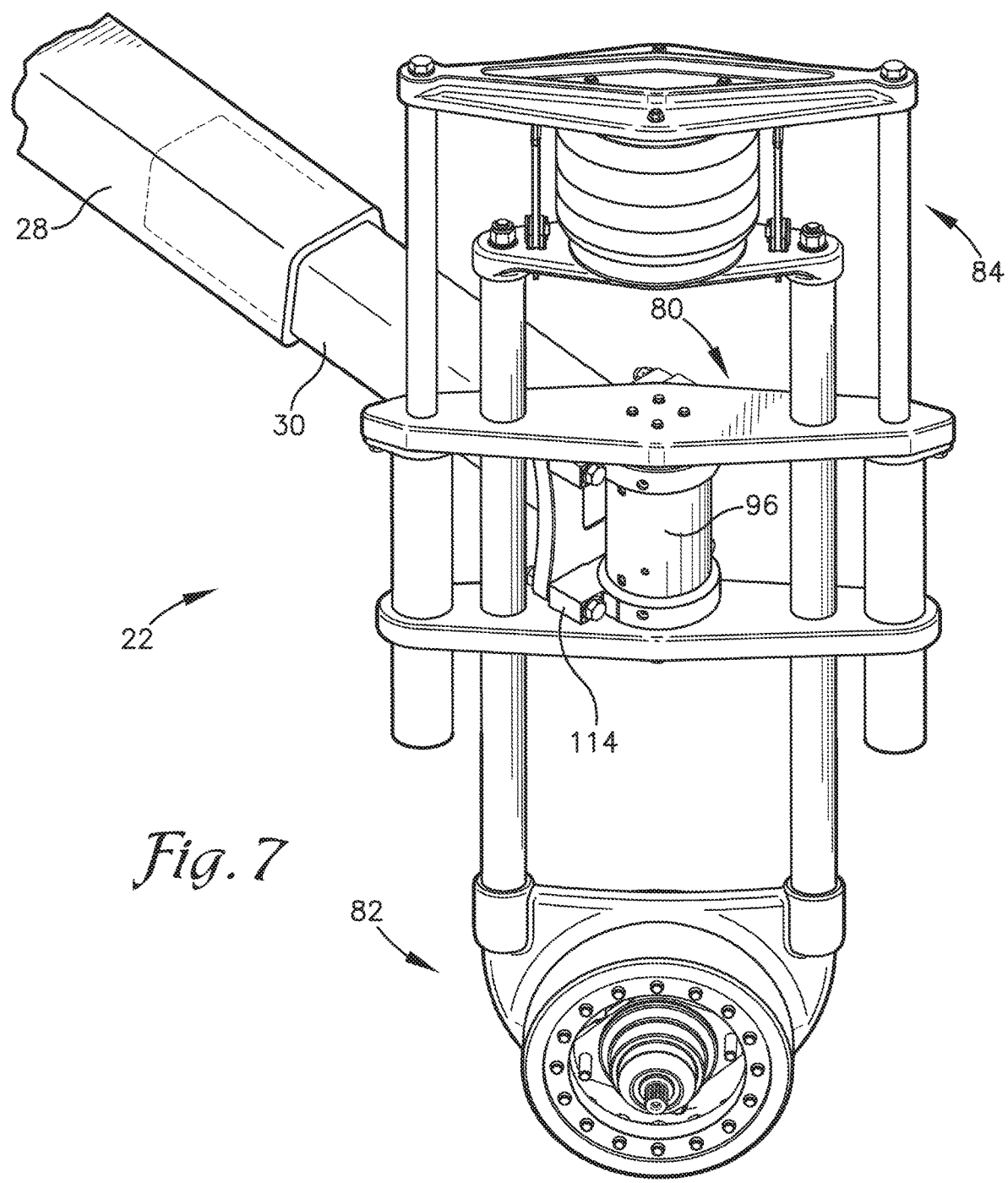

FIG. 7 illustrates the support assembly of FIG. 5 pivoted to a first position relative to an axle of the applicator.

Figure 8:
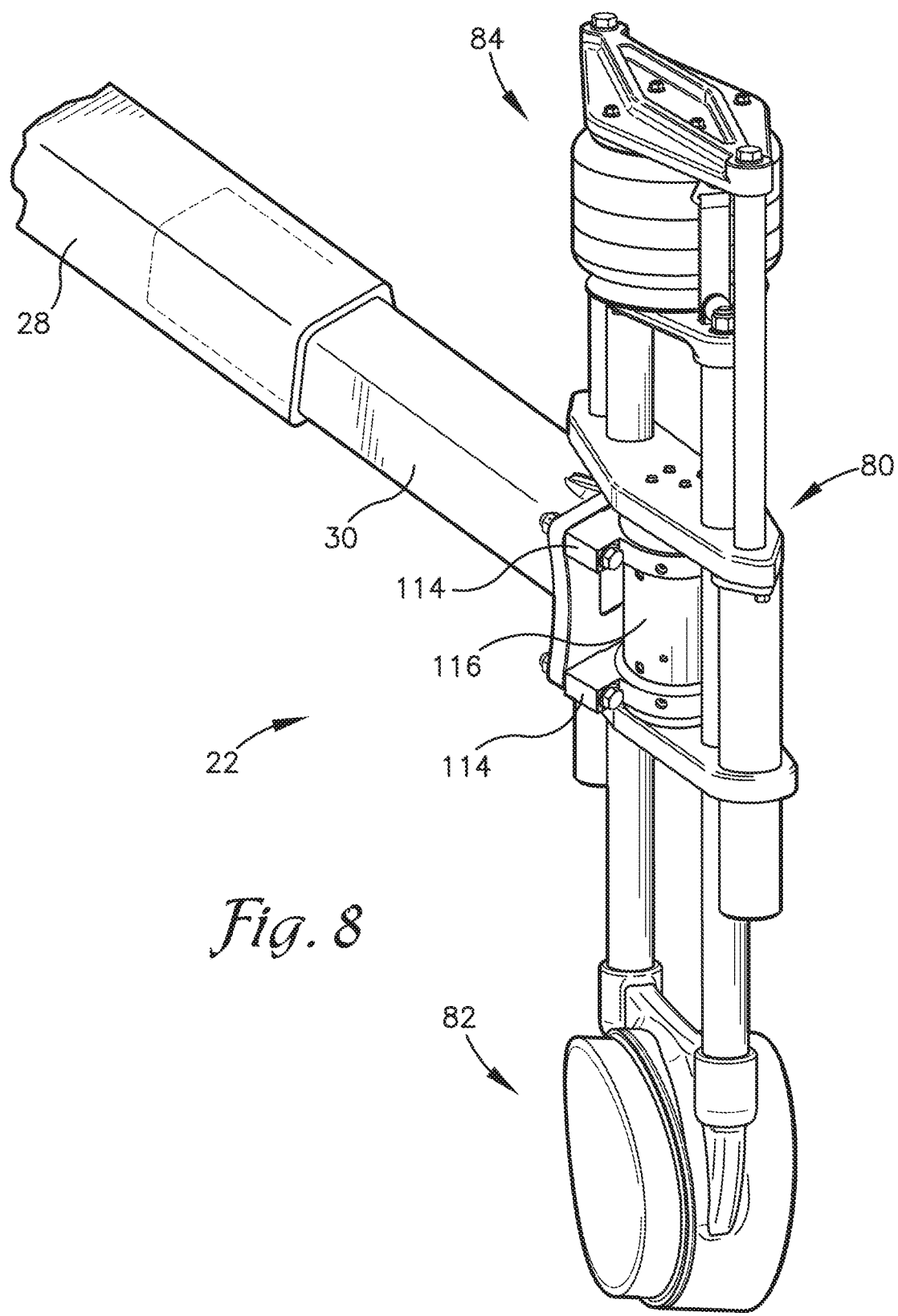

FIG. 8 illustrates the support assembly of FIG. 5 pivoted to a second position relative to the axle.

Figure 9:
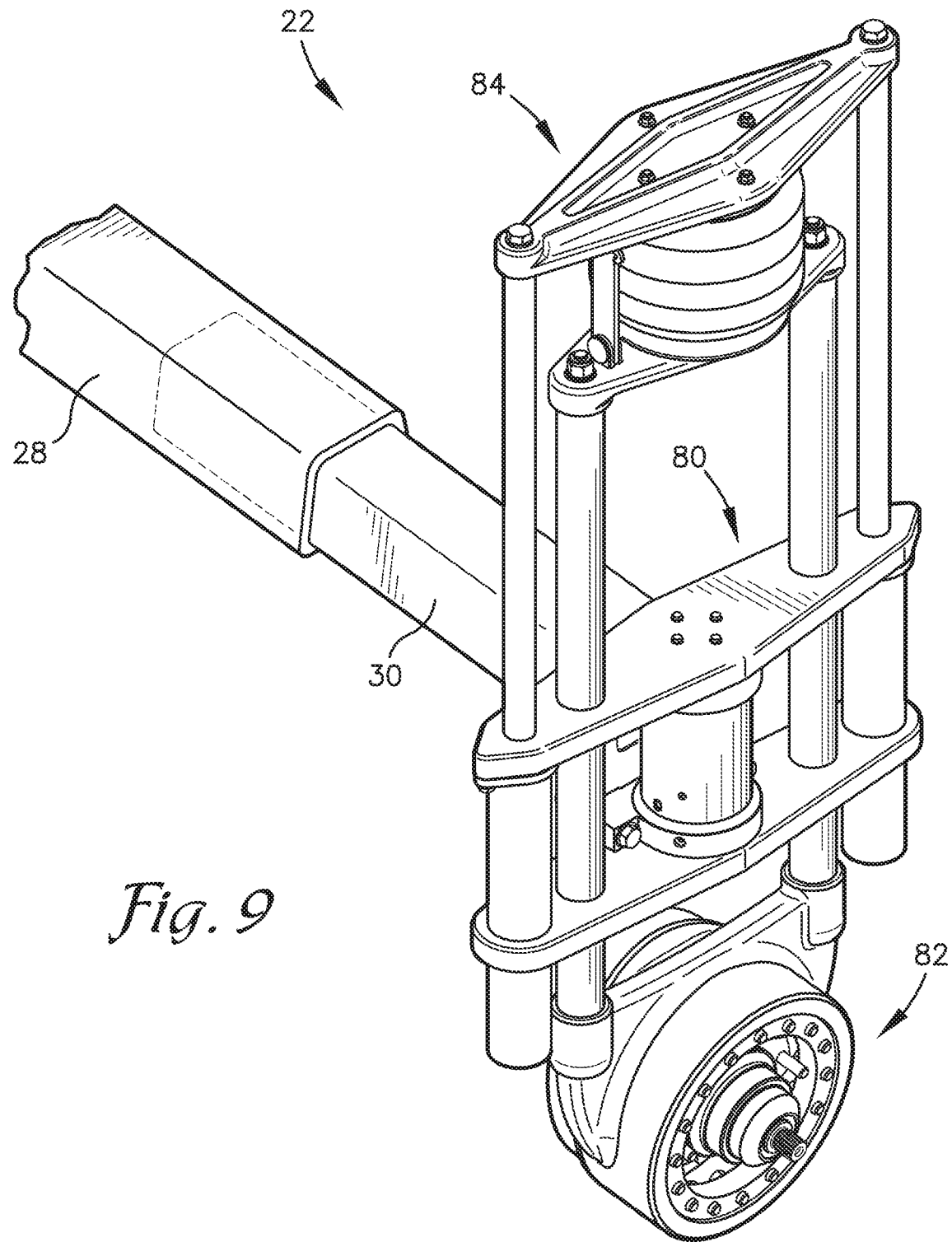

FIG. 9 illustrates the support assembly of FIG. 5 in a first operating position.

Figure 10:
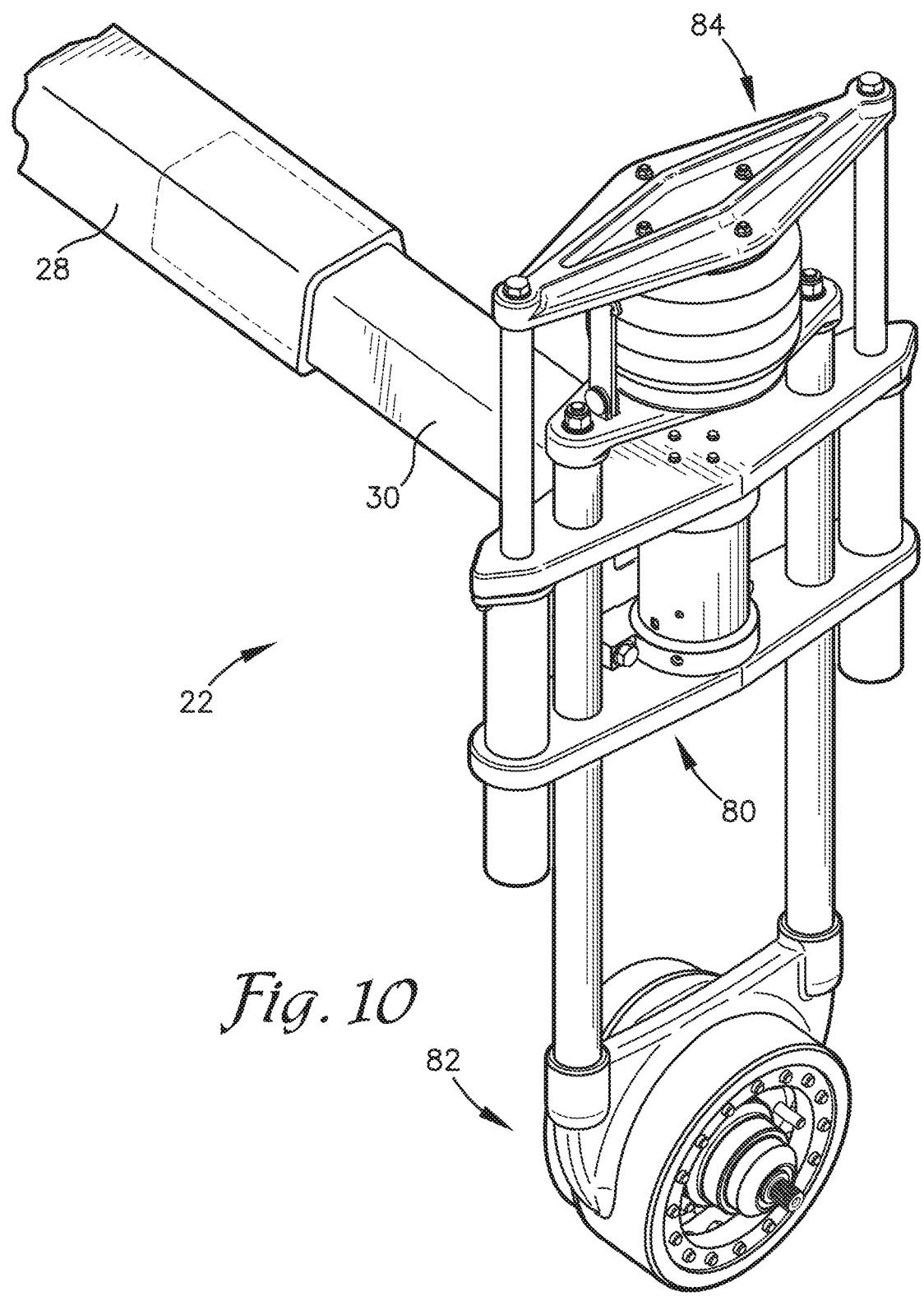

FIG. 10 illustrates the support assembly of FIG. 5 in a second operating position.

Figure 11:
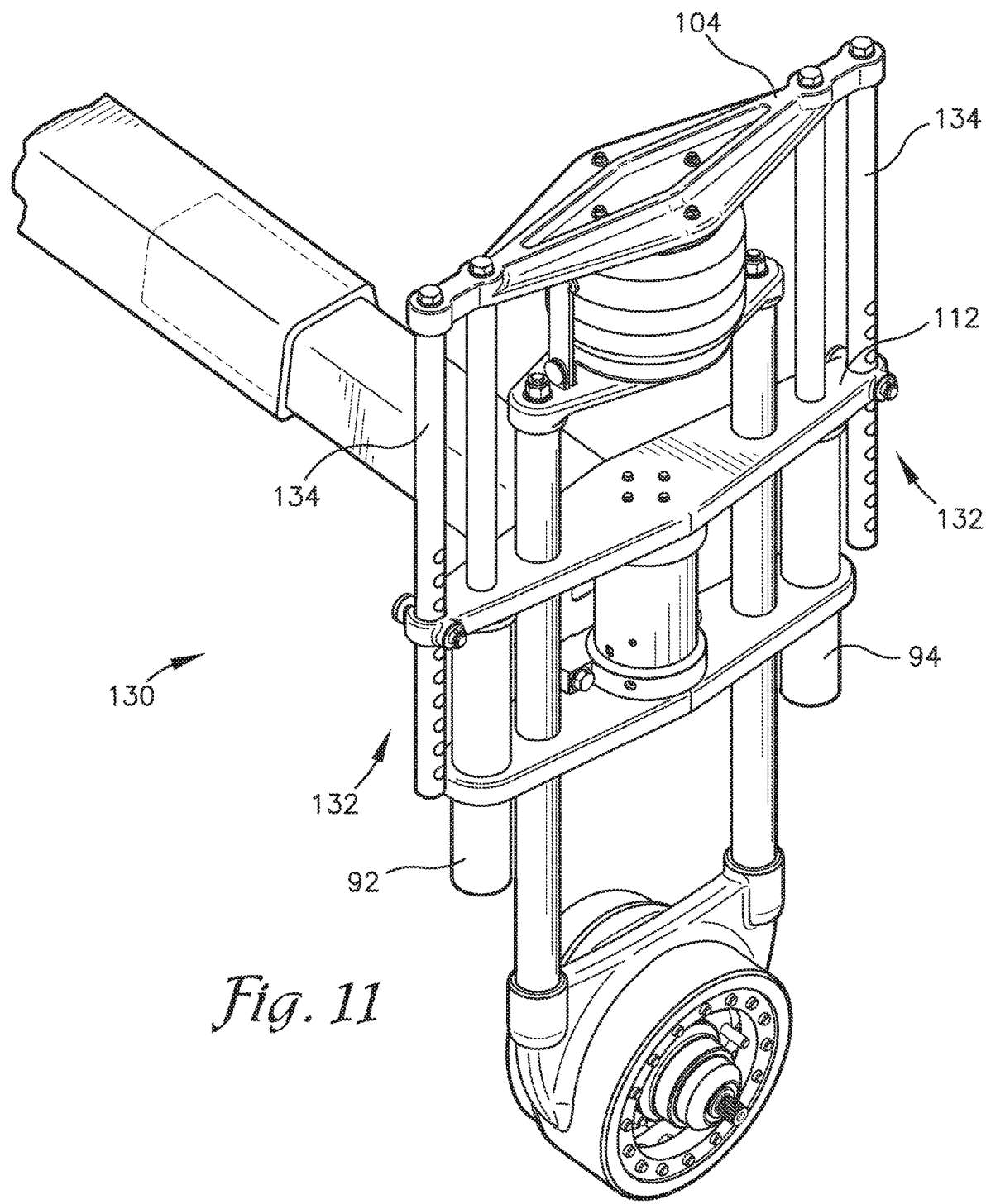

FIG. 11 is a perspective view of a support assembly constructed in accordance with another embodiment of the invention, the assembly being similar to the assembly of FIG. 5 and including a locking mechanism for mechanically locking the assembly into any of a plurality of operating positions.

Figure 12:
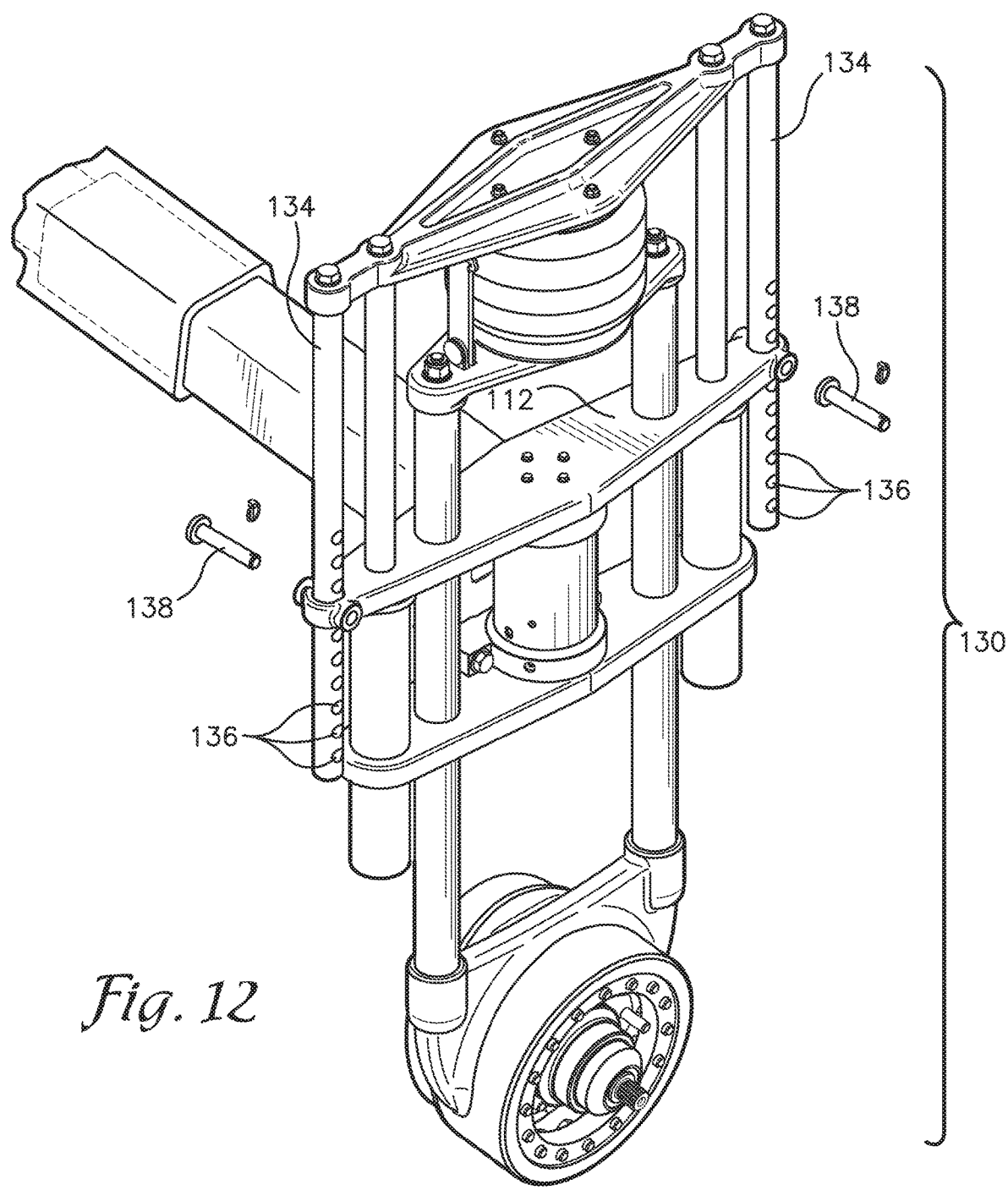

FIG. 12 is a partially exploded perspective view of the support assembly of FIG. 11.

Figure 13:
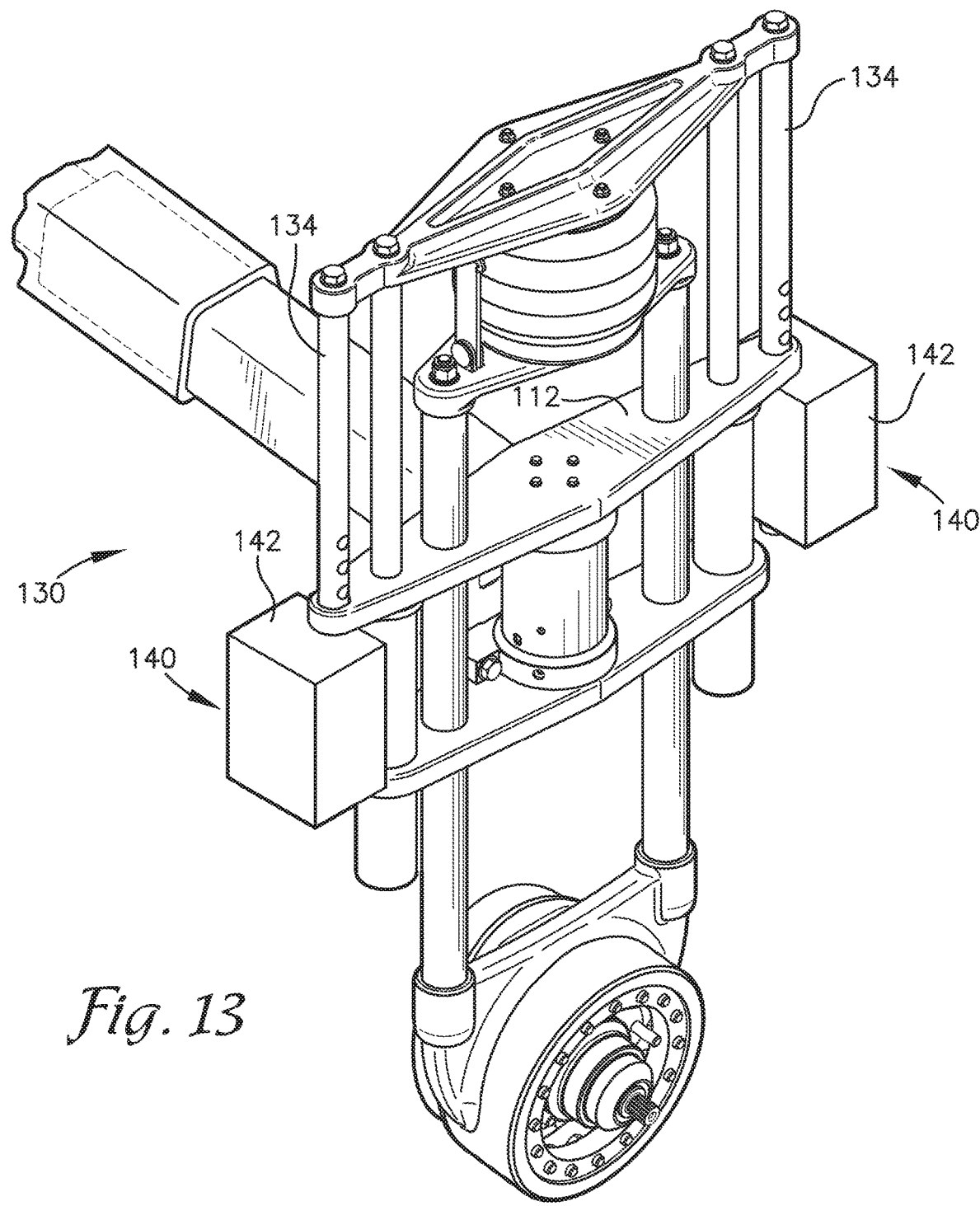

FIG. 13 is a perspective view of a support assembly constructed in accordance with another embodiment of the invention, the assembly being similar to the assembly of FIG. 5 and including a remotely controlled locking mechanism for mechanically locking the assembly into any of a plurality of operating positions.

Figure 14:
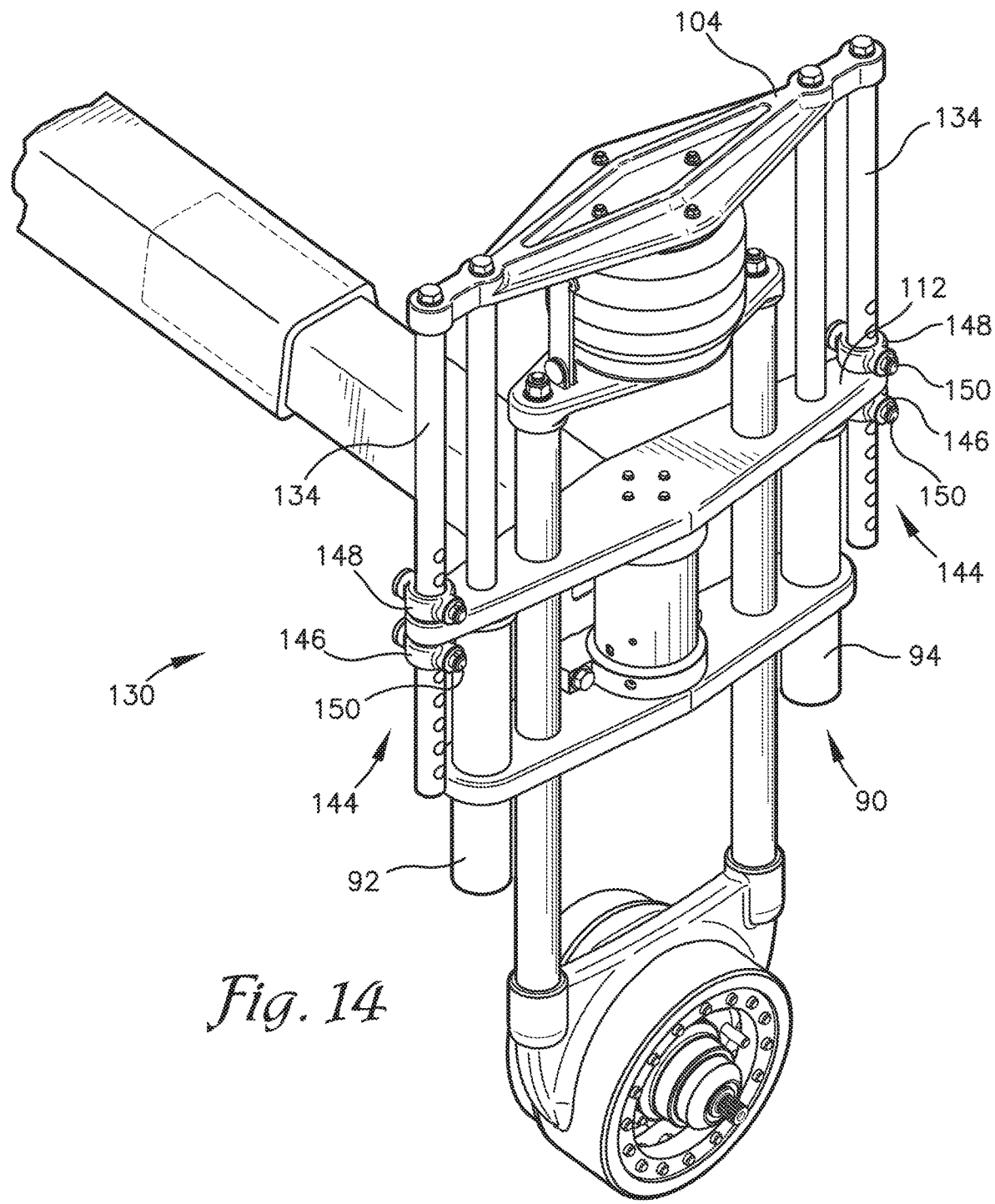

FIG. 14 is a perspective view of a support assembly constructed in accordance with another embodiment of the invention, the assembly being similar to the assembly of FIG. 5 and including a lift-and-set locking mechanism for mechanically locking the assembly into any of a plurality of operating positions.

Figure 15:
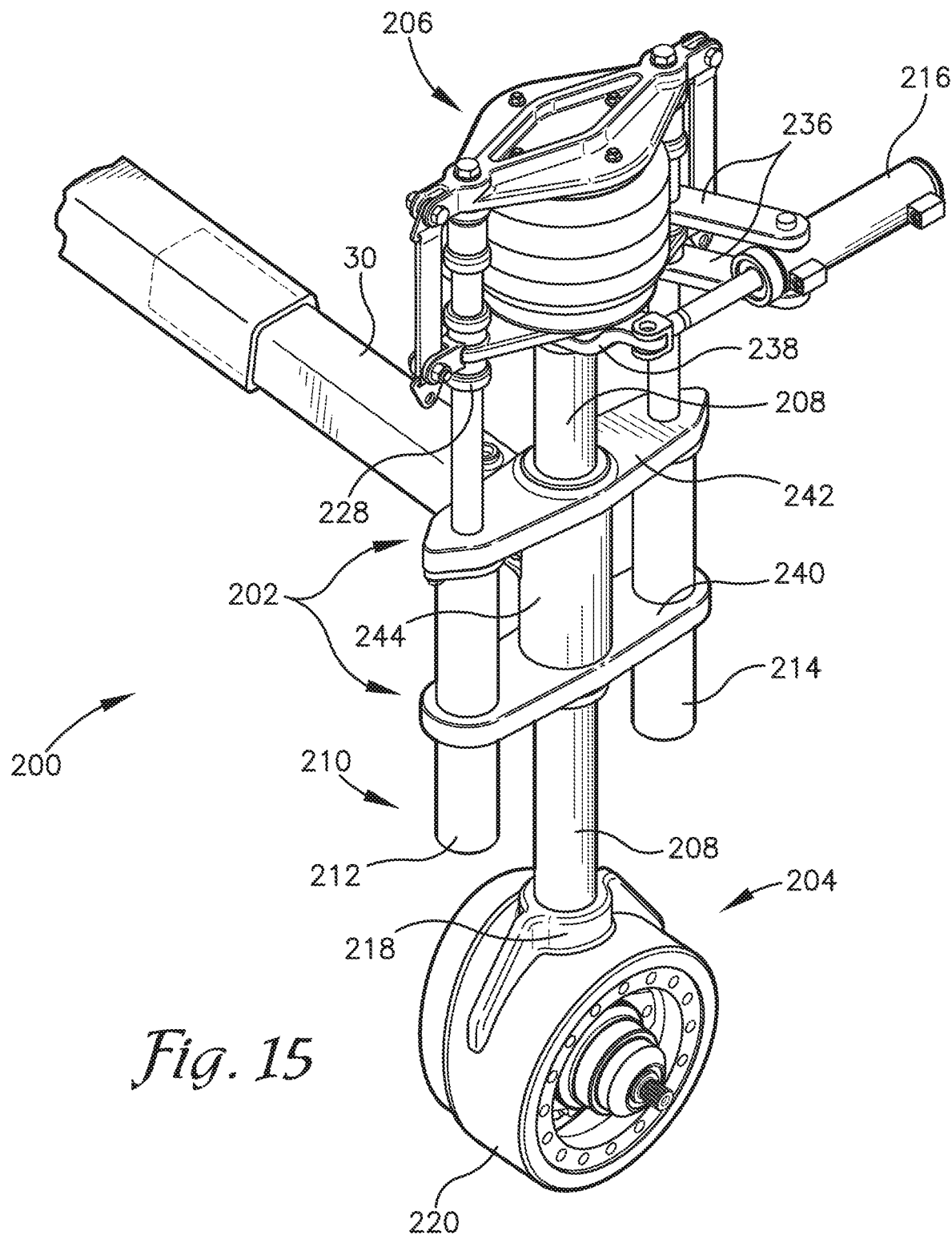

FIG. 15 is an outside perspective view of a support assembly constructed in accordance with another embodiment of the invention.

Figure 16:
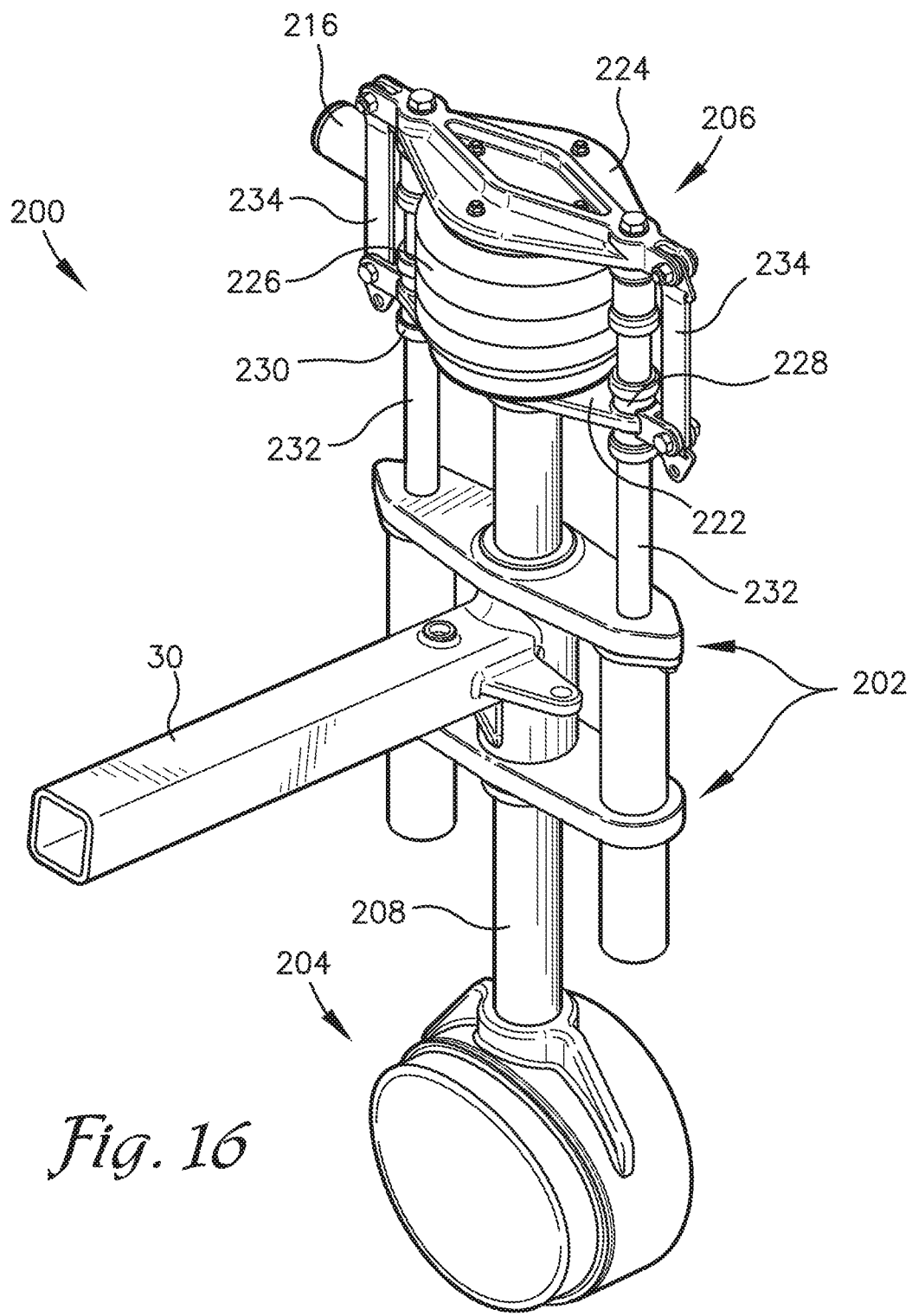

FIG. 16 is an inside perspective view of the support assembly of FIG. 15.

Figure 17:
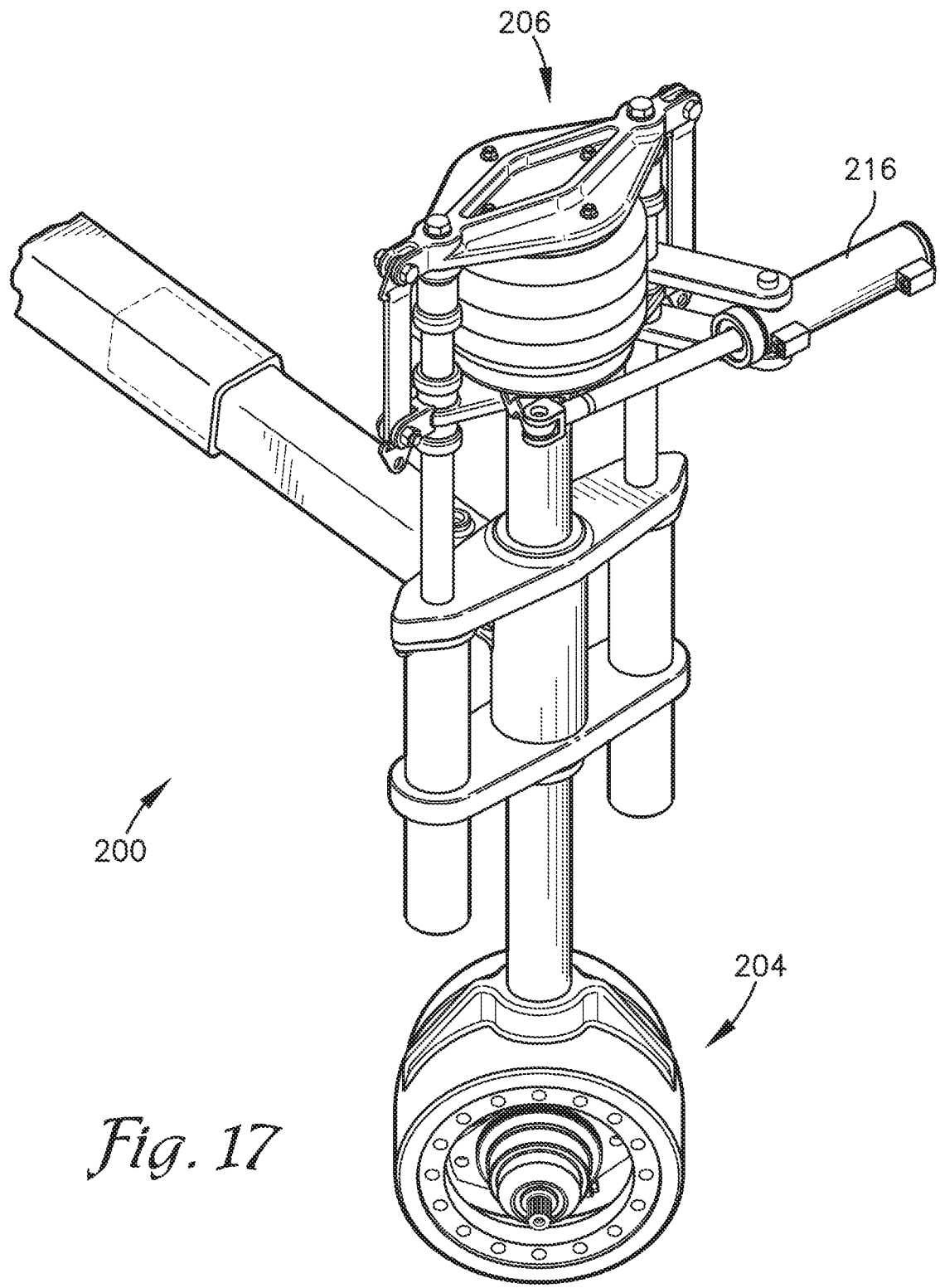

FIG. 17 illustrates a wheel attachment component of the support assembly of FIG. 15 pivoted to a first position relative to an axle of the applicator.

Figure 18:
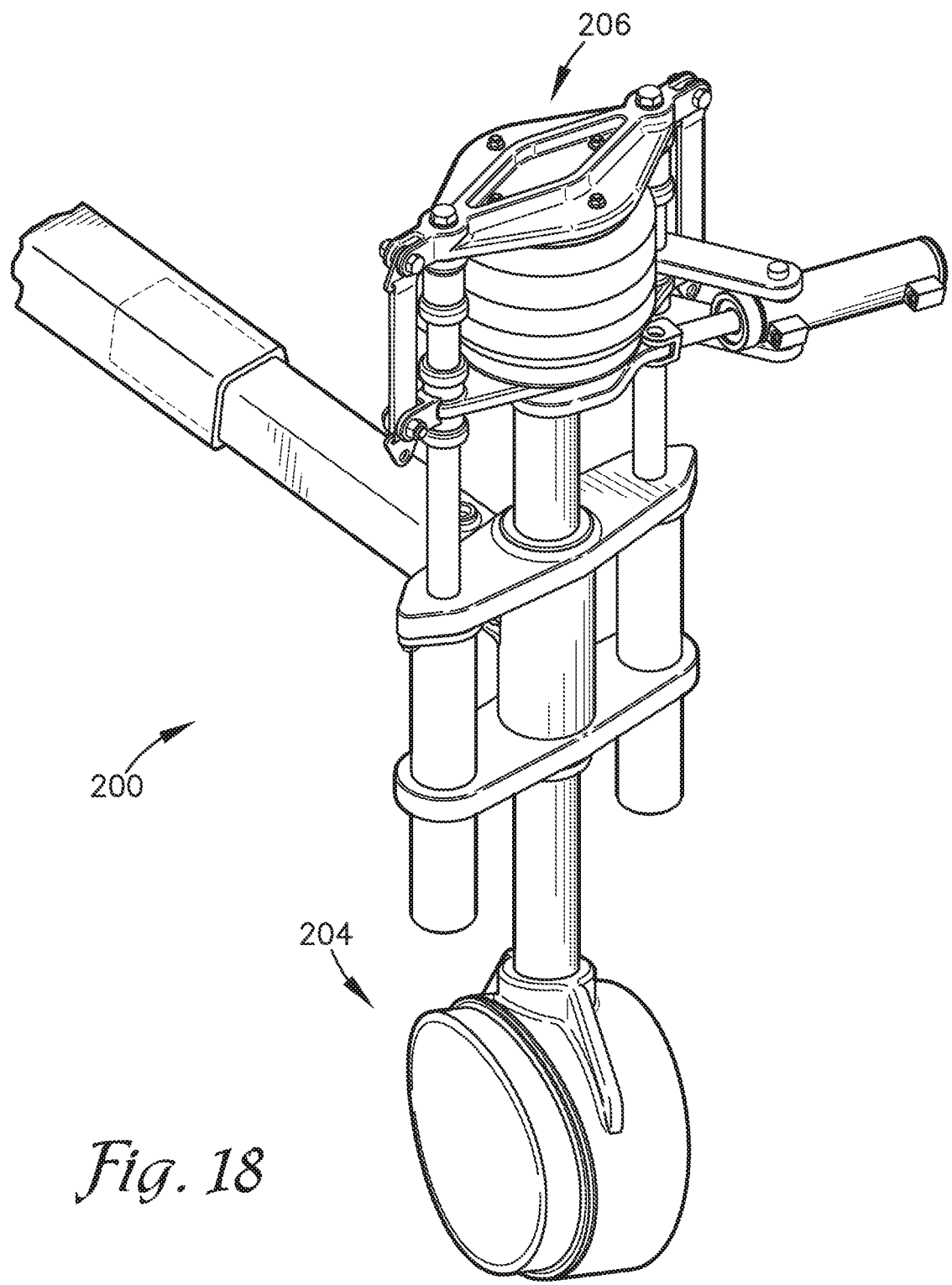

FIG. 18 illustrates the wheel attachment component of the support assembly of FIG. 15 pivoted to a second position relative to the axle.

Figure 19:
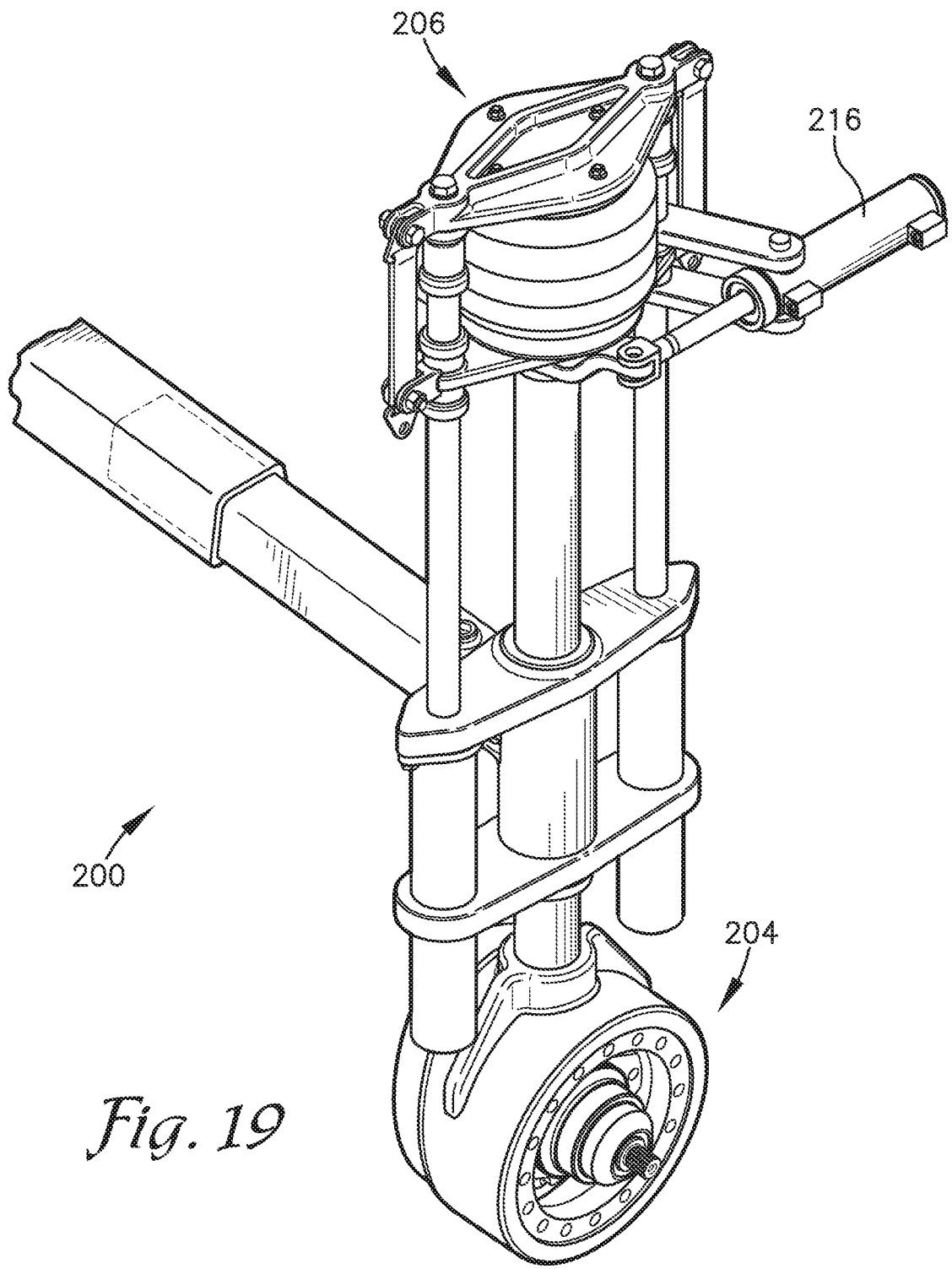

FIG. 19 illustrates the support assembly of FIG. 15 in a first operating position.

Figure 20:
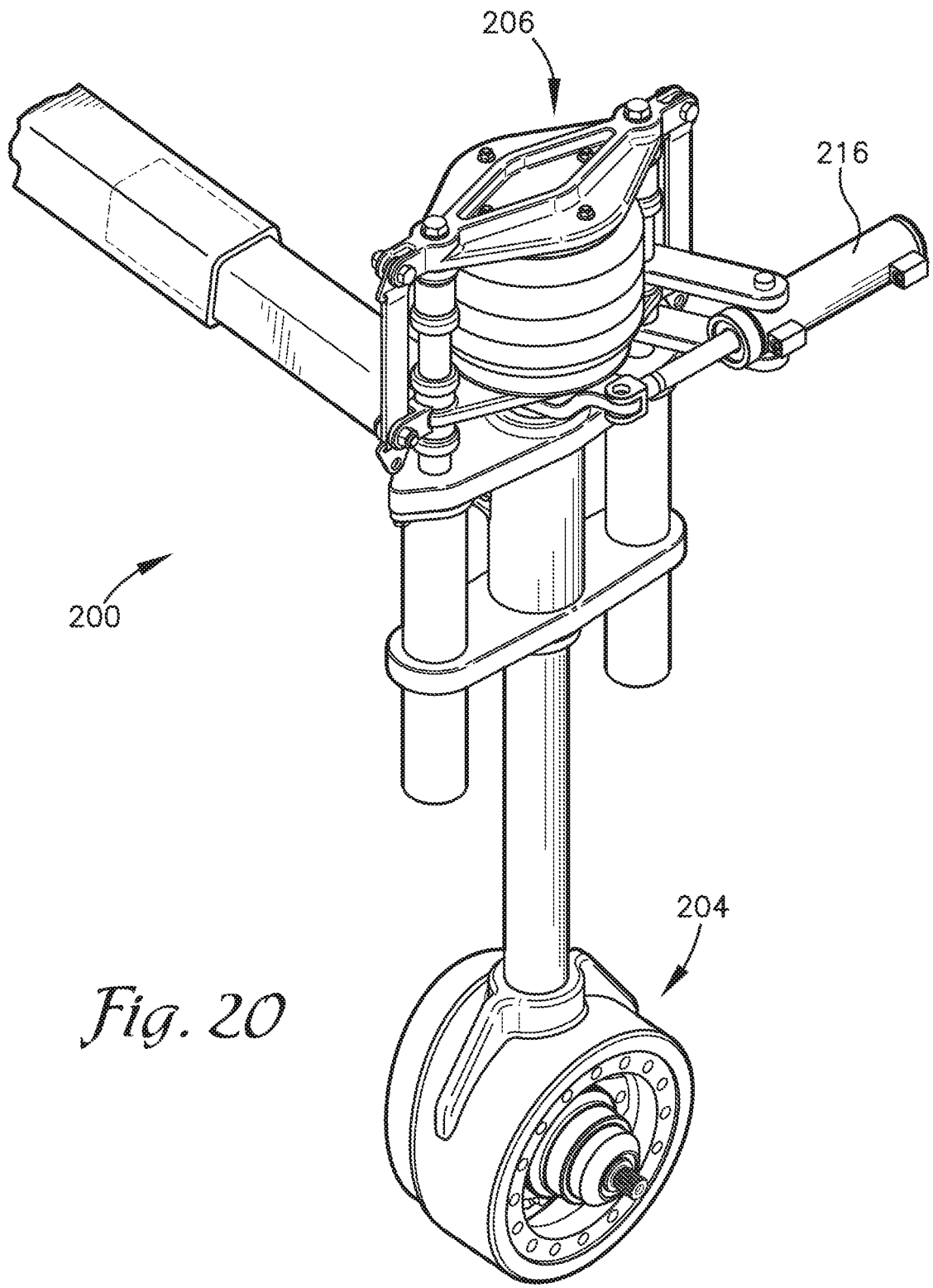

FIG. 20 illustrates the support assembly of FIG. 15 in a second operating position.

Figure 21:
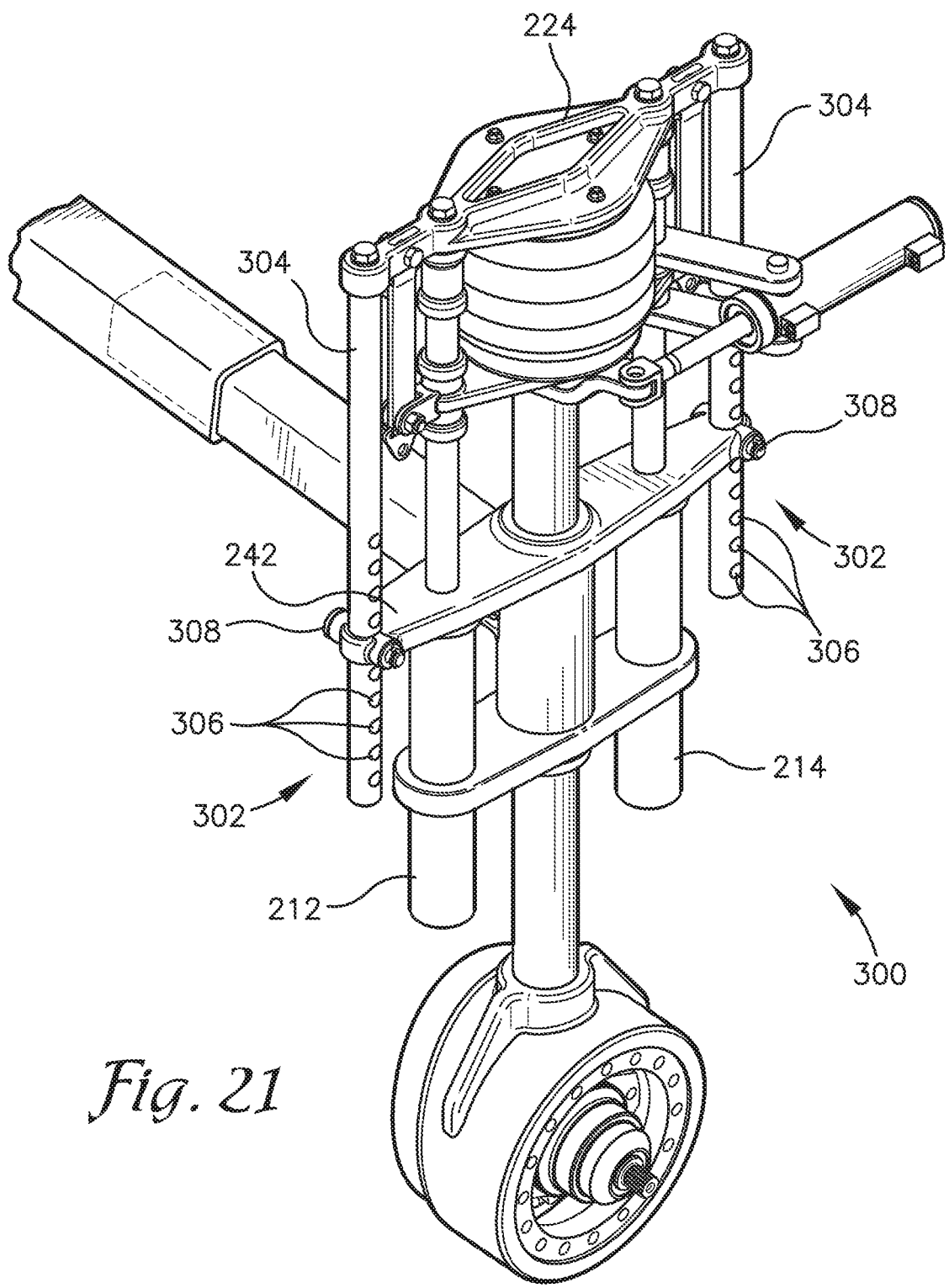

FIG. 21 is a perspective view of a support assembly constructed in accordance with another embodiment of the invention, the assembly being similar to the assembly of FIG. 15 and including a locking mechanism for mechanically locking the assembly into any of a plurality of operating positions.

Figure 22:
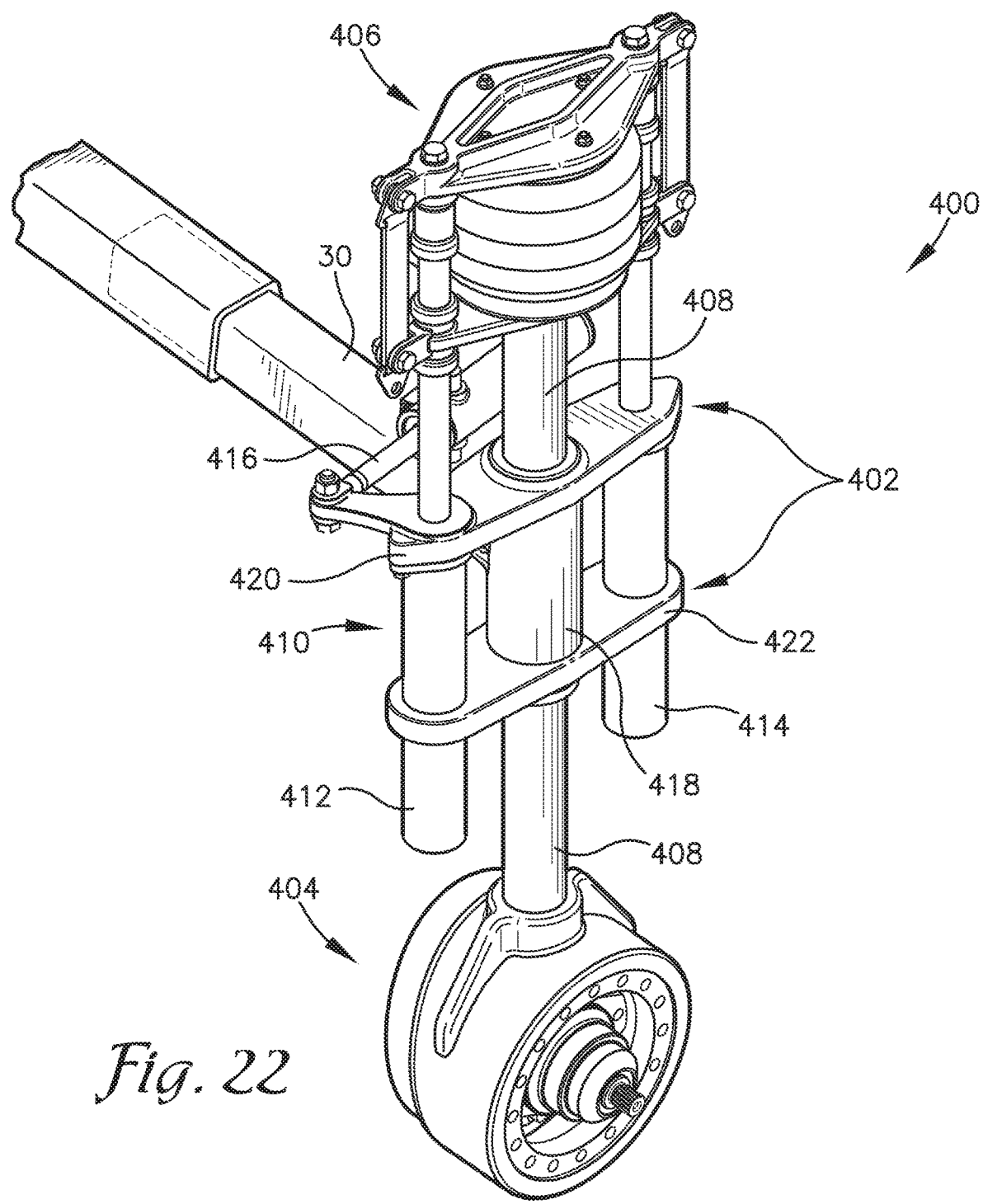

FIG. 22 is an outside perspective view of a support assembly constructed in accordance with another embodiment of the invention.

Figure 23:
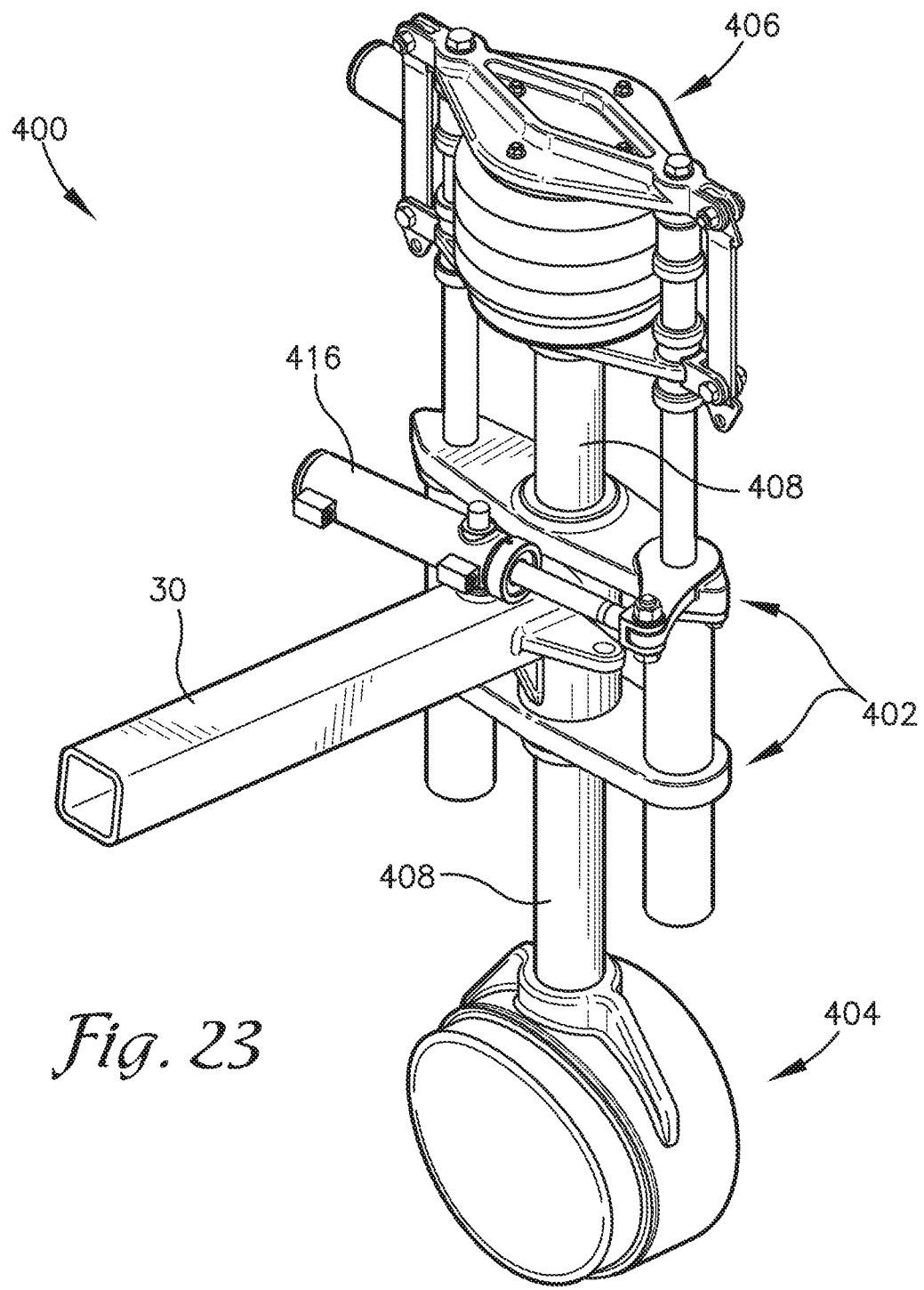

FIG. 23 is in inside perspective view of the support assembly of FIG. 22.

Figure 24:
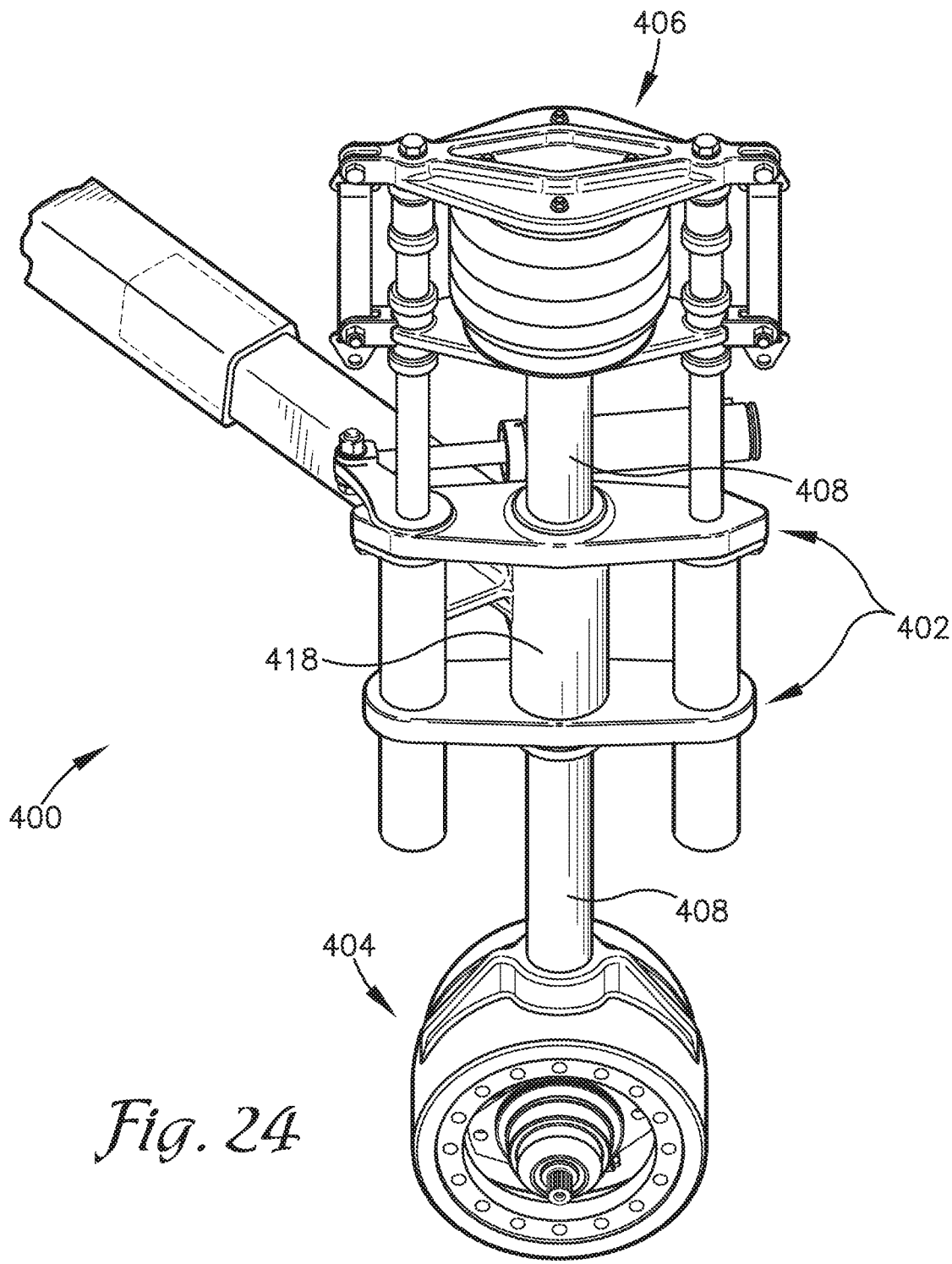

FIG. 24 illustrates the support assembly of FIG. 22 pivoted to a first position relative to an axle of the applicator.

Figure 25:
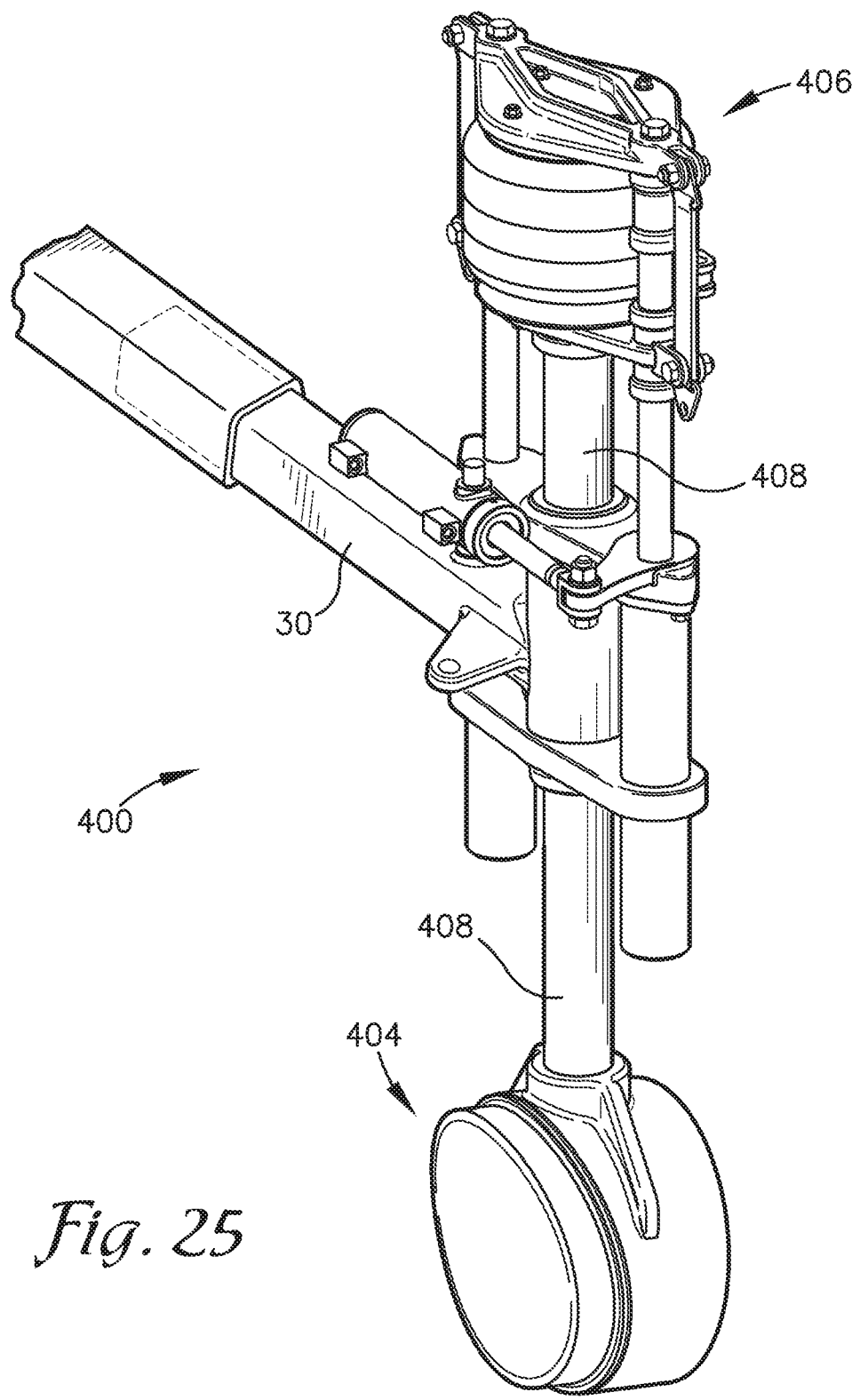

FIG. 25 illustrates the support assembly of FIG. 22 pivoted to a second position relative to the axle.

Figure 26:
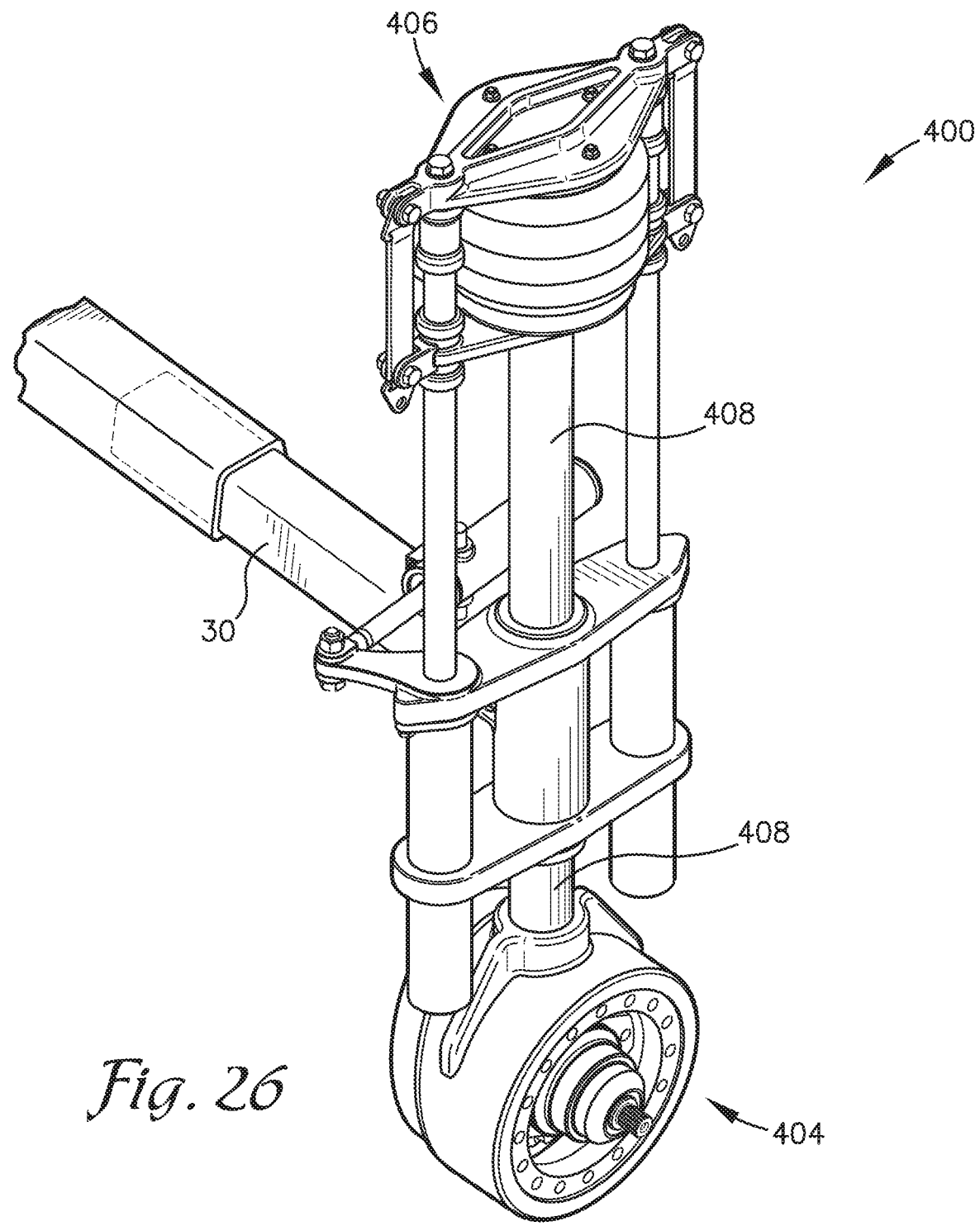

FIG. 26 illustrates the support assembly of FIG. 22 in a first operating position.

Figure 27:
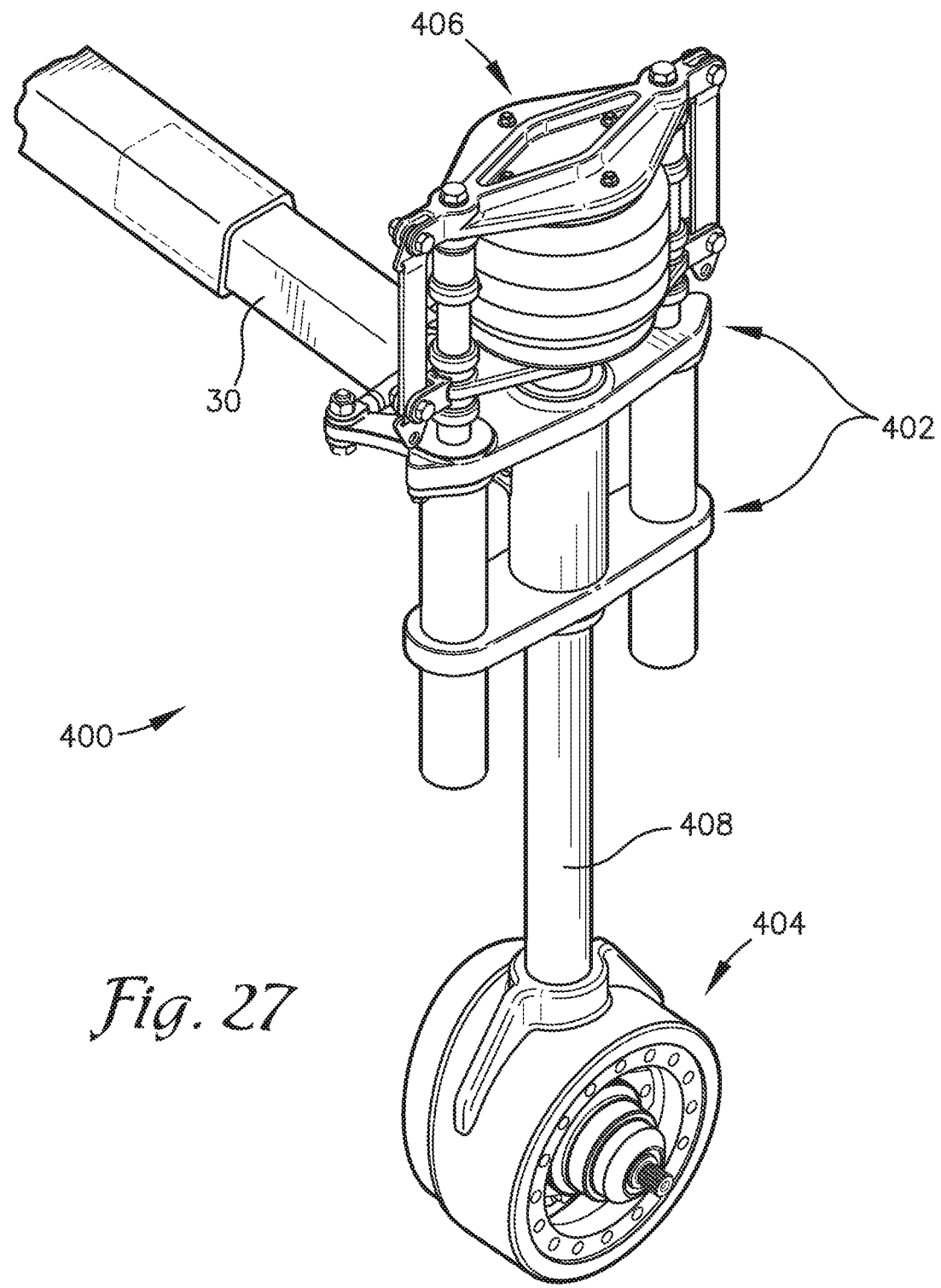

FIG. 27 illustrates the support assembly of FIG. 22 in a second operating position.

Figure 28:
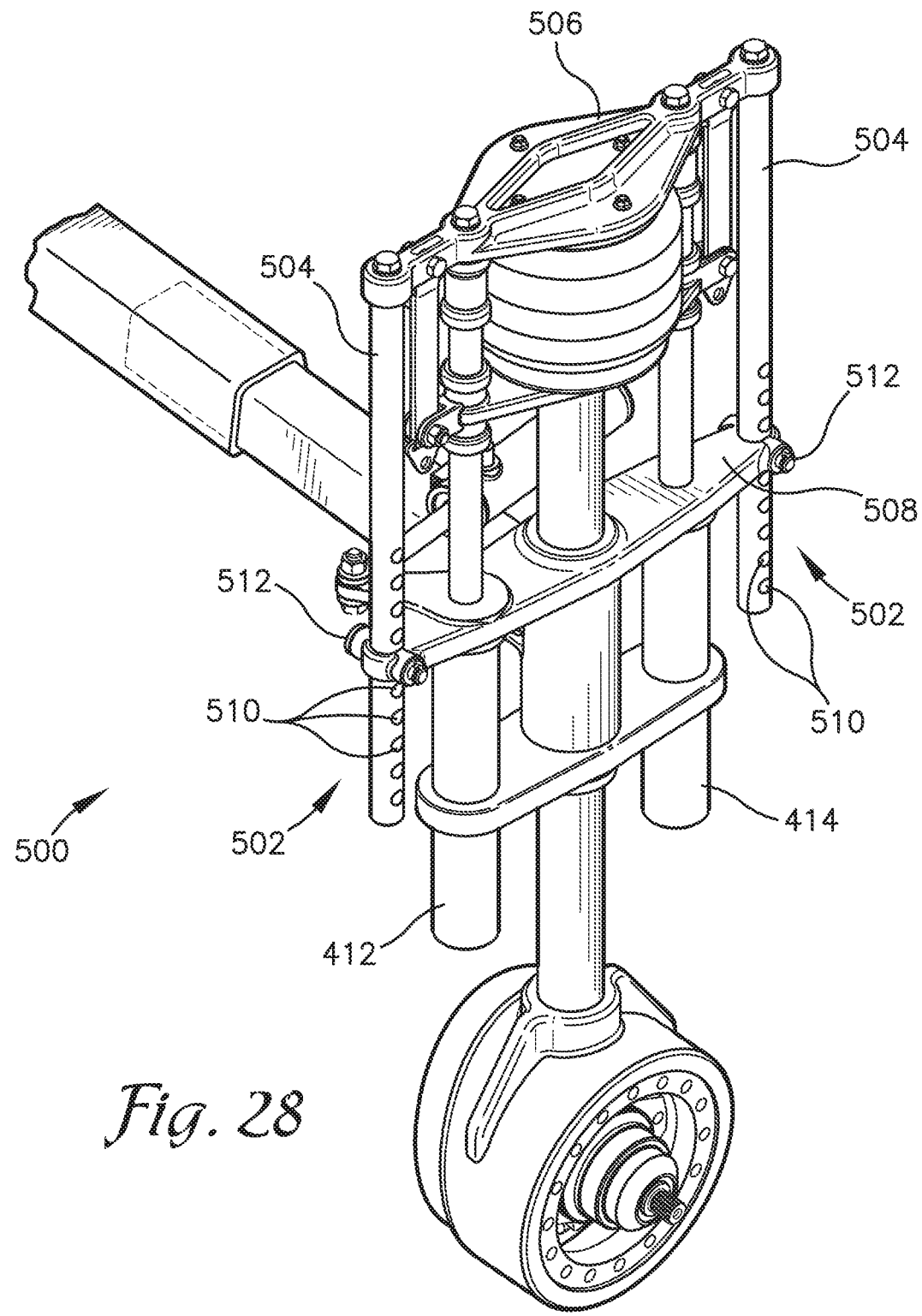

FIG. 28 is a perspective view of a support assembly constructed in accordance with another embodiment of the invention, the assembly being similar to the assembly of FIG. 22 and including a locking mechanism for mechanically locking the assembly into any of a plurality of operating positions.

Figure 29:
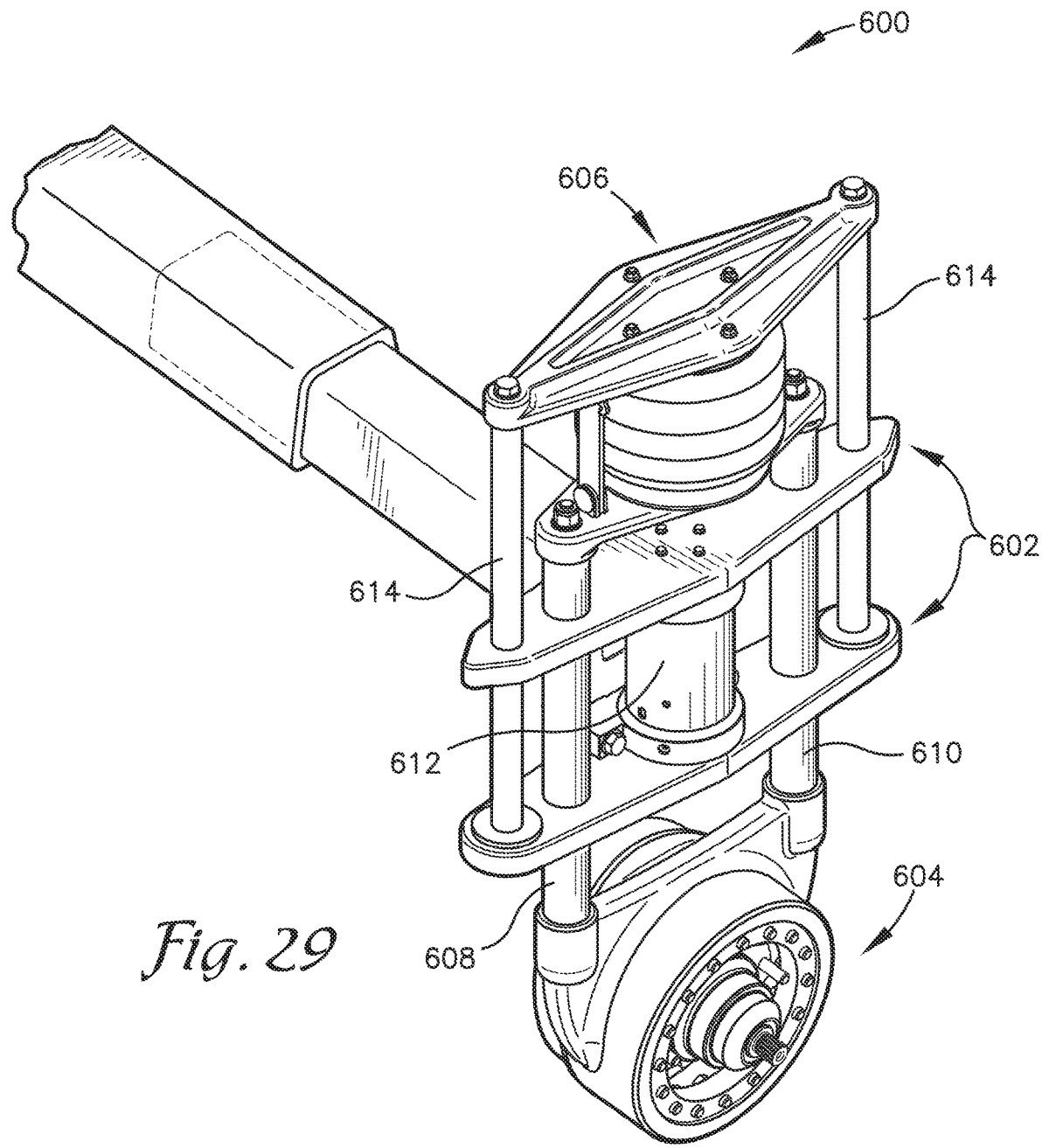

FIG. 29 is an outside perspective view of a support assembly constructed in accordance with another embodiment of the invention.

Figure 30:
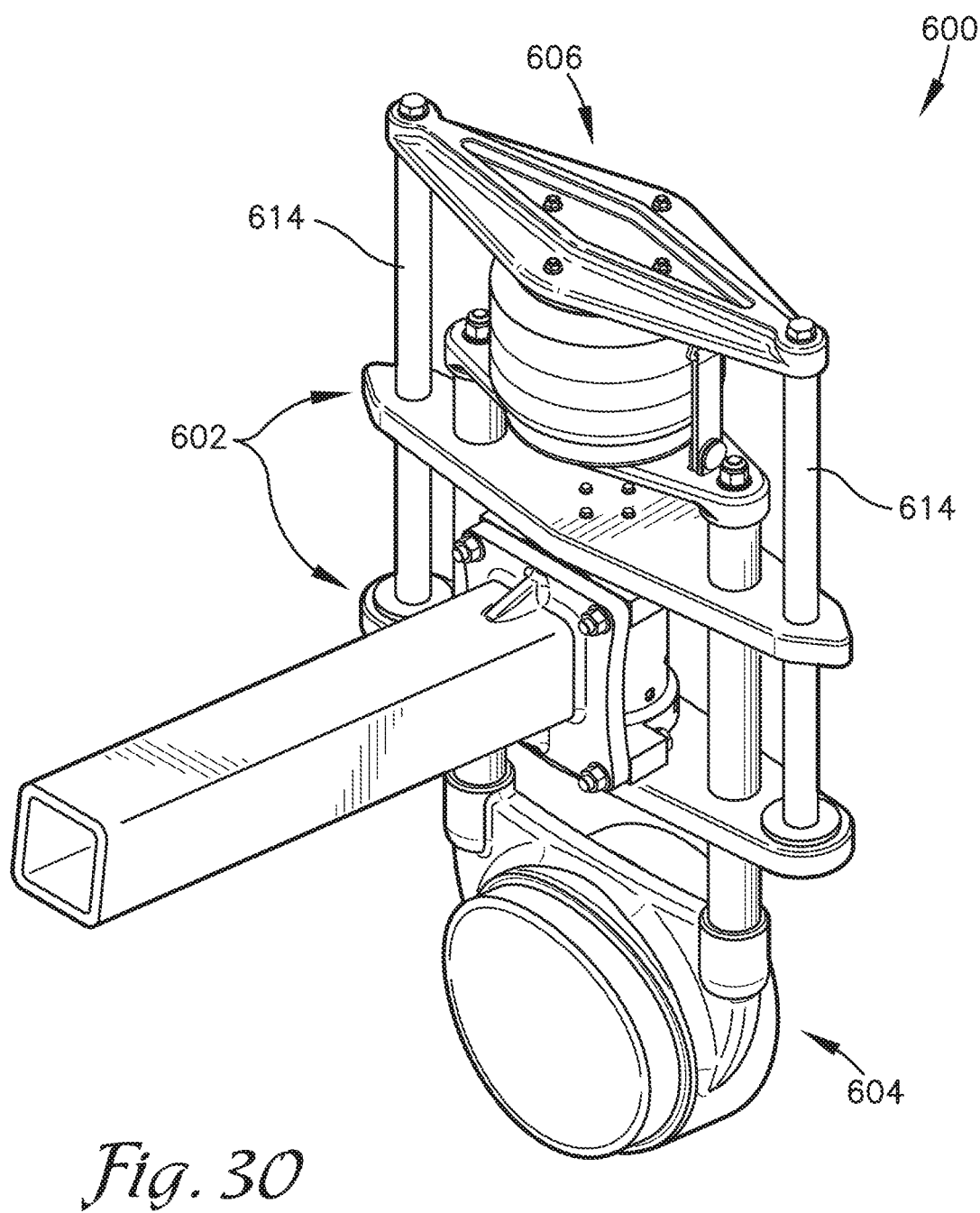

FIG. 30 is an inside perspective view of the support assembly of FIG. 29.

Figure 31:
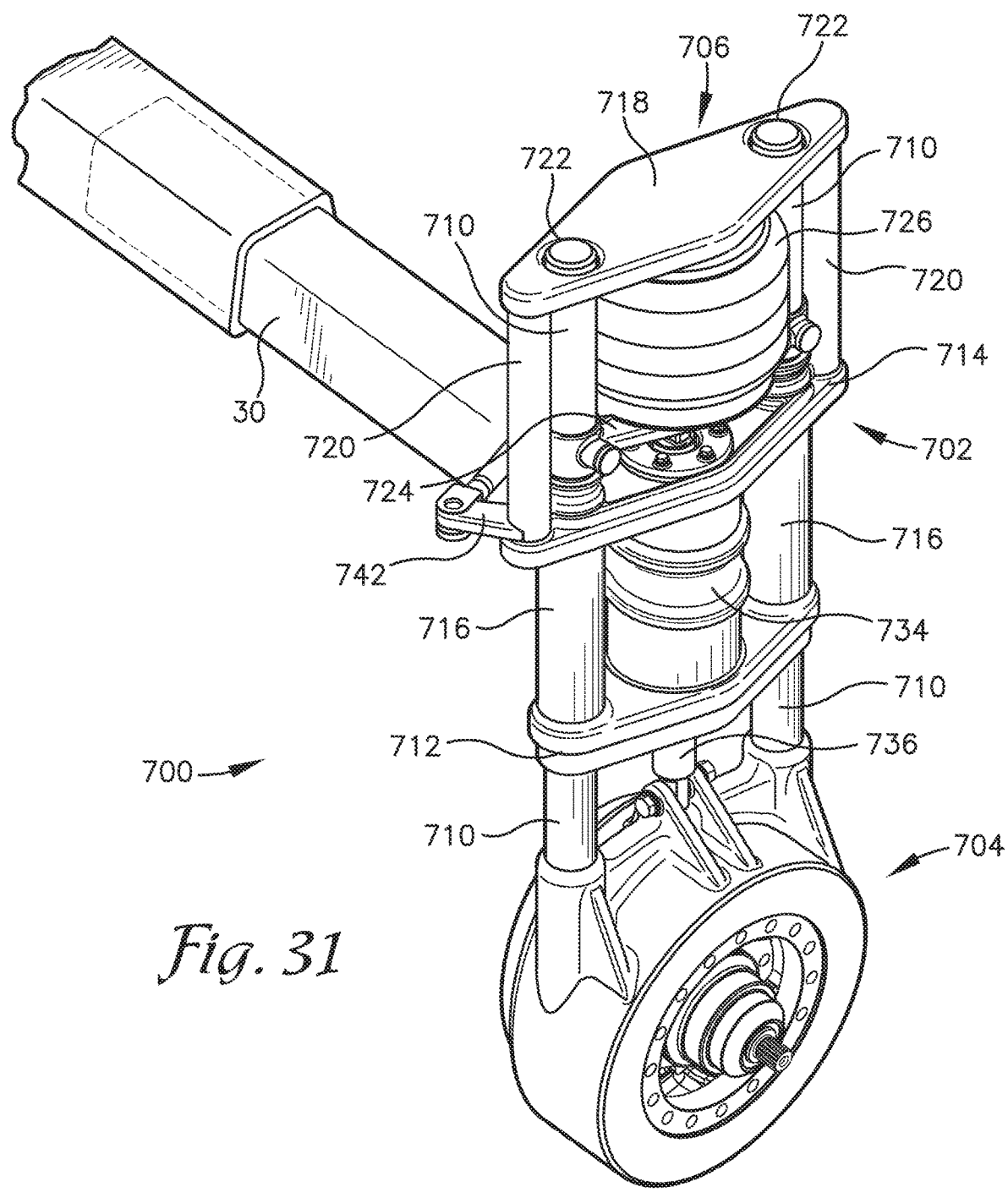

FIG. 31 is an outside perspective view of a support assembly constructed in accordance with another embodiment of the invention.

Figure 32:
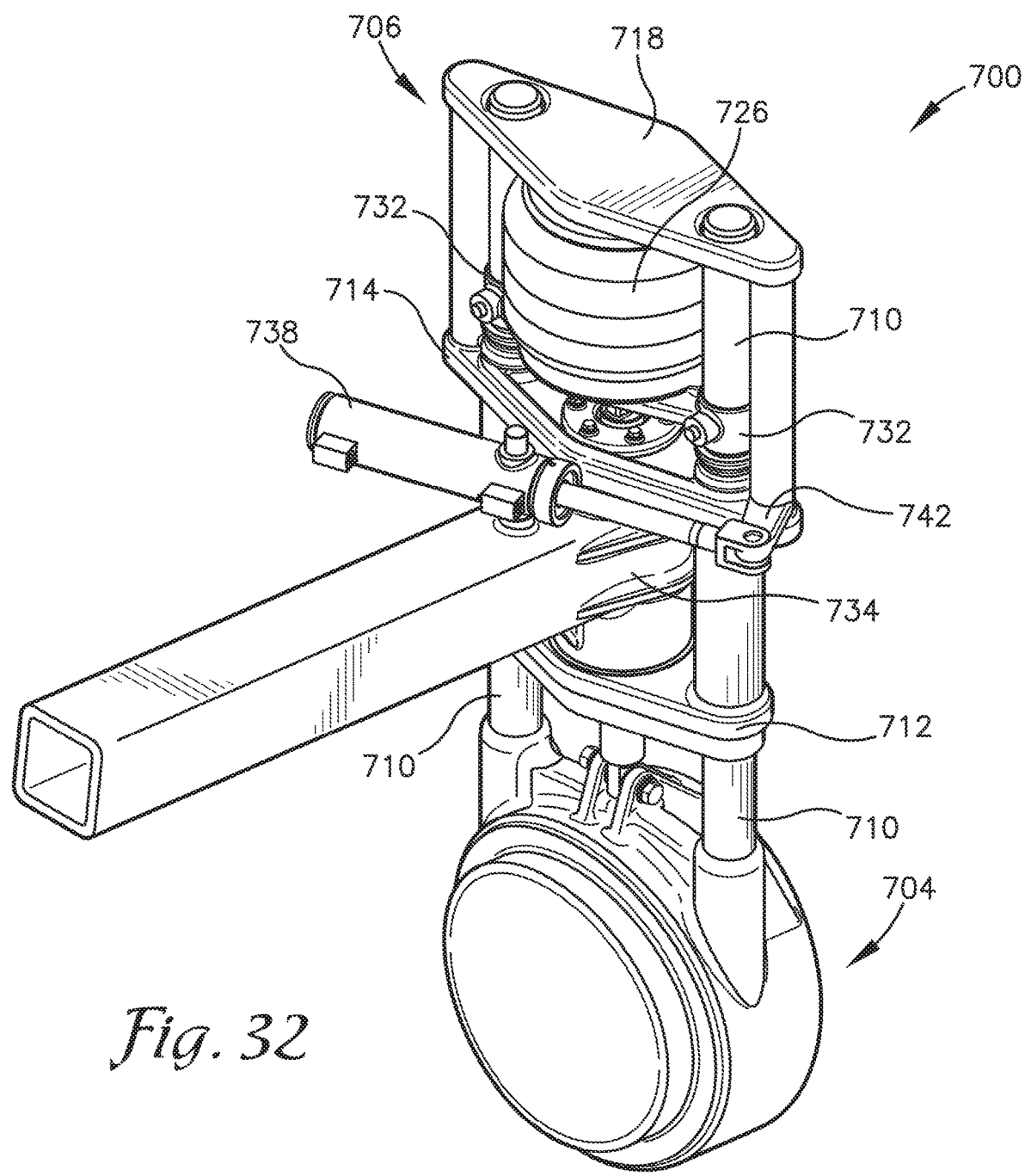

FIG. 32 is an inside perspective view of the support assembly of FIG. 31.

Figure 33:
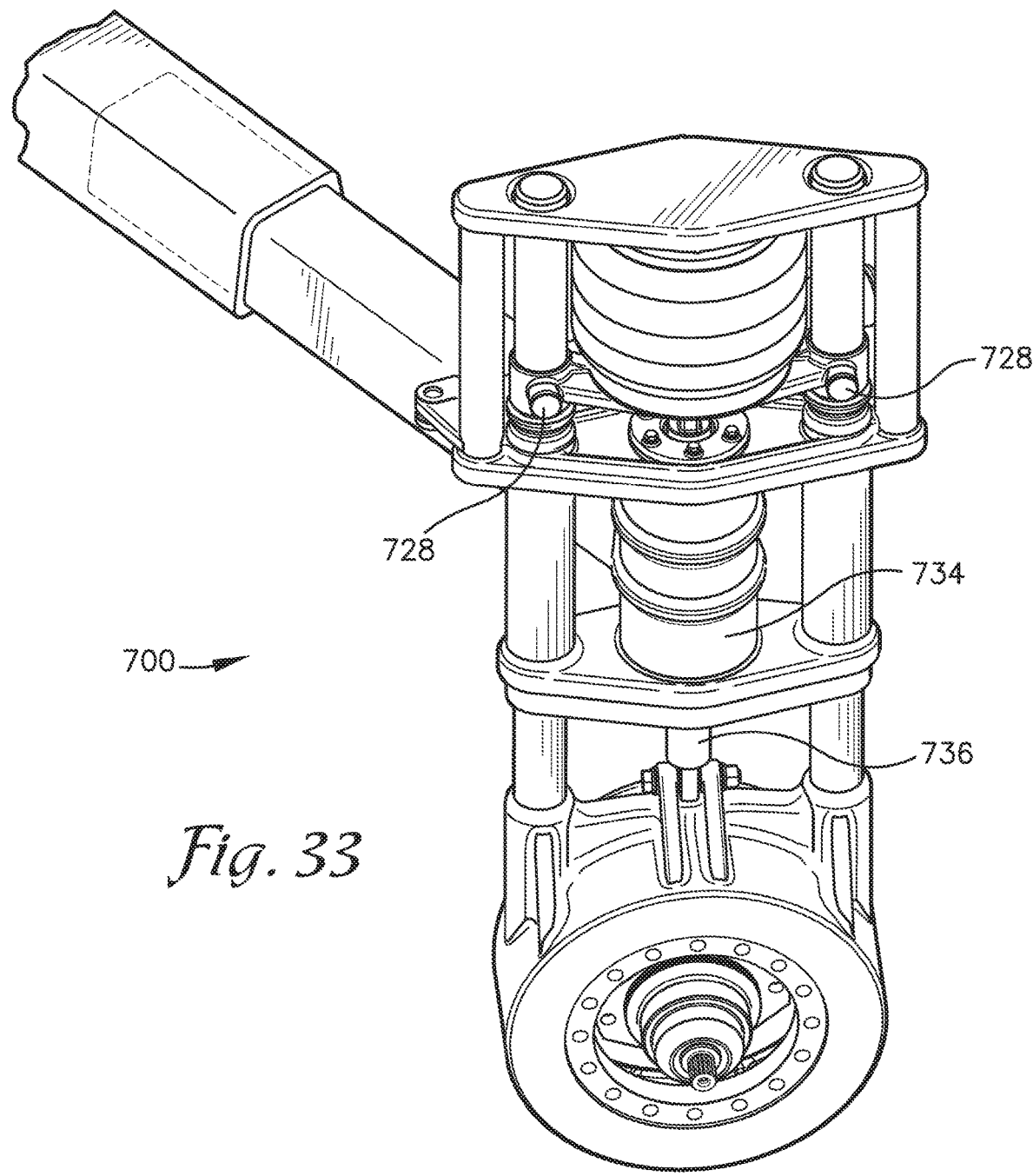

FIG. 33 illustrates the support assembly of FIG. 31 pivoted to a first position relative to an axle of the applicator.

Figure 34:
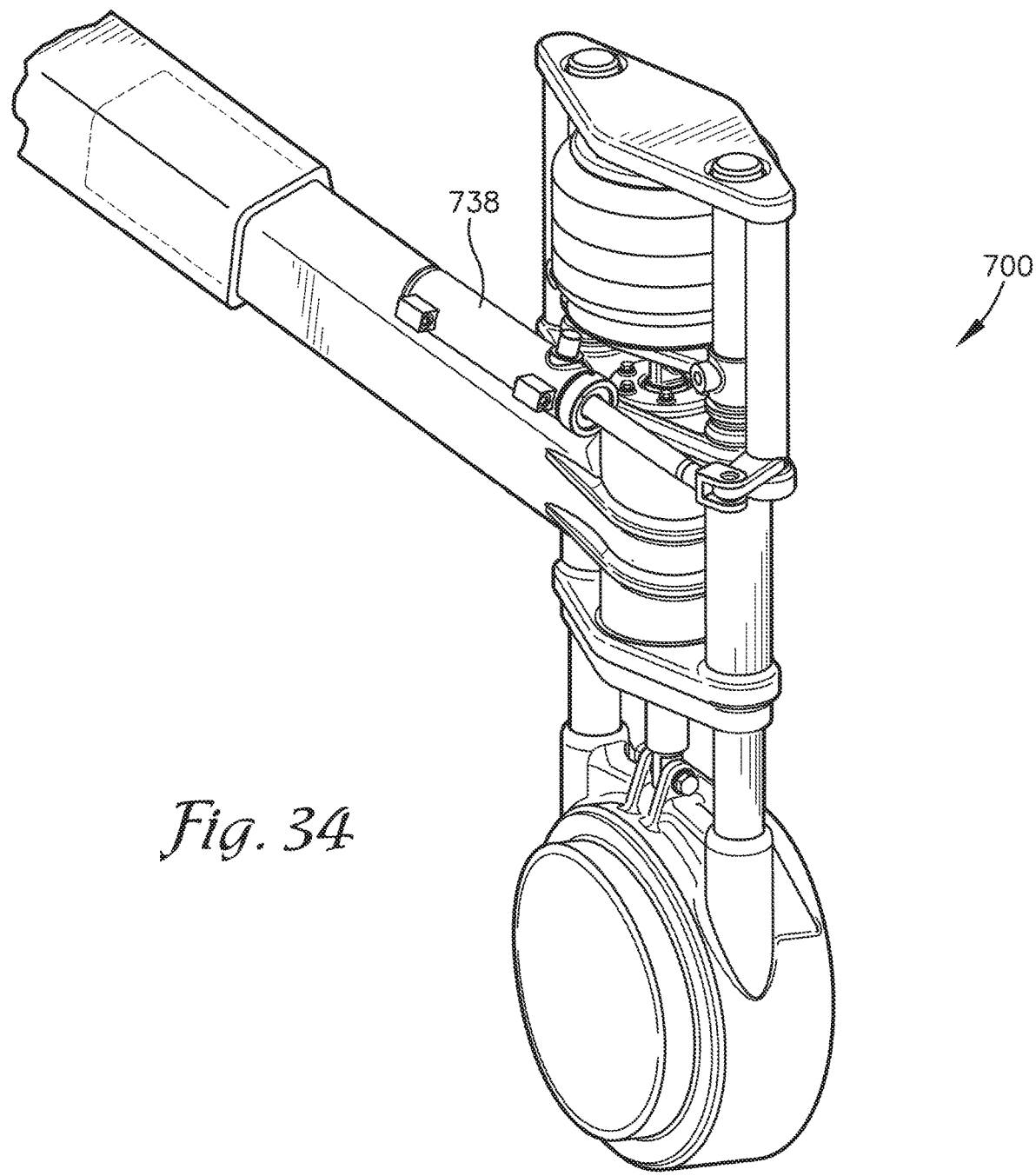

FIG. 34 illustrates the support assembly of FIG. 31 pivoted to a second position relative to the axle.

Figure 35:
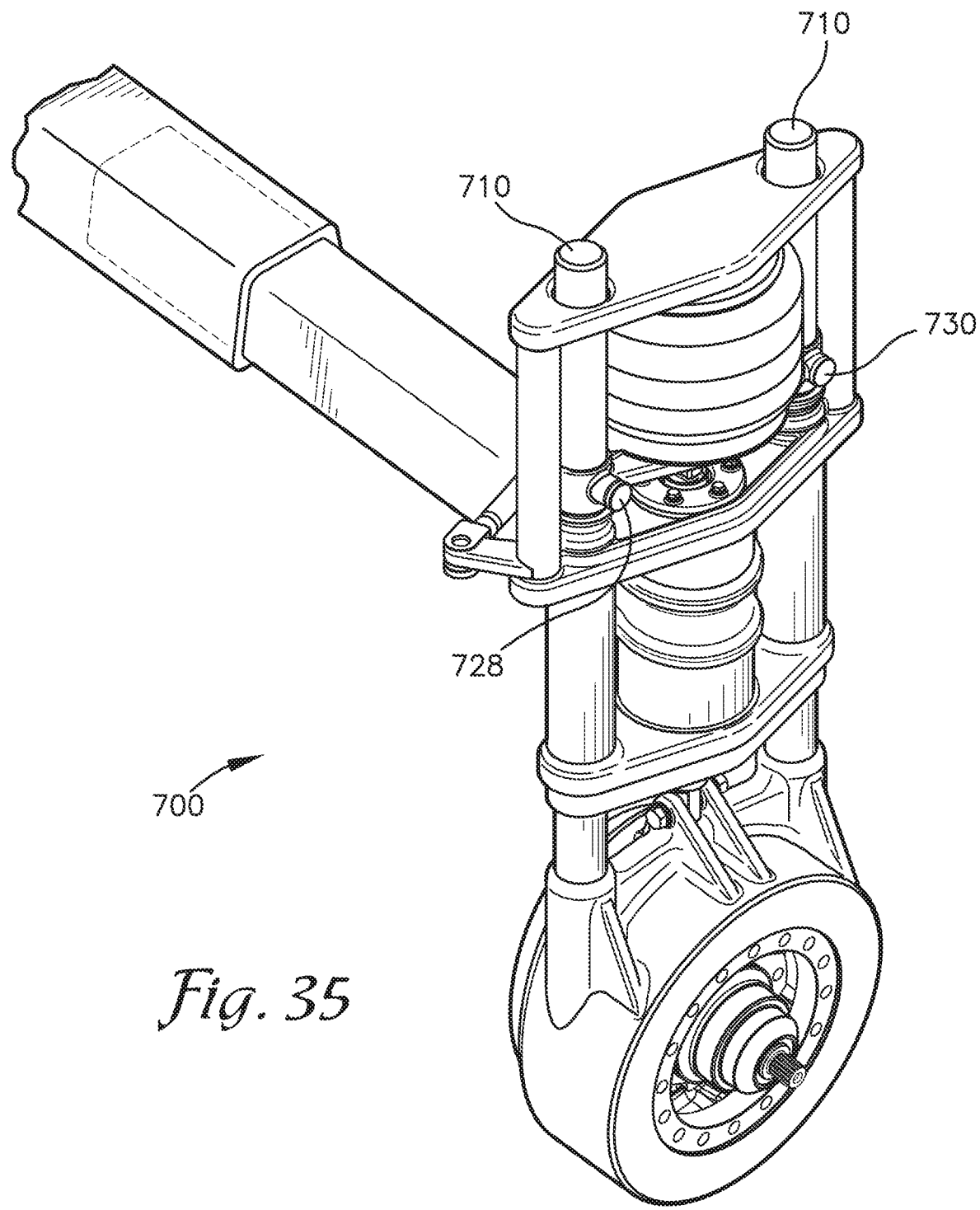

FIG. 35 illustrates the support assembly of FIG. 31 in a first operating position.

Figure 36:
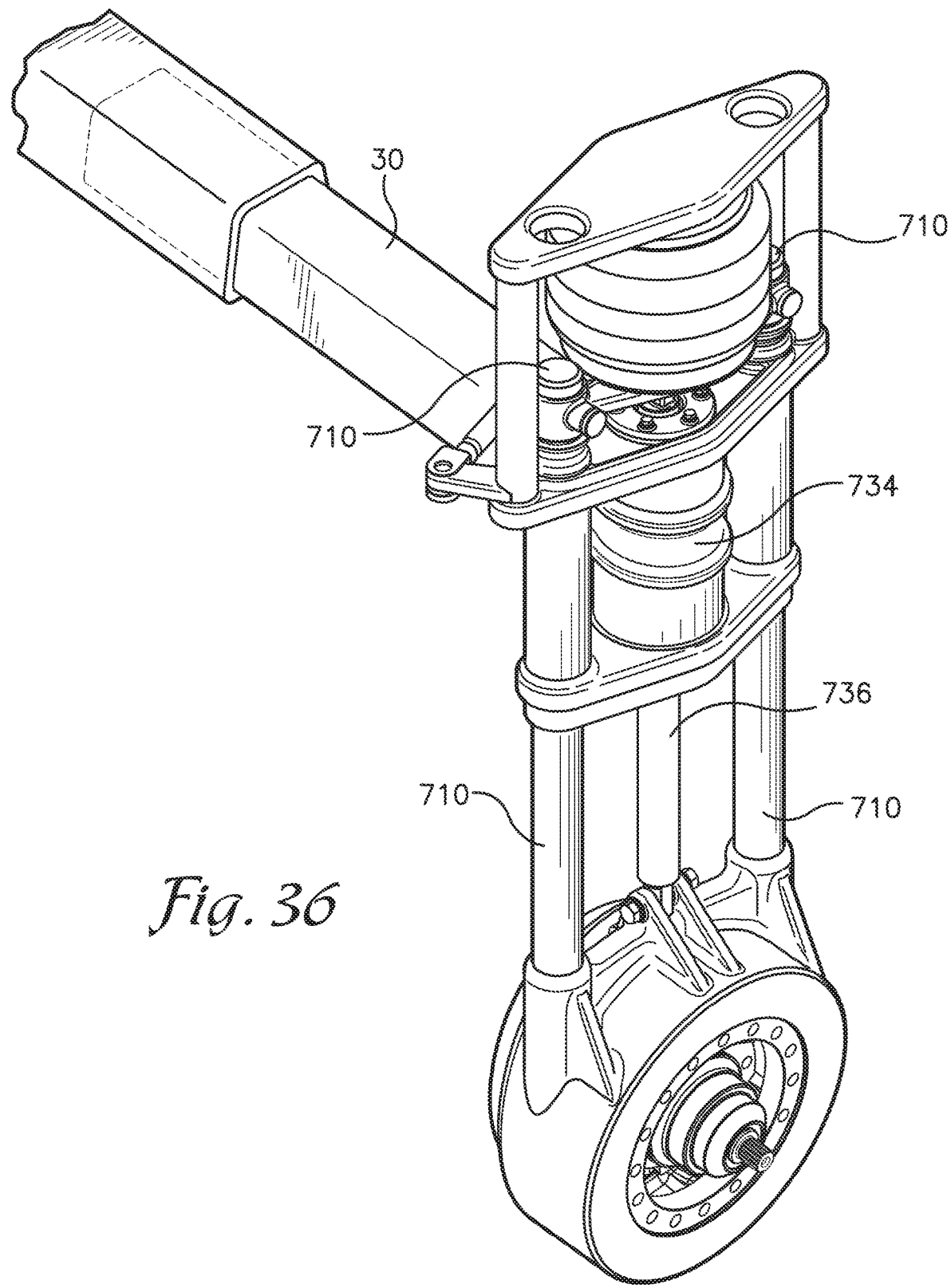

FIG. 36 illustrates the support assembly of FIG. 31 in a second operating position.

Figure 37:
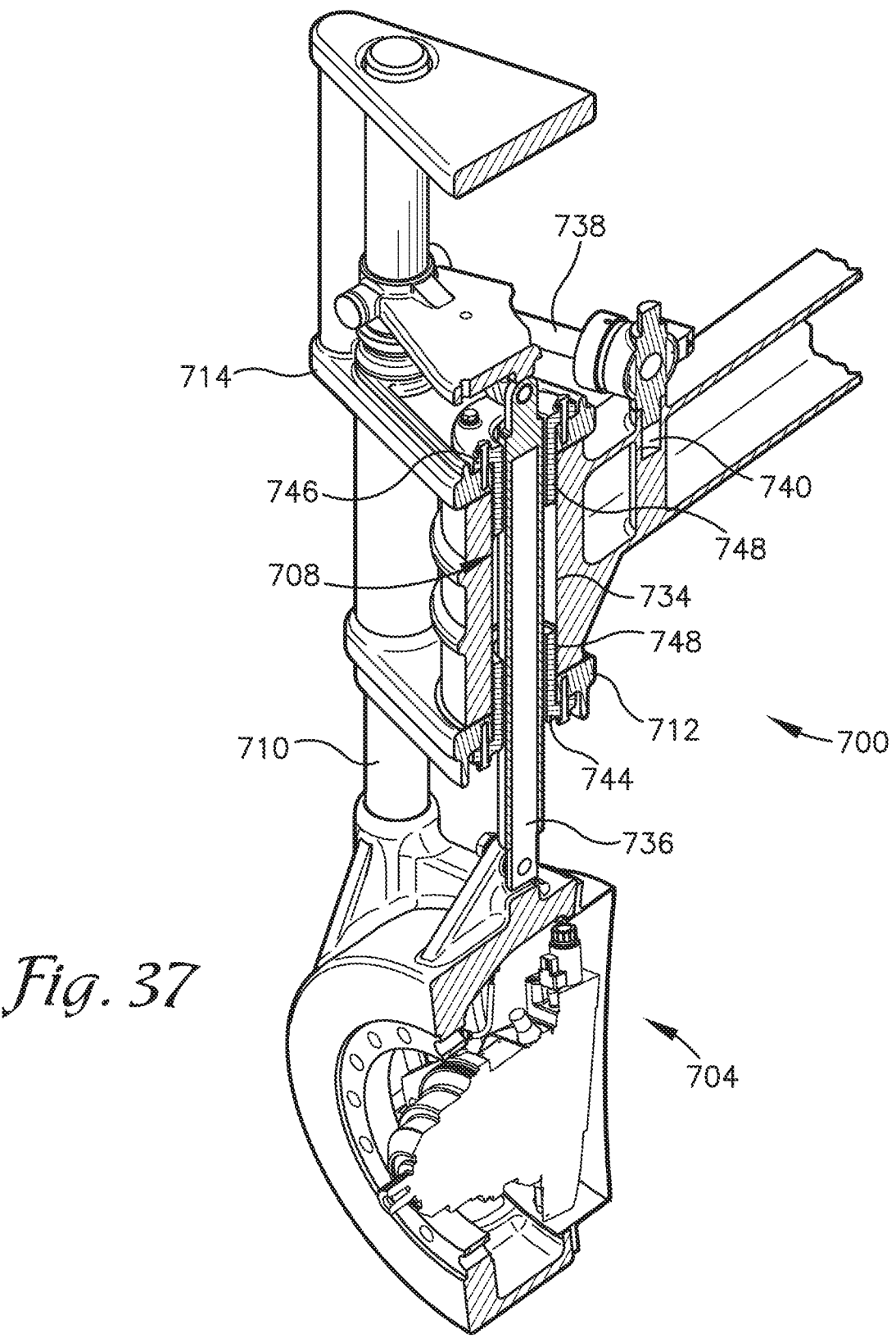

FIG. 37 is a cross-sectional view of the support assembly of FIG. 31.

Figure 38:
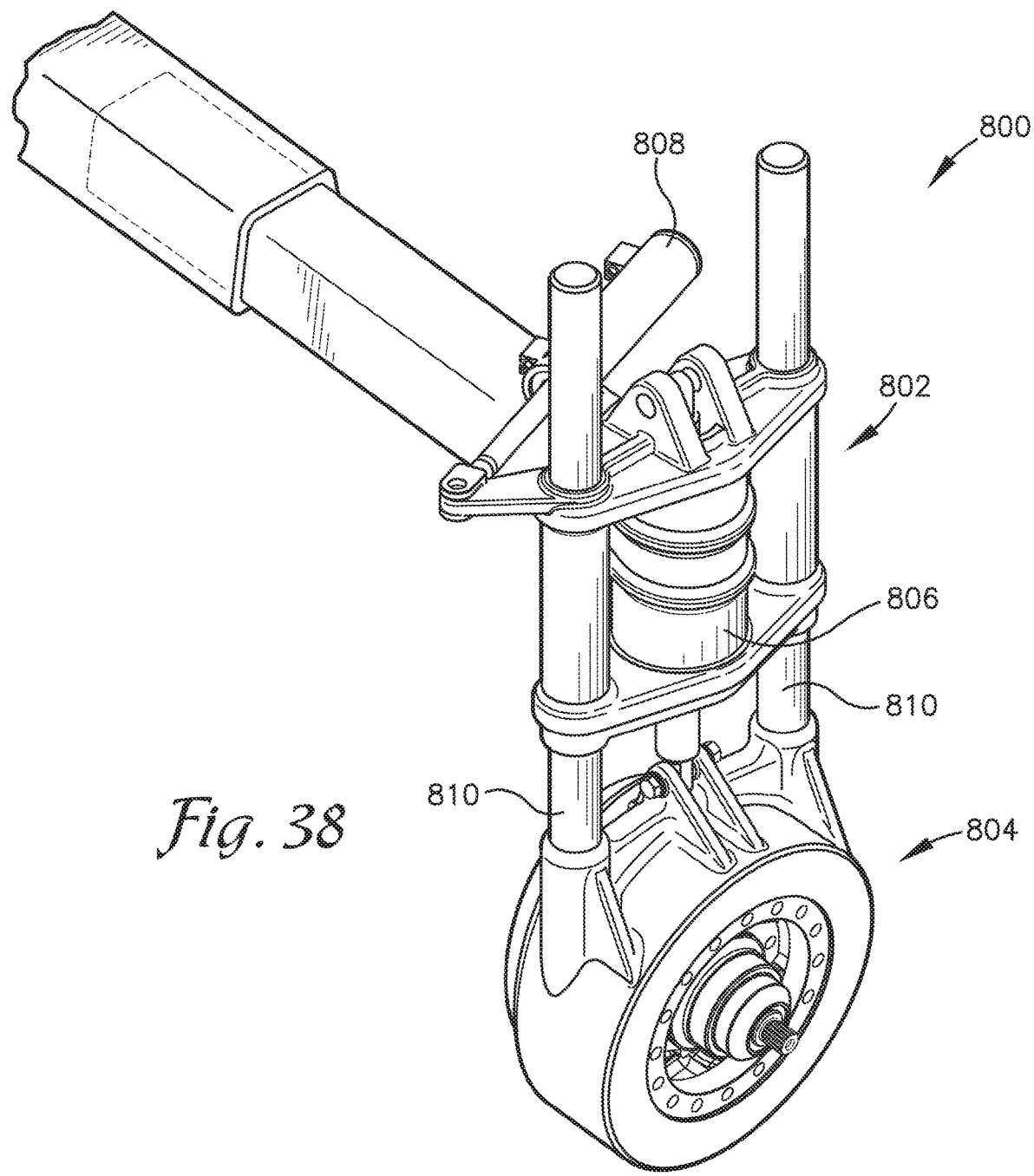

FIG. 38 is a perspective view of a support assembly constructed in accordance with another embodiment of the invention.

Figure 39:
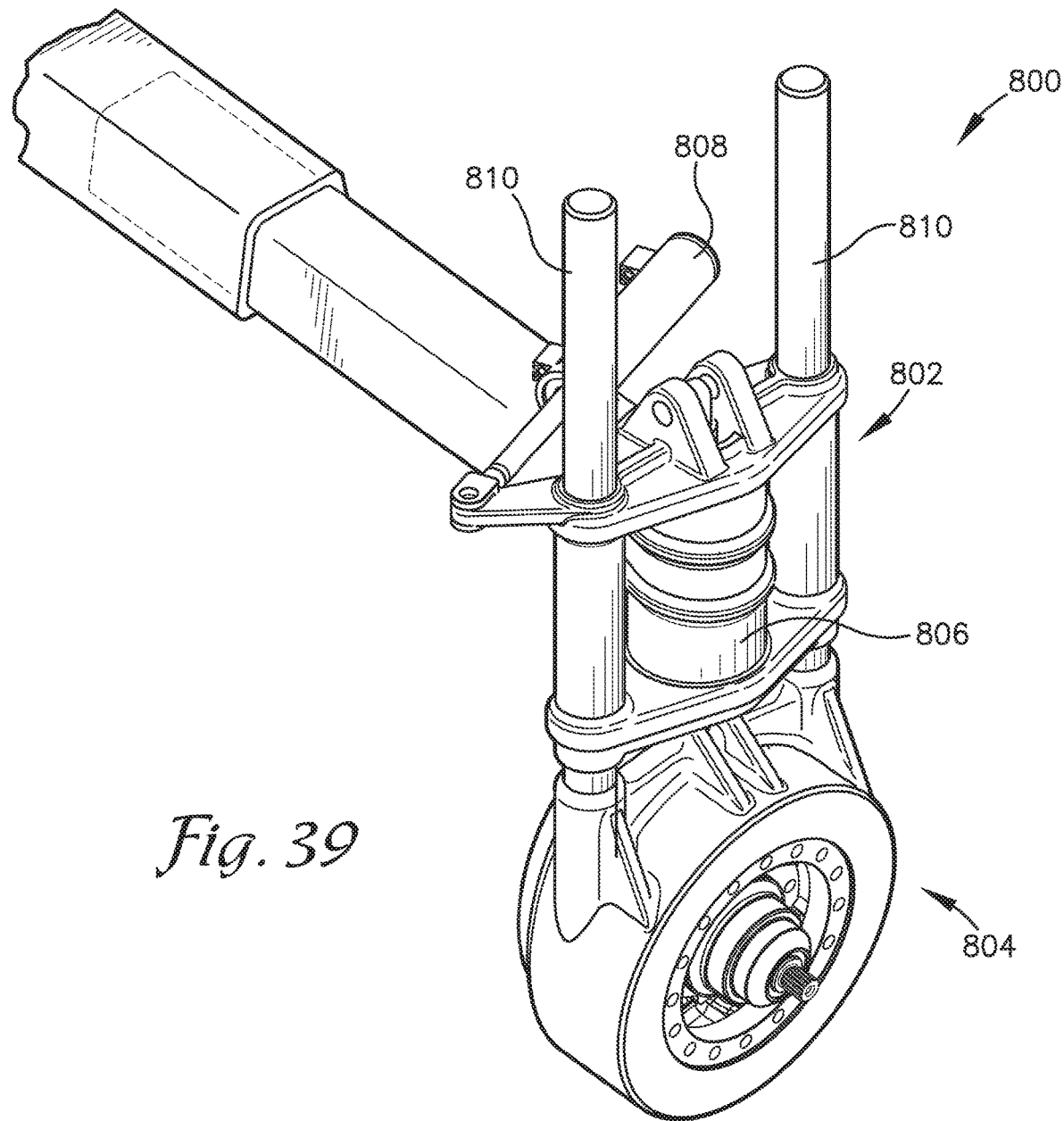

FIG. 39 illustrates the support assembly of FIG. 38 in a first operating position.

Figure 40:
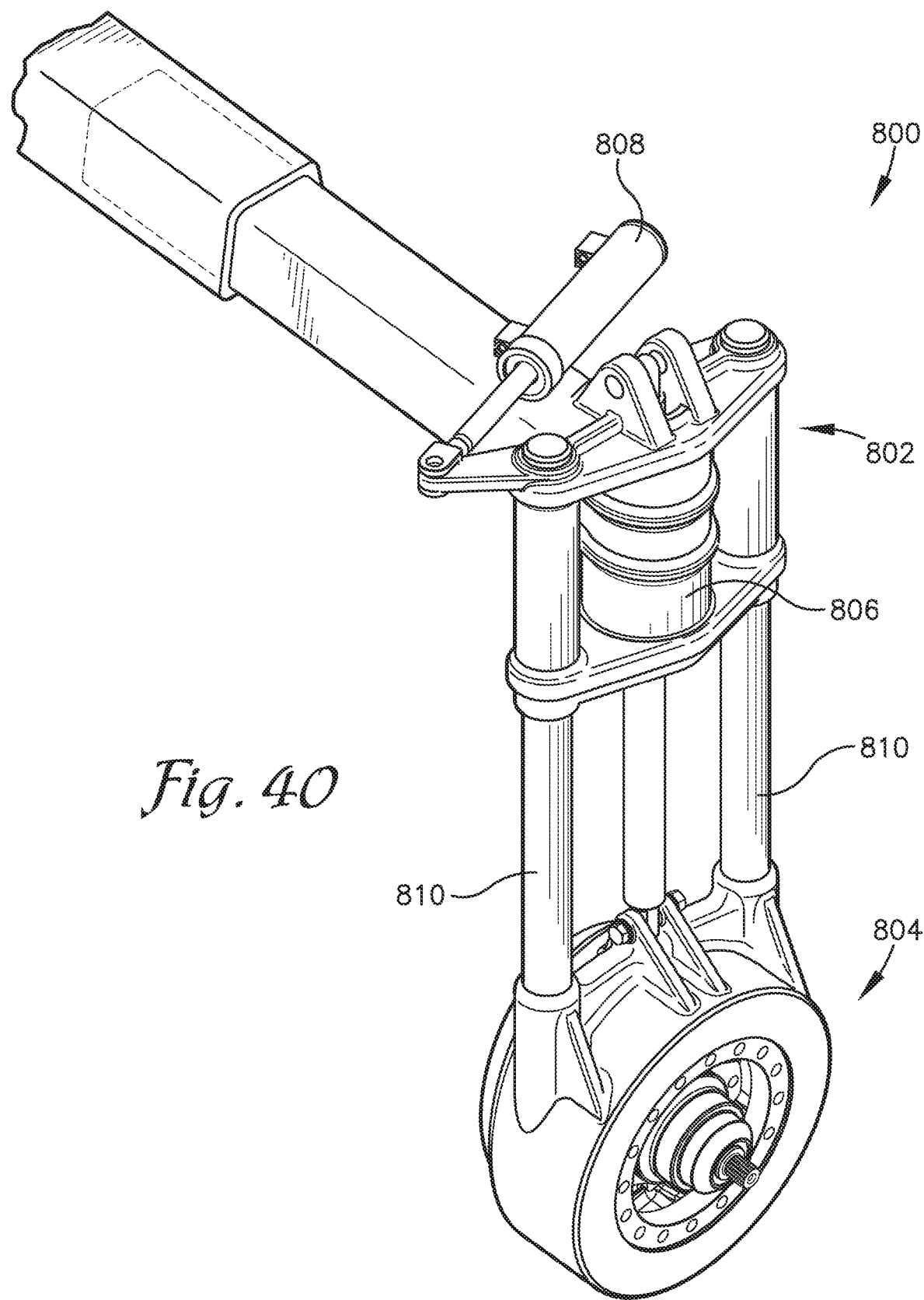

FIG. 40 illustrates the support assembly of FIG. 38 in a second operating position.

Figure 41:
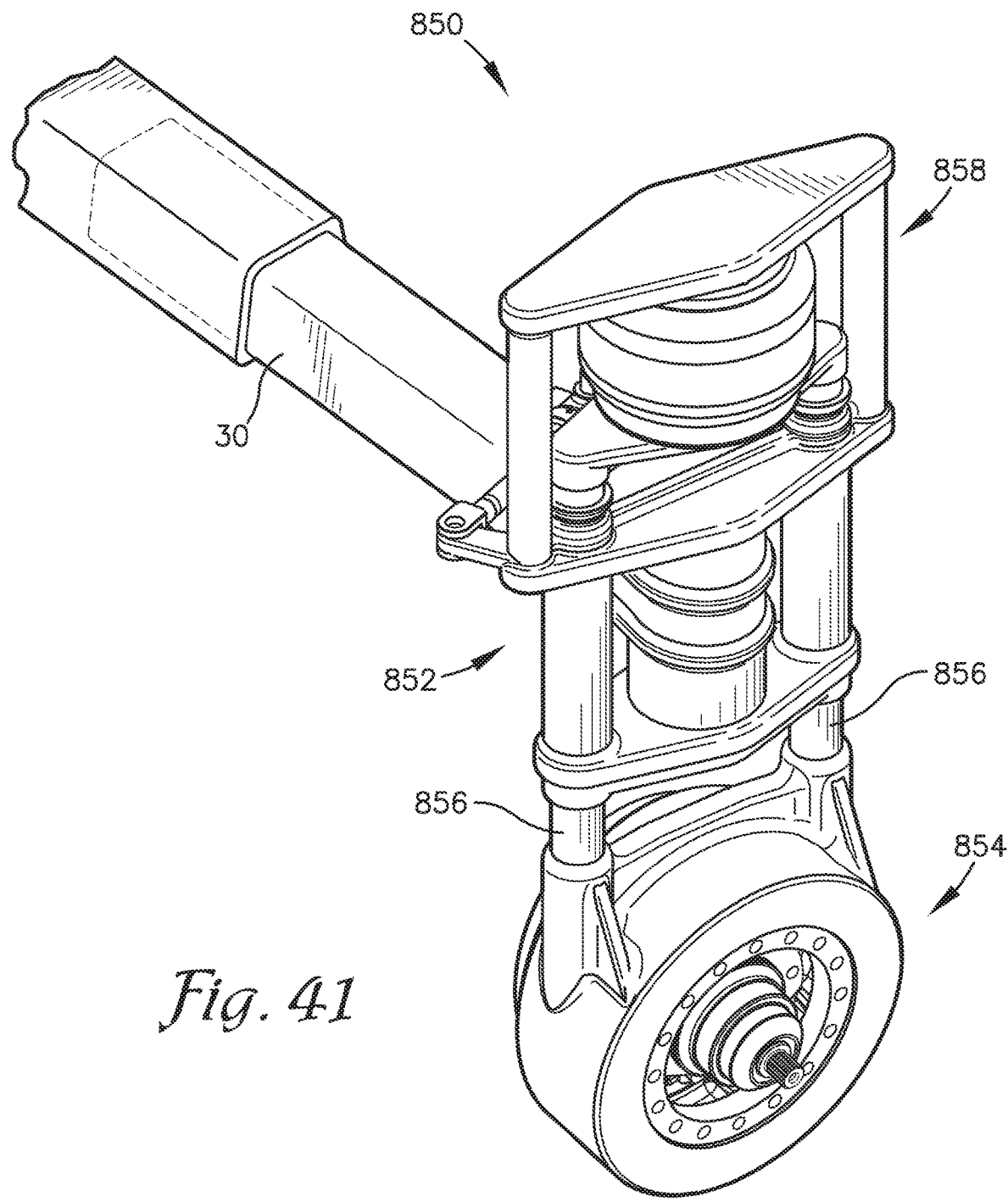

FIG. 41 is an outside perspective view of a support assembly constructed in accordance with another embodiment of the invention.

Figure 42:
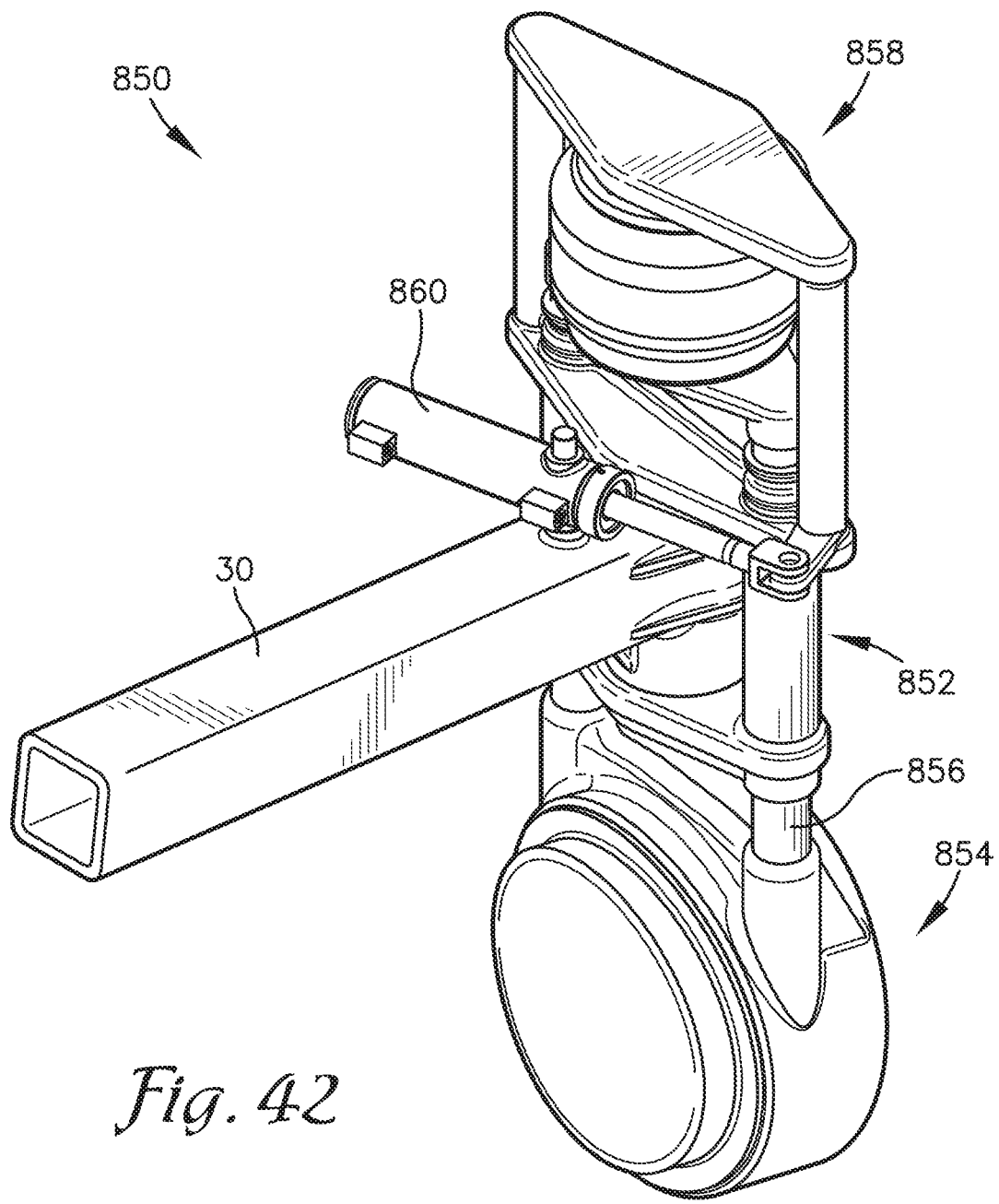

FIG. 42 is an inside perspective view of the support assembly of FIG. 41.

Figure 43:
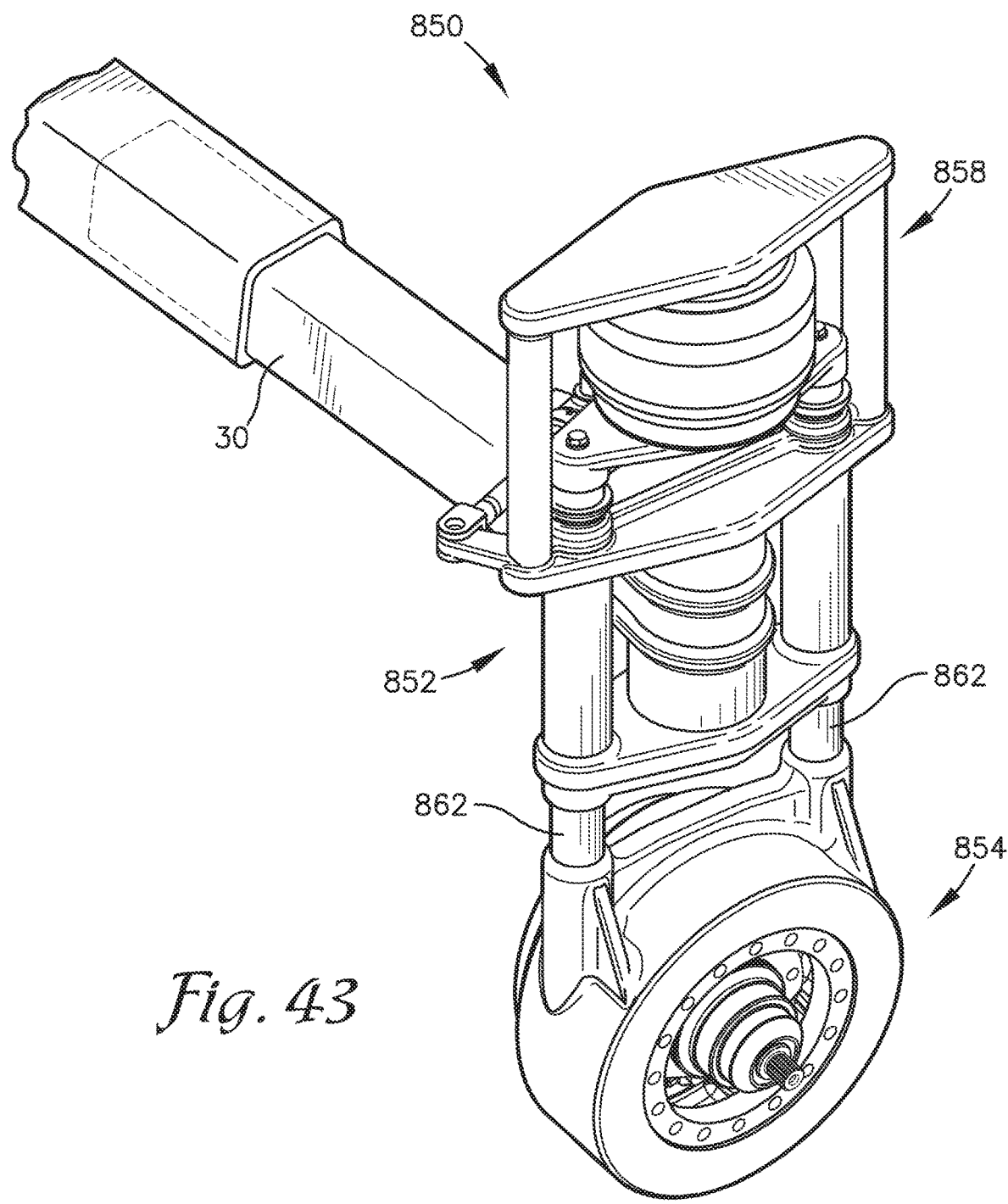

FIG. 43 is a perspective view of a support assembly constructed in accordance with another embodiment of the invention.

Figure 44:
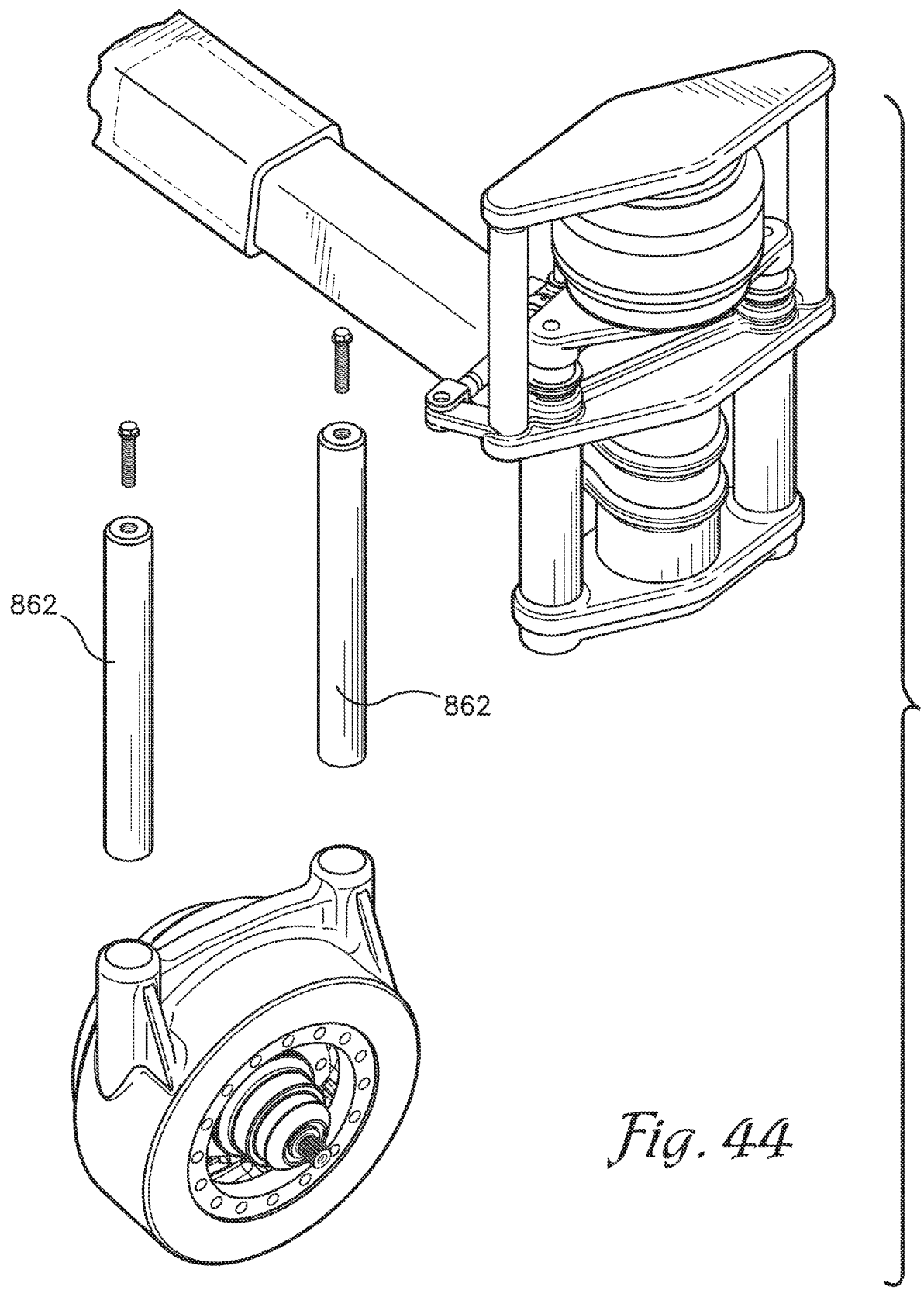

FIG. 44 is a partially exploded view of the support assembly of FIG. 43.

Figure 45:
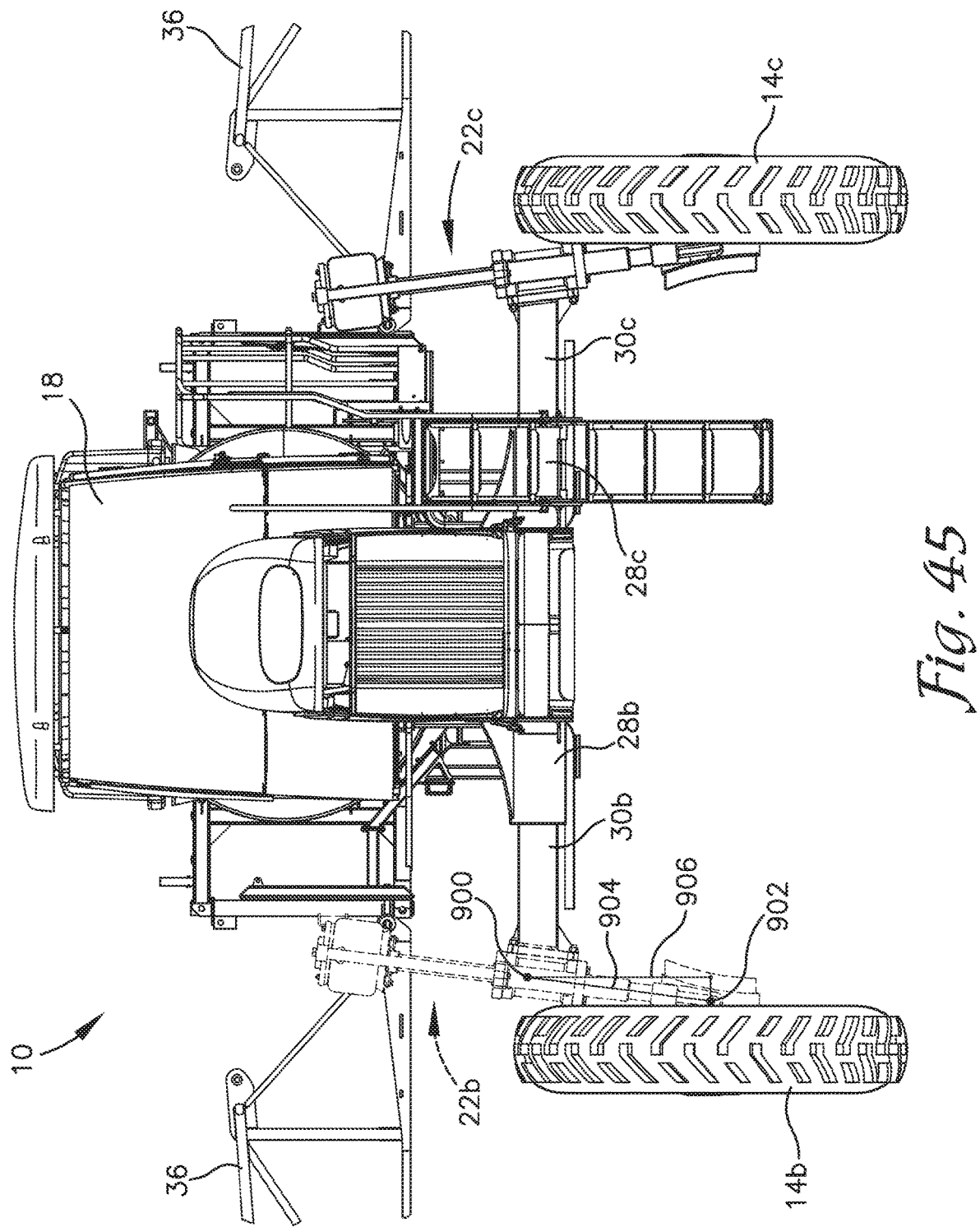

FIG. 45 is a front elevation view of the applicator of FIG. 1, illustrating the applicator chassis in a lowered operating position.

Figure 46:
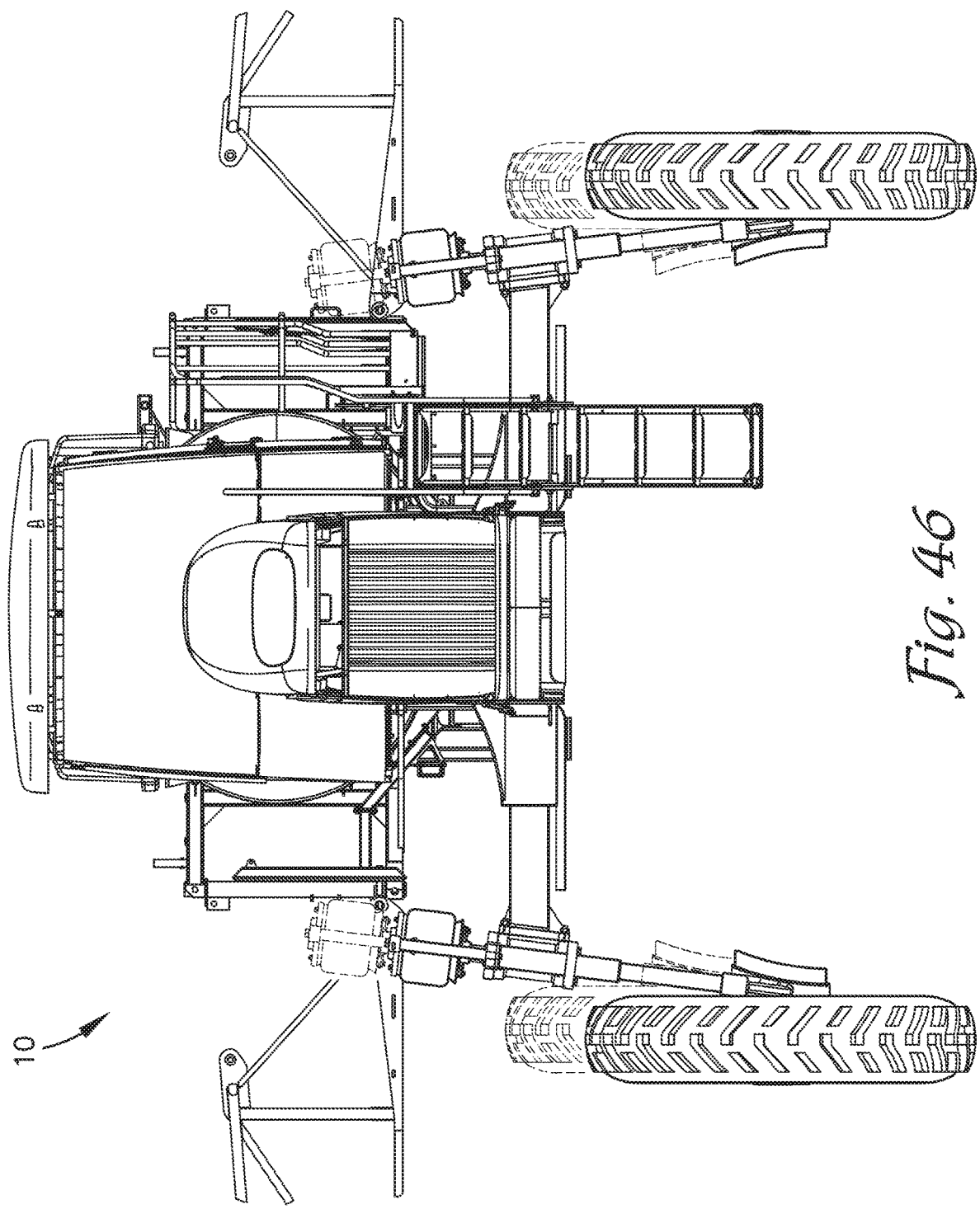

FIG. 46 is a front elevation view of the applicator of FIG. 1, illustrating the applicator chassis in a raised operating position and the position of the wheels and support assemblies corresponding to the lowered operating position of FIG. 45 illustrated in broken line.

Figure 47:
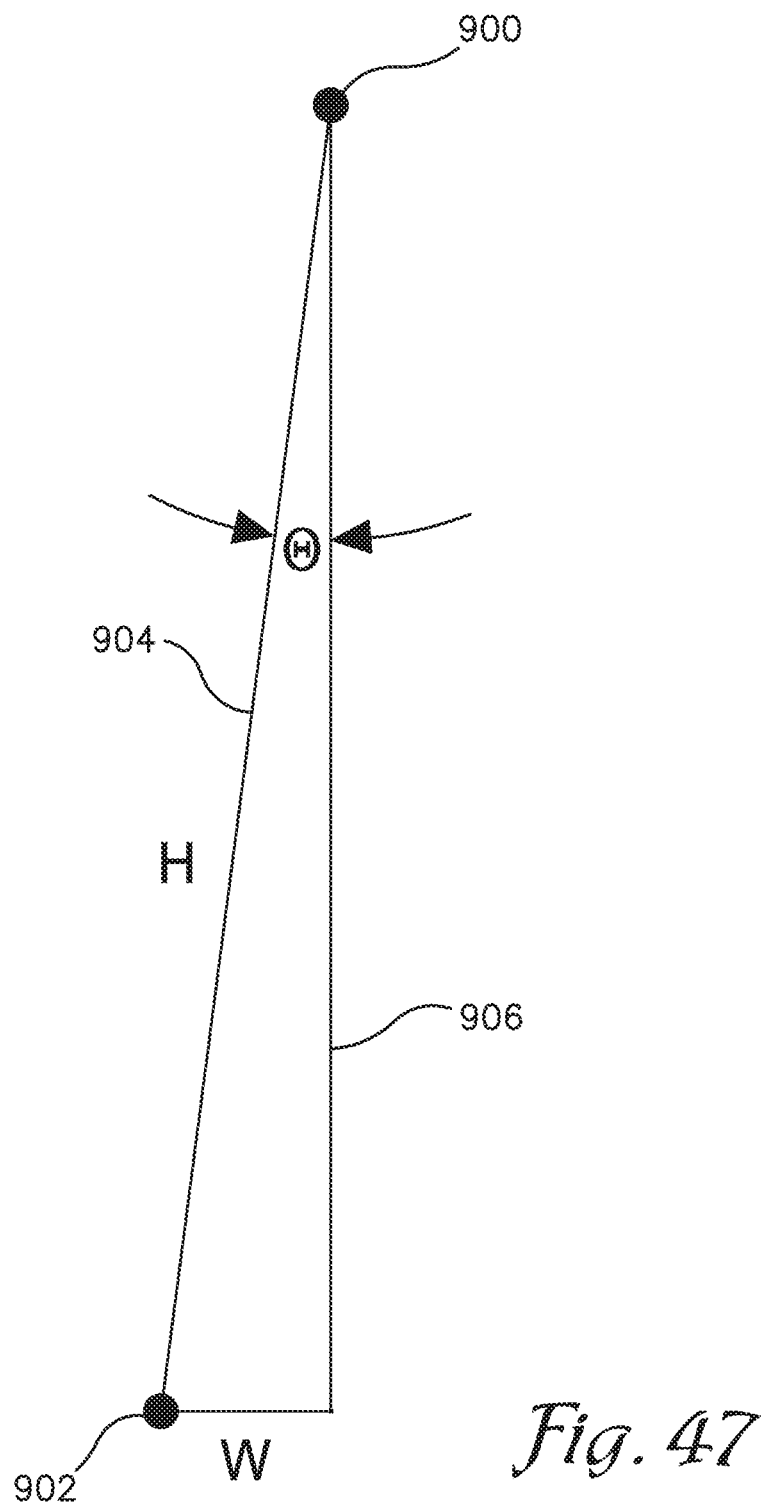

FIG. 47 is a diagram illustrating the kingpin angle of the support assemblies illustrated in FIGS. 45 and 46.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

The particular size and shape of the various components of the invention may vary substantially from one embodiment to another without departing from the spirit or scope of the invention. Therefore, while dimensions and proportions of various components are set forth herein, it will be understood that such information is provided by way of example and does not limit the scope of the invention as recited in the claims.

Turning now to the drawing figures, and initially FIGS. 1-4, an exemplary applicator 10 constructed in accordance with embodiments of the invention is illustrated. The applicator 10 broadly includes a chassis 12, a plurality of wheels 14 or other ground engaging elements supporting the chassis 12 above a ground surface, an application system 16, an operator cabin 18, and an engine compartment 20. A plurality of support assemblies 22 interposed between the wheels 14 and the chassis 12 support the chassis 12 on the wheels 14 and provide suspension, height adjustment and/or steering functions, as discussed in greater detail below.

Certain components of the applicator 10 have been omitted from the figures for simplicity of illustration and to show certain features of the applicator 10 that would otherwise be concealed. The engine, for example, has been omitted to illustrate components of the applicator frame, including portions of the front axle 24. Certain hydraulic lines, such as hydraulic lines running to and from the assemblies 22, are also omitted. The applicator 10 is illustrated and discussed herein as an exemplary machine with which the support assemblies 22 may be used. It will be appreciated by those skilled in the art that the support assemblies 22 may be used with other machines including other types of applicators or other vehicles or mobile machines that would benefit from the advantages of the various embodiments of the support assemblies disclosed herein, such as chassis height adjustment and independent suspension.

The applicator 10 includes a pair of front wheels 14b, 14c and a pair of rear wheels 14a, 14d of the appropriate size and shape to allow the applicator 10 to travel among row crops with minimal crop disturbance. A used herein, a "wheel" includes an inner, rigid wheel and an outer, flexible tire mounted on the wheel unless otherwise specified. Each wheel 14 may present, for example, an outer diameter of between sixty and eighty-five inches and a width of between ten and twenty-five inches. More specifically, wheels 14 designed for use with row crops may present an outer diameter of about seventy inches or about eighty inches and a width of about fifteen inches. Alternatively, the wheels 14 may present a width of up to twenty-five inches (or more) for pre-emergent applications, for use on soft terrain, or both to maximize flotation and minimize soil compaction. Each of the wheels 14 may weigh between 600 and 1,000 pounds and may specifically weigh about 700 pounds or about 800 pounds. In one exemplary embodiment, each of the wheels 14 is about seventy inches tall, about fifteen inches wide and weighs about 700 pounds.

The particular size, shape and configuration of the wheels 14 is not important to the present invention and may vary substantially from one embodiment to another without departing from the spirit or scope of the invention. In some embodiments, the invention may be used with a vehicle with ground engaging elements other than wheels, such as tracks. Hereinafter, reference will be made to a "wheel" or "wheels" with the understanding that the illustrated wheels 14 may be replaced with other types of ground engaging elements without departing from the scope of the invention.

One or more drive motors 26 may be associated with one or more of the wheels 14 for driving rotation of the wheel or wheels relative to the chassis 12 to thereby propel the applicator 10 in forward and reverse directions. In the illustrated embodiment, a separate hydraulic motor 26 is drivingly connected to each wheel 14 such that each of the wheels 14 may be driven independently to propel the applicator 10. Either two or all four of the wheels 14 may be steerable. In some embodiments, the steering functionality of some of the wheels 14 may be selectively enabled and disabled. By way of example, the front wheels 14b, 14c may always be steerable while supplemental steering provided by the rear wheels 14a, 14d may be selectively enabled and disabled. An operator may control the drive motors 26 and steering functions of the wheels 14, including enabling and disabling the steering ability of certain of the wheels 14, from one or more of the user interface elements of the cabin illustrated in FIG. 4.

The applicator 10 includes mechanisms for adjusting the track width of the wheels to accommodate, for example, different spacing needs for row crops. In the illustrated embodiment, the applicator 10 includes telescoping axles with an outer axle 28 and an inner axle 30 associated with each wheel 14, wherein the inner axle 30 slidingly engages the outer axle 28 and allows the wheel 14 to shift laterally relative to the chassis 12. A hydraulic piston or similar actuator may drive the inner axle 30 inwardly and outwardly to shift the position of the wheel 14. The inner 30 and outer 28 axles form part of the chassis 12 and, in the illustrated embodiment, the outer axles 28 are rigidly connected to another portion of the chassis, such as one or more frame elements.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The holding tank 32 may have a capacity of between two hundred gallons and two thousand gallons and, more specifically, may have a capacity of 700, 900, 1,100 or 1,300 gallons. The delivery system 34 includes a pair of booms 36 supporting hoses, pumps and spray nozzles or similar components for dispersing or otherwise applying the contents of the tank to a crop. Alternatively, the application system 16 may be configured to apply dry material to a field and therefore may include a hopper and a mechanism for dispersing particulate material from the hopper, such as a pneumatic spreader or one or more spinners.

The operator cabin 18 or "cab" is supported on the chassis 12 and positioned forward of the application system 16. The cabin 18 presents a control environment 38 including a steering wheel 40, one or more pedals 42, a drive lever 44, one or more electronic instrument panels 46, and a control panel 48 including buttons, switches, levers, gauges and/or other user interface elements. The various components of the control environment 38 enable the operator to control the functions of the applicator 10, including driving and operating the application system 16. The various user interface elements are positioned around and proximate a seat 50 for easy access by an operator during operation of the applicator 10. The control environment 38 may include a touchscreen display. One or both of the electronic instrument panels 46, for example, may be or include a touchscreen, or a display terminal (not illustrated) with a touchscreen may be mounted on or near the control panel 48.

As mentioned above, the applicator 10 includes a support assembly 22 interposed between each of the wheels 14 and the chassis 12. Each support assembly 22 connects to a hub of one of the wheels 14 and to one of the inner axles 30 such that the wheel 14 and the support assembly 22 shift laterally as a single unit relative to the chassis 12 when the inner axle 30 is shifted relative to the outer axle 28 to adjust the applicator's track width. In some embodiments, the support assemblies 22 include height adjustment components for raising and lowering the chassis 12 of the vehicle between various operating positions. One or more of the support assemblies 22 (or portions thereof) may be selectively pivotable relative to the chassis 12 to thereby steer the applicator 10.

Each of the support assemblies 22 may include one or more actuators for adjusting a height of the chassis, for steering the associated wheel, or both. In some embodiments, the actuators are hydraulic actuators such as linear or rotary hydraulic actuators. FIG. 3a illustrates an exemplary hydraulic control system 52 for operating hydraulic actuator sections 54 in which a centralized hydraulic pump 56, driven by an internal combustion engine 58 or other power source, communicates pressurized hydraulic fluid to a hydraulic controller 60 that regulates fluid flow between the pump 56 and the hydraulic actuator sections 54 associated with the support assemblies via a plurality of hydraulic transfer lines 62. The hydraulic controller 60 may include, for example, a hydraulic manifold or similar device.

Each of the hydraulic transfer lines 62 communicates hydraulic power between the hydraulic controller 60 and one or more hydraulic actuator sections 54 and, thus, may include one or more hydraulic pressure lines and one or more hydraulic return lines. Each of the hydraulic transfer lines may communicate hydraulic power to more than one actuator, and each of the actuator sections 54 may include a group of actuators associated with each wheel 14 and/or assembly 22. By way of example, a first actuator associated with the actuator section 54 may drive steering of the wheel, a second actuator may drive rotation of the wheel, and a third actuator may adjust a height of the chassis 12. It will be appreciated that the actuator sections 54 are exemplary in nature and that the various hydraulic actuators may not be grouped as described herein.

The system 52 includes a control interface 64 in communication with the hydraulic controller 60. The control interface 64 may be part of a user interface that includes one or more physical or virtual user interface elements 66, such as buttons, switches or dials, and is preferably part of the control environment 38 illustrated in FIG. 4.

It will be appreciated that various different types of technology may be used to actuate the support assemblies 22. Thus, while the various actuators are illustrated and described herein as hydraulic actuators, it will be understood that other types of actuators may be used in place of, or in connection with, the hydraulic actuators without departing from the spirit or scope of the invention. By way of example, electro-mechanical actuators may be used in place of at least some of the hydraulic actuators illustrated and discussed herein.

FIG. 3b illustrates another exemplary control system 68 that is identical to the system 52 but includes a computerized controller 70 with a control module 72 for controlling the hydraulic controller 60. The system 68 may also include a wireless interface element 74 in wireless communication with the controller 60 for allowing a user to remotely control the actuator sections 54. The wireless interface element 74 may be a dedicated device, such as a device similar to a conventional key fob used with cars and other vehicles, or a computing device such as smart phone, tablet computer, or wearable computing device programmed or configured for use with the system 68. The wireless interface element 74 may be configured to communicate with the hydraulic controller 60 and/or the computerized controller 70 via short-range wireless communications, such as Wi-Fi or Bluetooth, or via a communications network such as a cellular network.

The controller 70 may include one or more integrated circuits programmed or configured to control the hydraulic controller 60 to actuate the support assemblies 22 as described herein. By way of example, the controller 70 may include one or more general purpose microprocessors or microcontrollers, programmable logic devices, or application specific integrated circuits. The controller 70 may also include one or more discrete and/or analog circuit components operating in conjunction with the one or more integrated circuits, and may include or have access to one or more memory or storage elements operable to store executable instructions, data, or both. The control module 72 may be a hardware or software module specifically dedicated to enabling the controller 70 to control the hydraulic controller 60 as described herein.

Another control system 76 illustrated in FIG. 3c is similar to the system 68 but includes additional hydraulic circuit components, such as hydraulic accumulators 78, for use with some embodiments of the invention. In some embodiments, each of the support assemblies 22 may include a single hydraulic actuator that both raises and lowers the chassis 12 and provides suspension functions, as explained below. Such hydraulic systems may require specialized hydraulic circuit components such as the hydraulic accumulators 78.

One of the support assemblies 22 is illustrated in greater detail in FIGS. 5-10. The assembly 22 broadly includes a chassis attachment component 80 for attaching to the vehicle chassis 12; a wheel attachment component 82 for attaching to a wheel 14 or other ground engaging element; a suspension component 84 operably interposed between the chassis attachment component 80 and the wheel attachment component 82 for regulating motion transfer between the two attachment components 80, 82; a plurality of strut bars 86, 88 connecting the wheel attachment component 82 to the suspension component 84, and an adjustment mechanism 90 comprising a plurality of adjustment elements 92, 94 for shifting the wheel attachment component 82 between a plurality of operating positions relative to the chassis attachment component 80. The chassis attachment component 80 may include a pivot element 96 for allowing the assembly 22 to pivot relative to the chassis 12 and a pivot actuator may drive the pivoting motion to thereby steer a wheel or other ground engaging element connected to the wheel attachment component 82. In the illustrated embodiment, the pivot element 96 is or includes a rotary actuator.

The wheel attachment component 82 presents a generally cylindrical body 98 and a pair of upwardly-opening receptacles 100 for receiving and connecting to the strut bars 86, 88. The receptacles 100 are positioned on opposite sides of and above the cylindrical body 98. Pivot torque is transferred to the wheel attachment component 82 by the strut bars 86, 88 via the receptacles 100. The wheel attachment component 82 includes a plurality of apertures or other features spaced angularly around the body 98 for connecting to a hub of a wheel, a hydraulic motor and/or a gear reduction hub, a caliper disc brake assembly, a parking brake assembly, and/or similar components.

The suspension component 84 includes a lower suspension member 102, an upper suspension member 104 and a pneumatic spring 106 or similar motion-regulating element positioned between and attached to the upper and lower suspension members. The upper suspension member 104 is connected to a top side or portion of the spring 106 and the lower suspension member 102 is connected to a lower side or portion of the spring 106. Each of the upper 104 and lower 102 suspension members presents an elongated shape and includes a plurality of apertures or other features for attaching to the spring 106. The lower suspension member 102 includes apertures or other features located proximate end portions thereof to facilitate connection to the strut bars 86, 88, and the upper suspension member 104 includes apertures or other features located proximate outer portions thereof to facilitate connection to the adjustment mechanism 90. In the illustrated embodiment, the upper suspension member 104 is longer than the lower suspension member 102 enabling attachment to the adjustment elements 92, 94 that are positioned outboard of the lower suspension member 102.

The pneumatic spring 106 uses trapped or compressed air or other fluid to regulate motion transfer between the chassis attachment component 80 and the wheel attachment component 82. The pneumatic spring 106 may contain air, water, nitrogen, antifreeze or other fluid and may be single, double, or triple convolute. A pair of flexible straps 108 may be positioned on opposite sides of the spring 106 to limit extension of the spring and a bumper may be positioned inside or outside the spring to limit spring compression. Other technologies may be used, including, for example, a coil-type compression spring and a shock-absorbing cylinder and piston assembly.

The suspension components 84 of the assemblies 22 may be the only components of the applicator 10 configured to regulate motion transfer between the wheels 14 (or other ground engaging element) and the chassis 12. The outer axles 28, for example, may be rigidly connected to portions of the applicator's frame. Furthermore, the suspension components 84 operate to regulate motion transfer between the wheels 14 and the chassis 12 regardless of the operating position of the assemblies 22. Thus, the suspension components 84 perform essentially the same function regardless of whether the chassis 21 is in a lowered position (e.g., FIG. 45), a raised position (e.g., FIG. 46) or somewhere in between.

The first strut bar 86 and the second strut bar 88 are rigidly connected to the receptacles 100 of the wheel attachment component 82 and are rigidly coupled with the suspension component 84 such that movement of the wheel attachment component 82 relative to the chassis attachment component 80 is communicated through the suspension component 84 via the strut bars 86, 88. More specifically, a first end of the first strut bar 86 is connected to a first receptacle 100 of the wheel attachment component 82 and a first end of the second strut bar 88 is connected to a second receptacle 100 of the wheel attachment component 82. A second end of the first strut bar 86 is connected to a first side of the lower suspension member 102 and a second end of the second strut bar 88 is connected to a second side of the lower suspension member 102. As explained above, the lower suspension member 102 is an elongated, rigid member with outer apertures on opposing ends thereof for connecting to the strut bars 86, 88 and one or more inner apertures between the outer apertures for rigidly attaching to a first side or portion of the spring 106. Thus, the lower suspension member 102 interconnects the spring 106 and the strut bars 86, 88.

The first and second strut bars 86, 88 are parallel or substantially parallel and are separated by a space. The strut bars 86, 88 slidingly engage the chassis attachment component 80 to allow the wheel attachment component 82 to move relative to the chassis attachment component 80 while also transferring pivot torque between the wheel attachment component 82 and the chassis attachment component 80. The strut bars 86, 88 may be separated by a space of between about three inches and twenty inches and, more specifically, may be separated by a space of between about eight inches and about fifteen inches. The length of each of the strut bars 86, 88 may be between about twelve inches and about thirty-six inches and, more specifically, between about twenty inches and about thirty inches. The strut bars 86, 88 may be positioned symmetrically about a center of the wheel attachment component 82 and a center of the chassis attachment component 80.

The chassis attachment component 80 comprises a lower chassis attachment member 110 and an upper chassis attachment member 112 separated by a space. The pivot element 96 is interposed between, and rigidly connected to, the attachment members 110, 112. Each of the lower 110 and upper 112 chassis attachment members includes a pair of spaced through holes in axial alignment for slidingly receiving the strut bars 86, 88. Each of the lower 110 and upper 112 chassis attachment members also includes a pair of apertures or other features positioned outboard of the through holes for engaging the adjustment elements 92, 94.

The chassis attachment component 80 is rigidly but adjustably coupled with the upper suspension member 104 via the adjustment elements 92, 94 such that actuating the adjustment mechanism 90 causes the upper suspension member 104 to shift relative to the chassis attachment component 80, thereby shifting the wheel attachment component 82 relative to the axle 30. The lower suspension member 102 is rigidly connected to the wheel attachment component 82 via the strut bars 86, 88, as explained above, such that motion transfer between the chassis attachment component 80 and the wheel attachment component 82 passes through, and is regulated by, the suspension component 84. Such motion transfer may correspond to up and down movement of the wheels 14 relative to the chassis 12 such that the suspension component 84 may provide a spring or shock absorbing function and may, for example, dampen motion transfer between the wheels 14 and the chassis 12.

The height adjustment mechanism 90, comprising the height adjustment elements 92, 94, is configured to shift the wheel attachment component 82 between a plurality of operating positions relative to the chassis attachment component 80. As used herein, an "operating position" is a selectable position of the wheel attachment component 82 relative to the chassis attachment component 80 in which the distance between the attachment components 80, 82 is rigidly or flexibly fixed. If the distance between the attachment components 80, 82 is flexibly fixed, the relative positions of the attachment components may fluctuate but will return to the same operating position. Stated differently, the average distance between the attachment components 80, 82 will remain the same even though the instantaneous distance may fluctuate above and/or below the average distance. Fluctuations in the relative positions of the attachment components 80, 82 may result, for example, from operation of the suspension component 84, operation of a hydraulic component, or both.

In operation, shifting the wheel attachment component 82 between operating positions relative to the chassis attachment component 80 will raise and lower the vehicle's chassis 12 between various operating positions relative to the ground surface. Each assembly 22 is operable to shift between two or more operating positions, such as, for example, between two, three, four, five, six, seven, eight, nine, ten, twelve, fourteen or sixteen operating positions. Additionally, each assembly 22 may be infinitely adjustable between a first extreme operating position (FIG. 9) and a second extreme operating position (FIG. 10). The difference between the first extreme operating position and the second extreme operating position may be within the range of about five inches to about fifty inches. More specifically, the difference may be about ten inches, about twenty inches, about thirty inches or about forty inches.

As illustrated, the adjustment elements 92, 94 are connected to the upper and lower chassis attachment members 110, 112 and to the upper suspension member 104, such that extending or retracting the adjustment elements 92, 94 causes the upper suspension member 104 (and a top end or portion of the spring 106 to which it is connected) to shift up or down relative to the chassis attachment component 80. The adjustment elements 92, 94 may include fluid actuators and/or electro-mechanical actuators. By way of example, the adjustment elements 92, 94 may include hydraulic cylinders that drive piston rods between retracted and extended positions.

As used herein, the suspension component 84 is "operably interposed" between the wheel attachment component 82 and the chassis attachment component 80 if it regulates motion transfer between the two components 80, 82. Thus, the suspension component 84 need not be positioned physically between the attachment components 80, 82 in order to be operably interposed therebetween. As illustrated, the suspension component 84 may be positioned above (and in line with) both the wheel attachment component 82 and the chassis attachment component 80 and yet be operably interposed therebetween.

The assembly 22 is configured to pivot relative to the axle 30 to thereby pivot a wheel coupled with the wheel attachment component 82 and steer the applicator 10. The assembly 22 may pivot between a first extreme position (FIG. 7) and a second extreme position (FIG. 8) about an axis of rotation passing through, and defined by, the pivot element 96. The extreme pivot positions may correspond to an angular separation of between, for example, about 90° and about 300°. The assembly 22 pivots as a single unit such that, regardless of the position of the wheel attachment component 82 relative to the chassis attachment component 80, the wheel attachment component 82, the chassis attachment component 80 and the suspension component 84 pivot in unison.

In the illustrated embodiment, the pivot element 96 attaches to an outer end of the axle 30, the suspension component 84 is positioned above the axle 30, and the wheel attachment component 82 is positioned below the axle 30 opposite the suspension component 84. Furthermore, the wheel attachment component 82, the chassis attachment component 80 and the suspension component 84 lie on a line that corresponds to, or is parallel with, the axis of rotation of the assembly 22.

The pivot element 96 may include a rotatory hydraulic actuator connected to the axle 30 and to the lower 110 and upper 112 chassis attachment members. The rotary hydraulic actuator selectively drives pivoting movement of the assembly 22 relative to the chassis 12 and may be controlled by a vehicle operator or an automated guidance system to steer the applicator 10.

By way of example, the rotary actuator may be an L30 series helical hydraulic rotary actuator manufactured by HELAC CORPORATION, or a similar device. A rotary hydraulic actuator is a device manufactured to drive or induce rotational movement in response to hydraulic input. Thus, a portion of the rotary actuator rotates relative to another portion of the rotary actuator and does not require external connections or components to generate rotational motion. A rotary actuator may be designed, for example, to internally translate linear motion into rotational motion. In one exemplary embodiment, the rotary hydraulic actuator may generate output torque of between 3,000 and 32,000 foot-pounds at a hydraulic pressure of between 2,000 and 4,000 psi or, more specifically, may generate torque of between 10,000 and 25,000 foot-pounds at a hydraulic pressure of between 2,000 and 4,000 psi. The rotary actuator may have a total angular displacement of between about 90° and about 360°.

The illustrated rotary hydraulic actuator 96 includes a plurality of spaced mounting feet or flanges 114 for securing to the axle 30 or other part of the chassis 12 and a cylindrical housing 116 with opposing ends that mount to, and rotate, the lower and upper chassis attachment members 110, 112. In the illustrated embodiment, the mounting feet 114 are configured to attach to a plurality of attachment points arranged in a planar configuration, such as on a single planar surface. Thus, the rotary actuator 96 may function both to mount the chassis attachment component 80 to the axle 30 and to rotate the assembly 22 relative to the axle 30 and, therefore, may simplify the design, manufacture, maintenance and repair of the assembly 22 and related components.

The housing 116 may have a diameter of between about five inches and twelve inches and a length of between about eleven inches and about forty inches. It will be appreciated by those skilled in the art that the rotary actuator 116 and the connections between the rotary actuator 96 and the assembly 22 and the axle 30 must be sufficiently strong to sustain the shock and rigors of routine use.

Rather than including a rotary actuator, the assembly 22 may include, or may be coupled with, another type of actuator such as a linear hydraulic actuator for driving pivoting motion. Alternatively, the assembly 22 may be configured to rigidly attach to the vehicle chassis 12 and not pivot relative to the chassis, wherein the chassis attachment component 80 is rigidly attached to the inner axle 30 or other portion of the chassis 12. This may be desirable, for example, when the assembly 22 supports a ground engaging element that is not intended to steer the applicator 10. The chassis attachment component 80 may be rigidly attached to the axle 30 by replacing the pivot element 96 with a casting presenting the same size and shape as the pivot element 96 to rigidly connect to the chassis attachment component 80 and to the axle 30. The assembly 22 may be configured to facilitate interchanging a rotary actuator configured to pivot the assembly and a static component configured to secure the assembly in a fixed position. Conventional bolts or other easily removable attachment elements may be used to secure the rotary actuator 96 to the axle 30 and to the assembly 22 and may be positioned to facilitate access thereto. Thus, an actuator and a fixed element may both be provided with each of the assemblies 22 such that a user may interchange the actuator and the fixed element as desired.

In operation, the assemblies 22 may be used to raise and lower the chassis of the applicator 10. More specifically, an operator may remotely control operation of the assemblies 22 to raise and lower the chassis 12 using, for example, one of the user interface elements forming part of the control environment 38 illustrated in FIG. 4. Thus, the operator may raise and lower the chassis 12 while seated in the cabin 18.

In one exemplary scenario, the operator fills the holding tank 32 at a central location, such as a local cooperative facility, and drives the applicator 10 to a field in a lowered operating position. Once at the field, the operator controls the assemblies 22 to raise the chassis 12 to a desired height to apply the product. The operator raises the chassis 12 while seated in the cabin 18. When the application is complete or when the applicator 10 needs to return to the cooperative for additional product, the operator lowers the chassis 12 and drives the applicator 10 to the cooperative or to another field. Thus, adjusting the height of the chassis 12 allows for safer travel to and from the field by lowering the applicator's center of gravity and overall height.

In another exemplary scenario, the applicator 10 and a tender vehicle are taken to an area of application such as a field or group of fields. The applicator 10 is placed in a lowered chassis position and prepared by filling it with liquid chemical or other product to be applied to a crop. The tender vehicle may be configured to interface with the applicator 10 only when the applicator 10 is in a lowered chassis position. When the applicator 10 is prepared, the operator may drive the applicator 10 to a starting position, raise the chassis 12 to a desired height using one or more interface elements within the cabin 18, and begin the application process. The operator refills the applicator 10 by returning to the tender vehicle, lowering the applicator chassis 12 to interface with the tender vehicle, then raising the chassis 12 after the applicator 10 has been refilled and resumes the application operation. When application for a first crop is complete, the applicator 10 may be used to apply a chemical to a second crop of a different height than the first crop. The operator may adjust the chassis height of the applicator 10 for optimal application on the second crop, wherein the optimal height for application on the second crop may be different than the optimal height for application on the first crop.

An assembly 130 constructed in accordance with another embodiment of the invention is illustrated in FIGS. 11 and 12. The assembly 130 may be identical to the assembly 22, except that the assembly 130 includes a mechanical locking mechanism 132 for mechanically locking the assembly 130 in any of a plurality of the operating positions. The assembly 130 is adapted to accommodate the locking mechanism 132 by, for example, extending the overall length of the upper suspension member 104 and the upper chassis attachment member 112 and including receptacles in the extreme ends of each for engaging lock bars 134. The locking mechanism 132 may be used to secure the assembly 130 in an operating position and relieve the adjustment mechanism 90 from the weight of the applicator 10, which can be substantial when the applicator 10 is fully loaded.

In the illustrated assembly, the locking mechanism 132 includes the lock bars 134 connected to both the upper suspension member 104 and the upper chassis attachment member 112 and that are positioned outboard of the adjustment elements 92, 94. Each of the lock bars 134 may include a plurality of spaced through holes or recesses 136 and a locking pin 138 configured to simultaneously engage the upper chassis attachment member 112 and any one of the through holes 136 to rigidly connect the lock bar 134 with the upper chassis attachment member 112. The lock bars 134 of the illustrated assembly include ten through holes 136 such that the assembly 130 may be locked into any of ten different operating positions. The strut bars 86, 88, adjustment elements 92, 94 and lock bars 134 may form a linear or substantially linear pattern.

In use, the operator may remove the pins 138 from the locking mechanisms 132, adjust the height of the chassis 12 to a desired height, and insert the pins 138 in the locking mechanisms 132 to lock the chassis 12 into the desired operating position. This process may require the operator to leave the cabin 18 one or more times and manually remove and replace the locking pins 138 and/or may require a second person to remove and replace the pins 138 while the operator adjusts the chassis height. One way to eliminate the need for the operator to travel back and forth between the cabin 18 and the support assemblies 130 is for the operator to use the wireless interface element 74 described above and illustrated in FIG. 3b. The operator may use the wireless interface element 74 to adjust the chassis height while positioned proximate the assembly 130, wherein the operator manually removes the locking pins 138, adjusts the chassis height, and manually replaces the pins 138 all while positioned proximate the support assemblies 130.

An alternative locking mechanism 140 is illustrated in FIG. 13 that eliminates the need for the operator to leave the cabin 18 to engage or disengage the locking mechanism. More specifically, the locking mechanism 140 is remotely actuated by the operator. The locking mechanism 140 may include locking pins or similar components that are remotely controlled or actuated by the operator via wires or cables connected to the locking mechanisms 140. The locking pins may be contained within a housing 142 that is secured to the upper chassis attachment member 112, wherein when the pins are in an unlocked position the lock bars 134 slide through the housing 142, but when the pins are in the locked position the lock bars 134 are coupled with the housing 142 and the upper chassis attachment member 112. A user seated in the cab 18 of the applicator 10, for example, may actuate a user interface component of the control system such as a physical or virtual button that in turn drives an electrical actuator that moves locking pins into and out of engagement with the lock bars. Other mechanisms may be used to actuate the locking mechanisms, including hydraulic actuators and mechanical push-pull cables.

Another alternative locking mechanism 144 is illustrated in FIG. 14. The locking mechanism 144 is similar to the locking mechanism 132, described above, except that the upper chassis attachment member 112 is not configured to receive lock pins for rigidly coupling with the lock bars 134, and the locking mechanism 144 includes lower 146 and upper 148 lock collars. Each of the lock collars 146, 148 slidingly engage the lock bars 134 and are selectively coupled with the lock bars 134 via lock pins 150 (similar to the pins 138 described above), and are not coupled with the upper chassis attachment member 112. The lock collars 146, 148 may be coupled with the lock bars 134 to rigidly fix the lock bars 134 into position relative to the upper chassis attachment member 112. Each lock collar 146, 148 includes a pin configured to engage one of the through holes 136 of the lock bars 134.

The locking mechanism 144 enables an operator to perform a lift-and-set chassis height adjustment operation. When the applicator 10 is at rest, the adjustment elements 92, 94 are disengaged or relaxed and the weight of the applicator 10 rests primarily on the lower lock collars 146. To adjust the operating position of the assembly 130, the operator moves the upper lock collars 148 to an extreme upper position on the lock bars 134 by disengaging the pins 150, sliding the collars 148 upward on the lock bars 134 to the highest through hole 136, then reengages the pins 150 with the highest through holes thereby locking the upper lock collars 148 in the highest position. The operator then actuates the adjustment mechanism 90 to raise the vehicle chassis 12, thereby lowering the lock bars 134 relative to the upper chassis attachment member 112 until the upper chassis attachment member 112 engages the upper lock collars 148. With the assembly 130 thus in a fully raised position, the operator positions the lower lock collars 146 at the desired operating position. The operator then actuates the adjustment mechanism 90 to lower the vehicle chassis 12 so that the upper chassis attachment member 112 rests on the lower lock collars 146. The operator then repositions the upper lock collars 148 adjacent or proximate the upper chassis attachment member 112.

An exemplary support assembly 200 constructed in accordance with another embodiment of the invention is illustrated in FIGS. 15 through 20. The assembly 200 is configured to support a vehicle chassis on a wheel of the vehicle and may be used, for example, with the applicator 10 in lieu of the assemblies 22. The assembly 200 broadly includes a chassis attachment component 202 for attaching to the chassis 12 of the vehicle; a wheel attachment component 204 for attaching to a wheel or other ground engaging element of the vehicle; a suspension component 206 operably interposed between the chassis attachment component 202 and the wheel attachment component 204 for regulating motion transfer between the two attachment components 202, 204; a single strut bar 208 coupling the wheel attachment component 204 with the suspension component 206; and an adjustment component 210 comprising a plurality of adjustment elements 212, 214 for shifting the wheel attachment component 204 between a plurality of operating positions relative to the chassis attachment component 202. The single strut bar 208 may be pivotable relative to the chassis attachment component 202, and a pivot actuator 216 may drive pivoting motion of the strut bar 208 to thereby steer the wheel or other ground engaging element coupled with the wheel attachment component 204.

The wheel attachment component 204 includes only a single receptacle 218 for connecting to the strut bar 208 but may otherwise be similar or identical to the wheel attachment component 82 described above. The receptacle 218 is positioned generally center on, and above, a cylindrical body 220 of the wheel attachment component 204. Pivot torque is transferred to the wheel by the strut bar 208 via the receptacle 218, therefore the connection between the receptacle 218 and the strut bar 208 must be sufficiently strong to transfer the torque required to pivot the wheel relative to the chassis 12.

The suspension component 206 includes a lower suspension member 222, an upper suspension member 224 and a pneumatic spring 226 or similar motion-regulating element positioned between and attached to the upper 224 and lower 222 suspension members. The upper suspension member 224 is connected to a top side or portion of the spring 226 and the lower suspension member 222 is connected to a lower side or portion of the spring 226. Each of the upper and lower suspension members presents an elongated shape and includes a plurality of apertures or other features for attaching to the spring 226. Each of the suspension members 222, 224 also includes apertures or other features located proximate outer portions thereof to facilitate connection of the suspension component 206 to the adjustment component 210. More specifically, the lower suspension member 222 includes a pair of cylindrical outer flanges 228, 230 defining through holes for slidingly receiving adjustment bars 232, and the upper suspension member 224 includes holes or receptacles for rigidly receiving the adjustment bars 232. The upper and lower suspension members may present the same size and shape or substantially the same size and shape.

The suspension component 206 also includes elements or features for engaging the pivot actuator 216. Specifically, the lower suspension member 222 includes a pair of support bars 236 configured to pivotably engage a cylinder portion of the pivot actuator 216 so that a piston portion of the actuator 216 may engage a pivot flange 238 that is rigidly connected to the strut bar 208. The support bars 236 are rigidly connected to the lower suspension member 222 and hold the first portion of the pivot actuator 216 in a pivotable but stationary position so that extension and retraction of the second portion of the actuator 216 causes the pivot flange 238 (and the strut bar 208) to pivot relative to the rest of the assembly 200.

The strut bar 208 is rigidly connected to the wheel attachment component 204 and is pivotably coupled with the suspension component 206 such that up and down movement of the wheel attachment component 204 relative to the chassis attachment component 202 is communicated through the suspension component 206 via the strut bar 208. More specifically, a first end of the strut bar 208 is connected to the receptacle 218 of the wheel attachment component 204 and a second end of the strut bar 208 is pivotably coupled with the lower suspension member 222. As used herein, a "single strut bar" means one, and only one, strut bar.

The chassis attachment component 202 includes a lower chassis attachment member 240 and an upper chassis attachment member 242 separated by a vertical member 244. The vertical member 244 includes a through hole for slidingly engaging the strut bar 208. Furthermore, each of the chassis attachment members 240, 242 includes apertures or similar elements for connecting to the adjustment elements 212, 214. The vertical member 244 is rigidly connected to both the lower and upper attachment members 240, 242 and to the inner axle 30, and may be integrally formed with the inner axle 30. Thus, the chassis attachment component 202, the height adjustment component 210 and the suspension component 206 do not pivot relative to the chassis 12. Rather, only the wheel attachment component 204 and the strut bar 208 pivot relative to the chassis 12. The chassis attachment component 202 may be a single casting or weldment.

The chassis attachment component 202 is rigidly but adjustably coupled with the upper suspension member 224 via the adjustment elements 212, 214 such that motion transfer between the chassis attachment component 202 and the wheel attachment component 204 passes through, and is regulated by, the suspension component 206. When the adjustment mechanism 210 shifts the wheel attachment component 204 relative to the chassis attachment component 202, the wheel attachment component 204 and the suspension component 206 move in unison or substantially in unison. The wheel attachment component 204 is positioned below the chassis attachment component 202 and, thus, below the axle 30, while the suspension component 206 is positioned above the chassis attachment component 202 and, thus, above the axle 30. The suspension component 206, the chassis attachment component 202 and the wheel attachment component 204 may all be positioned on a line that corresponds to, or is parallel with, the axis of rotation of the strut bar 208.

The pivot actuator 216 is configured to steer the wheel by pivoting the wheel attachment component 204 between a first extreme position (FIG. 17) and a second extreme position (FIG. 18). The adjustment mechanism 210 is configured to move the wheel attachment component 204 between a first extreme operating position (FIG. 19) and a second extreme operating position (FIG. 20). The adjustment mechanism 210 may be infinitely adjustable between the two extreme operating positions or may be configured to move the wheel attachment component 204 between a finite number of operating positions relative to the chassis attachment component 202. The difference between the first extreme operating position and the second extreme operating position may be within the range of from about five inches to about fifty inches. More specifically, the difference may be about ten inches, about twenty inches, about thirty inches or about forty inches.

An assembly 300 constructed in accordance with another embodiment of the invention is illustrated in FIG. 21. The assembly 300 may be identical to the assembly 200, except that the assembly 300 includes a locking mechanism 302 for mechanically locking the assembly 300 in any of the plurality of operating positions. In the illustrated assembly 300, the locking mechanism 302 includes a pair of lock bars 304 connected to the upper suspension member 224 and selectively coupled with the upper chassis attachment member 242 via lock pins 308. The lock bars 304 are positioned outboard of the adjustment elements 212, 214. Each of the lock bars 304 may include a plurality of spaced through holes 306 and a locking pin 308 configured to engage the upper chassis attachment member 242 and any one of the through holes 306 to rigidly connect the lock bar 304 with the upper chassis attachment member 242. The lock bars 304 of the illustrated assembly 300 include ten through holes 306 such that the assembly 300 may be locked into any of ten different operating positions. Thus, the locking mechanism 302 may be similar or identical to the locking mechanism 132 described above, and may include manual locking pins (as illustrated) or remotely-controlled locking mechanism like the mechanism 140 described above. Alternatively, the assembly 300 may include a lift-and-set type locking mechanism similar to the locking mechanism 144 described above.

An exemplary support assembly 400 for supporting a vehicle chassis on a wheel of the vehicle in accordance with another embodiment of the invention is illustrated in FIGS. 22-27. The assembly 400 is configured to support a vehicle chassis on a wheel of the vehicle and may be used, for example, with the applicator 10 in lieu of the assemblies 22. The assembly 400 broadly includes a chassis attachment component 402 for attaching to the chassis 12 of the vehicle; a wheel attachment component 404 for attaching to a wheel or other ground engaging element of the vehicle 12; a suspension component 406 operably interposed between the chassis attachment component 402 and the wheel attachment component 404 for regulating motion transfer between the two attachment components 402, 404; a single strut bar 408 coupling the wheel attachment component 404 with the suspension component 406; and an adjustment component 410 comprising a plurality of adjustment elements 412, 414 for shifting the wheel attachment component 404 between a plurality of operating positions relative to the chassis attachment component 402. The single strut bar 408 is rigidly coupled with the wheel attachment component 404 and the suspension component 406 and the chassis attachment component is pivotably coupled with the inner axle 30. The assembly 400 may include a pivot actuator 416 for pivoting the entire assembly 400 relative to the chassis 12.

The assembly 400 may be similar or identical to the assembly 200, described above, except that the single strut bar 408 is rigidly connected to both the wheel attachment component 404 and the suspension component 406, the chassis attachment component 402 pivots relative to the chassis 12, and the pivot actuator 416 is drivingly coupled with the chassis attachment component 402. In the illustrated embodiment, a cylindrical receptacle portion 418 of the inner axle 30 pivotably engages upper 420 and lower 422 chassis attachment members and includes a through hole for pivotably and slidingly engaging the strut bar 408. Through holes in the upper 420 and lower 422 chassis attachment members also slidingly engage the strut bar 408 such that the strut bar 408 slides within the chassis attachment member 402.

The assembly 400 includes a pivot actuator 416 similar to the pivot actuator 216 described above, except that the actuator 416 is drivingly connected to the chassis attachment component 402 rather than the suspension component. The pivot actuator 416 is configured to pivot the assembly 400 between a first extreme position (FIG. 24) and a second extreme position (FIG. 25). The adjustment mechanism 410 is configured to move the wheel attachment component 404 between a first extreme operating position (FIG. 26) and a second extreme operating position (FIG. 27). The adjustment mechanism 410 may be infinitely adjustable between the two extreme operating positions or may be configured to move the wheel attachment component 404 between a finite number of operating positions relative to the chassis attachment component 402. The difference between the first extreme operating position and the second extreme operating position may be within the range of from about five inches to about fifty inches. More specifically, the difference may be about ten inches, about twenty inches, about thirty inches or about forty inches.

A support assembly 500 constructed in accordance with another embodiment of the invention is illustrated in FIG. 28. The assembly 500 includes a locking mechanism 502 for mechanically locking the assembly 500 in any of a plurality of the operating positions, but is otherwise similar or identical to the assembly 400, described above. The locking mechanism 502 includes a pair of lock bars 504 connected to an upper suspension member 506 and an upper chassis attachment member 508. The lock bars 504 are positioned outboard of adjustment elements 412, 414. Each of the lock bars 504 may include a plurality of spaced through holes 510 and a locking pin 512 configured to engage the upper chassis attachment member 508 and any one of the through holes 510 to rigidly connect the lock bar 504 with the upper chassis attachment member 508. In the illustrated embodiment, the lock bars 504 include ten through holes 510 such that the assembly 500 may be locked into any of ten different operating positions. Thus, the locking mechanism 502 may be similar or identical to the locking mechanism 132 described above, and may include manual locking pins or remotely-controlled locking pins. Alternatively, the assembly 500 may include a lift-and-set type locking mechanism similar to the locking mechanism 144 described above.

An exemplary support assembly 600 for supporting a vehicle chassis on a wheel of the vehicle in accordance with another embodiment of the invention is illustrated in FIGS. 29-30. The assembly 600 broadly includes a chassis attachment component 602 for attaching to the chassis of the vehicle; a wheel attachment component 604 for attaching to a wheel or other ground engaging element of the vehicle; a suspension component 606 operably interposed between the chassis attachment component 602 and the wheel attachment component 604 for regulating motion transfer between the two attachment components; and a plurality of strut bars 608, 610 connecting the wheel attachment component 604 to the suspension component 606. The chassis attachment component 602 may include a pivot element 612 for allowing the entire assembly 600 to pivot relative to the chassis 12 and a pivot actuator may drive the pivoting motion to thereby steer a wheel or other ground engaging element connected to the wheel attachment component. In the illustrated embodiment, the pivot actuator is a rotary actuator that functions as both the pivot element and the actuator.

The assembly 600 may be similar or identical to the assembly 22, described in detail above, except that the assembly 600 does not include a height adjustment component. Rather, the operating position of the wheel attachment component 604 relative to the chassis attachment component 602 is fixed by the length of the strut bars 608, 610 and by the length of a pair of fixed structural members 614 that replace the height adjustment elements of the assembly 22.

An exemplary support assembly 700 for supporting a vehicle chassis on a wheel of the vehicle constructed in accordance with principles of another embodiment of the invention is illustrated in FIGS. 31-37. The assembly 700 is configured to support a vehicle chassis on a wheel of the vehicle and may be used, for example, with the applicator 10 in lieu of the assemblies 22. The assembly 700 broadly includes a frame 702 pivotably connected to the vehicle chassis at a connection location; a wheel attachment component 704 slidingly coupled with the frame 702, configured to pivot in unison with the frame 702 and to move between a plurality of operating positions relative to the frame 702; a suspension component 706 operably interposed between the frame 702 and the wheel attachment component 704 for regulating motion transfer between the frame 702 and the wheel attachment component 704; and an adjustment actuator 708 rigidly coupled with the frame 702 and configured to shift the wheel attachment component 704 between any of the plurality of operating positions relative to the frame 702. A pair of support members 710 are rigidly coupled with the wheel attachment component 704 and slidingly engage the frame 702.

The frame 702 includes a lower spindle member 712 and an upper spindle member 714 separated by a space and pivotably coupled with the inner axle 30. A pair of lower side members 716 are attached to outer ends of the lower 712 and upper 714 spindle members and rigidly interconnect the spindle members. In the illustrated embodiment, the lower side members 716 are cylindrical in shape and each includes a through-hole or similar feature to slidingly engage one of the support members 710. An upper suspension member 718 is separated from the upper spindle member 714 by a space wherein a pair of upper side members 720 rigidly interconnect the upper spindle member 714 and the upper suspension member 718. The upper suspension member 718 includes a pair of through holes 722 for slidingly receiving the support members 714.

The suspension component 706 includes a lower suspension member 724 rigidly coupled with a spring 726 and with the adjustment actuator 708. The lower suspension member 724 is also selectively coupled with the support members 710 via a pair of locking pins 728, 730, as explained below. The lower suspension member 724 is an elongated, rigid member with a first (bottom) side connected to a top portion of the actuator 708 and a second (top) side connected to a first end or portion of the spring 726. The lower suspension member 724 further defines a pair of cylindrical barrel portions 732 at the ends thereof for slidingly receiving the support members 710.

As mentioned previously, the suspension component 706 includes a pneumatic spring 726 or similar component for regulating motion transfer between the wheel attachment component 704 and the frame 702. The spring 726 is positioned between the upper 718 and lower 724 suspension members and between the support members 710. Thus, the spring 726 is positioned within the frame 702 such that the spring 726, the frame 702 and the wheel attachment component 704 all pivot in unison.

The adjustment actuator 708 is housed within a receptacle portion 734 of the axle 30 and an adjustment member 736 of the adjustment actuator 708 is connected to the wheel attachment component 704. The actuator 708 drives the adjustment member 736 to move the wheel attachment component 704 between a plurality of operating positions relative to the frame 702. The actuator 708 may include, for example, a conventional hydraulic cylinder. In the illustrated embodiment, the assembly 700 includes a single actuator housed within the receptacle portion 734 of the axle 30. It will be appreciated that this configuration reduces the number of exposed components as well as the overall size of the assembly 700.

The wheel attachment component 704 may be moveable between a first extreme operating position (FIG. 35) and a second extreme operating position (FIG. 36). The difference between the first extreme operating position and the second extreme operating position may be within the range of about five inches to about fifty inches. More specifically, the difference may particularly be about ten inches, about twenty inches, about thirty inches or about forty inches.

In the illustrated embodiment, the wheel attachment component 704 is positioned below the axle 30, the suspension component 706 is positioned above the axle 30 and the adjustment actuator 708 is positioned within the receptacle portion 734 of the axle 30 such that the wheel attachment component 704, the suspension component 706 and the adjustment actuator 708 all lie on a line that corresponds to or is parallel with the axis of rotation of the assembly 700. The lower side members 716 are positioned proximate and on opposite sides of the receptacle portion 734 of the axle 30, and the upper side members 720 are positioned on opposite sides of the spring 726 and outboard of the support members 710.

The assembly 700 includes a pair of locking pins 728, 730 for selectively coupling the support members 710 with the frame 702 to thereby lock the wheel attachment component 704 into any of a plurality of operating positions relative to the frame 702. The locking pins 728, 730 engage the barrel portions 732 of the lower suspension member 724 and selectively engage any of a plurality of through holes (not illustrated) of the support members 710 to thereby fixedly couple the lower suspension member 724 with the support members 710.

A pivot actuator 738 is pivotably coupled with both a recess 740 of the inner axle 30 and pivotably coupled with a pivot flange 742 of the frame 702 to pivot the assembly 700 relative to the axle 30 and thereby steer a wheel attached to the wheel attachment component 704. More specifically, the pivot actuator 738 is operable to pivot the assembly 700 between a first extreme position (FIG. 33) and a second extreme position (FIG. 34).

A cross section of the receptacle portion 722 of the axle 30 and a portion of the support assembly 700 is illustrated in FIG. 37. A pair of annular inserts 734, 736 extend through the lower 710 and upper 712 spindle members and into the receptacle portion 722 of the axle 30. A bushing material 738 may be interposed between the inserts 734, 736 and an inner surface of the receptacle portion 722 to facilitate rotation of the frame 702 relative to the receptacle portion 722. The actuator 707 is positioned inside the inserts 734, 736 and may not be in contact with the inserts 734, 736.

An assembly 800 constructed in accordance with another embodiment of the invention is illustrated in FIGS. 38-40. The assembly 800 broadly includes a frame 802 pivotably coupled with the vehicle chassis 12; an attachment component 804 slidingly coupled with the frame 802; and an adjustment actuator rigidly coupled with the frame 802 and configured to shift the attachment component 804 between a plurality of operating positions relative to the frame 802 and to regulate motion transfer between the attachment component 804 and the frame 802. The adjustment actuator, housed within a receptacle portion 806 of the axle 30, is the only mechanism for securing the attachment component 804 in the operating positions and is the only mechanism for regulating motion transfer between the attachment component 804 and the frame 802. The assembly 800 may also include a pivot actuator 808 for pivoting the frame 802 relative to the chassis 12.

The assembly 800 is similar or identical to the assembly 700, described above, except that the assembly 800 does not include a pneumatic spring or locking mechanisms on support members 810. Rather, the adjustment actuator is configured to move the attachment component 804 between the plurality of operating positions relative to the frame, to secure the attachment component 804 in any of the operating positions, and to regulate motion transfer between the attachment component 804 and the frame 802. If the adjustment actuator includes a hydraulic actuator, for example, maintaining a certain hydraulic pressure on the cylinder may hold the cylinder in a first of the operating positions. Increasing the hydraulic pressure may cause the piston to extend to a second operating position that corresponds to a higher chassis height than the first operating position. Reducing the hydraulic pressure may cause the piston to retract to a third operating position that corresponds to a lower chassis height than the first operating position.

The attachment component 804 may be moveable between a first extreme operating position, illustrated in FIG. 39, and a second extreme operating position, illustrated in FIG. 40. The difference between the first extreme operating position and the second extreme operating position may be within the range of about five inches to about fifty inches. More specifically, the difference may particularly be about ten inches, about twenty inches, about thirty inches or about forty inches.

Referring again to FIG. 3c, the hydraulic system may include various specialized components to enable the locking and suspension functions performed by the hydraulic adjustment actuator. One or more hydraulic accumulators 78 may be included, for example, to regulate pressure spikes in the hydraulic system associated with bouncing or other rapid movement of the wheel attachment component relative to the frame. Furthermore, a computerized control system may be used to control the hydraulic pressure to thereby secure the assembly in any of the operating positions.

An assembly 850 constructed in accordance with another embodiment of the invention is illustrated in FIGS. 41-42. The assembly 850 broadly includes a frame 852 configured to be pivotably coupled with the inner axle 30 of the vehicle chassis 12; a wheel attachment component 854 positioned below the axle 30; a pair of support members 856 rigidly coupled with the wheel attachment component 854 and slidingly coupled with the frame 852 such that the support members 856 transfer toque between the frame 852 and the wheel attachment component 854 causing the wheel attachment component 854 to pivot in unison with the frame 852; a suspension component 858 operably interposed between the frame 852 and the wheel attachment component 854 for regulating motion transfer between the frame 852 and the wheel attachment component 854; and a pivot actuator 860 for pivoting the frame 852 relative to the chassis 12.

The assembly 850 is similar or identical to the assembly 700, described above, except that the assembly 850 does not include an adjustment actuator. Rather, the assembly 850 is configured such that wheel attachment component 854 operates at a single operating position relative to the frame 852. Because the attachment component 854 does not shift between different operating positions relative to the frame 852, the support members 856 may be rigidly coupled with the wheel attachment component 854 and with the suspension component 858 without the use of locking elements.

The assembly 850 may alternatively include removable support members 862, as illustrated in FIGS. 43-44. The support members 862 are removably coupled with the lower suspension member and with the wheel attachment component 854 so that they can be removed and replaced with other support members of a different size. Replacing the support members 862 with other support members of a different size allows the operator to adjust the height of the chassis 12. The support members 862 are "removably" coupled with the lower suspension member and with the wheel attachment component if they are configured to be removed and replaced without cutting or otherwise compromising the support members 862 or any other component of the assembly 850, and without compromising the strength of the connections. The support members 862 may be removably coupled with the lower suspension member and the wheel attachment component 854 using, for example, bolts or similar fasteners that may be repeatedly removed from and reattached to the support members 862.

With reference now to FIGS. 45-47, the track width of the applicator 10 is illustrated as the distance between the wheels 14a, 14b on a first side of the applicator 10 and the wheels 14c, 14d on a second side of the applicator 10. As explained above, the applicator 10 includes a track width adjustment system including telescoping axles 28, 30 and actuators (not illustrated) for moving the inner axles 30 between extended and retracted positions. The track width may be infinitely adjustable between, for example, about 120 inches and about 152 inches.

The applicator 10 may be configured such that the support assemblies 22 are not parallel with the direction of vertical movement of the chassis 12 when the support assemblies 22 are used to adjust the height of the chassis 12. As illustrated in FIG. 45, each support assembly 22 connects to the chassis 12 at a chassis connection point 900 and connects to one of the wheels 14 at a wheel connection point 902. A straight line 904 interconnecting the chassis connection point 900 and the wheel connection point 902 is angled relative to vertical movement of the chassis 12 and is also angled relative to a vertical longitudinal axis of the wheel 14. Line 906 represents the direction of vertical movement of the chassis 12 and the direction of the vertical longitudinal axis of the wheel 14. This angled position of the assemblies 22 may be desirable for several reasons, including providing sufficient separation between the support assembly 22 and the wheel 14 and providing an optimal steering configuration.

As illustrated in FIG. 46, the angled position of the assemblies 22 relative to the vehicle's frame presents certain challenges to use of the support assembly 22 to raise and lower the vehicle's chassis 12. As the support assemblies 22 are actuated to raise the chassis 12, for example, the wheels 14 are also pushed laterally outward away from the vehicle's chassis 12. This may present a problem because some surfaces may prevent the wheels 14 from sliding relative to the chassis 12, particularly if the applicator 10 is loaded with product. In these situations the operator may be required to raise and lower the applicator 10 while the applicator 10 is travelling forward or backwards. Furthermore, it may be undesirable to operate the applicator 10 at a new track width such that the operator must re-adjust the track width to the desired amount each time he or she adjusts the height of the chassis 12. As explained above, re-adjusting may need to be performed while the applicator 10 is moving.

To address the problems associated with lateral movement of the wheels that occurs when the applicator height is adjusted, the control system 52 may be configured to automatically adjust the track width as the height of the applicator 10 is adjusted such that the wheels 14 do not move laterally relative to the ground surface as the applicator 10 is raised and lowered. With particular reference to FIG. 47, if the support assembly 22 is positioned at an angle of inclination θ relative to the direction of travel of the chassis 12, the change in lateral position of the wheel ΔW is defined as $\Delta W = \sin(\theta) \times \Delta H$, where ΔH is the change in the distance between the chassis point of connection 900 and the wheel point of connection 902 along the line 109. In this equation, ΔW represents the change in lateral position of one of the wheels 14 or, in other words, the wheels 14 on one side of the applicator 10. The total change in track width is defined as twice that amount, or two times ΔW.

The control system 52 may be configured such that as the operator adjusts the height of the machine using, for example, a button or dial located in the cabin 18, the control system 52 detects the height adjustment and automatically adjusts the track width accordingly to preserve the track width of the applicator 10. Alternatively, the control system may be configured to actuate both the chassis height adjustment system and the track width adjustment system. In this implementation, the user may adjust the chassis height via a user interface element wherein the control system 52 actuates the height adjustment system to adjust the chassis height to the desired height and also adjusts the track width system to preserve the track width of the applicator. In either implementation, the control system 52 adjusts the track width according to the equation $\Delta W = \sin(\theta) \times \Delta H$, explained above.

Although the invention has been described with reference to the exemplary embodiments illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A machine comprising:
    a chassis;
    a plurality of ground-engaging elements supporting the chassis above a ground surface;
    a motor for driving at least one of the ground-engaging elements to propel the machine along the ground surface;
    a plurality of assemblies supporting the chassis on the ground-engaging elements, the assemblies configured to selectively raise and lower the chassis relative to the ground surface, each of the assemblies including:
        a first attachment component for attaching the assembly to one of the ground-engaging elements;
        a second attachment component for attaching the assembly to the chassis,
        an adjustment component for shifting the first attachment component between a plurality of operating positions relative to the second attachment component;
        a suspension component operably interposed between the first attachment component and the second attachment component, the suspension component configured to regulate motion transfer between the first attachment component and the second attachment component, the suspension component functioning independently of the operating position; and
    a control system for enabling an operator to remotely control the adjustment components of each of the assemblies.

2. The machine as set forth in claim 1, wherein each of the assemblies includes a hydraulic actuator for raising and lowering the chassis relative to the ground surface.

3. The machine as set forth in claim 1, wherein the suspension components each include a pneumatic spring.

4. The machine as set forth in claim 1, wherein at least one of the assemblies includes a steering actuator configured to pivot a respective ground-engaging element relative to the chassis.

5. The machine as set forth in claim 1, wherein the machine is an applicator and wherein the machine further comprises:
    a tank for holding material to be dispensed, and
    a dispensing system for dispensing the material.

6. The machine as set forth in claim 1, wherein the control system is configured to enable the operator to remotely operate the assemblies to raise and lower the chassis relative to the ground surface without moving the ground-engaging elements laterally relative to the ground surface.

7. The machine as set forth in claim 1, wherein the suspension components of the assemblies are the only components of the vehicle configured to regulate motion transfer between the ground-engaging elements and the chassis.

\* \* \* \* \*